(12) United States Patent
Persson

(10) Patent No.: US 11,741,081 B2
(45) Date of Patent: Aug. 29, 2023

(54) METHOD AND SYSTEM FOR DATA HANDLING

(71) Applicant: KING.COM LIMITED, St. Julians (MT)

(72) Inventor: Fredrik Persson, Stockholm (SE)

(73) Assignee: KING.COM LIMITED, St. Julian's (MT)

( * ) Notice: Subject to any disclaimer, the term of this patent is extended or adjusted under 35 U.S.C. 154(b) by 469 days.

(21) Appl. No.: 16/257,458

(22) Filed: Jan. 25, 2019

(65) Prior Publication Data
US 2020/0242104 A1    Jul. 30, 2020

(51) Int. Cl.
| | |
|---|---|
| G06F 16/23 | (2019.01) |
| H04L 67/1097 | (2022.01) |
| G06F 7/58 | (2006.01) |
| G06F 16/27 | (2019.01) |
| H04L 9/06 | (2006.01) |

(52) U.S. Cl.
CPC .......... *G06F 16/2379* (2019.01); *G06F 7/582* (2013.01); *G06F 16/2315* (2019.01); *G06F 16/278* (2019.01); *H04L 9/0643* (2013.01); *H04L 67/1097* (2013.01)

(58) Field of Classification Search
CPC ............. G06F 16/2379; G06F 16/2315; G06F 16/278; G06F 7/582; H04L 9/0643; H04L 67/1097; H04L 67/01
USPC ....................................................... 707/607
See application file for complete search history.

(56) References Cited

U.S. PATENT DOCUMENTS

| | | | | |
|---|---|---|---|---|
| 5,860,070 A | * | 1/1999 | Tow ...................... | G06F 16/284 |
| | | | | 707/704 |
| 9,607,019 B1 | * | 3/2017 | Swift .................. | G06F 16/2255 |
| 2014/0350432 A1 | * | 11/2014 | Khalfallah ....... | C07K 14/70571 |
| | | | | 600/547 |

(Continued)

OTHER PUBLICATIONS

Elmore, Aaron J., et al., "Squall: Fine-Grained Live Reconfiguration for Partitioned Main memory Databases", Proc. of the 2015 ACM Sigmod Intl. Conf. on Management of Data, Sigmod '15, pp. 299-313, paragraphs [04.1]-[04.3] XP055387799, May 27, 2015.

(Continued)

*Primary Examiner* — Allen S Lin
(74) *Attorney, Agent, or Firm* — Saul Ewing LLP

(57) ABSTRACT

A control module transferring data between a shard and destination shards within a database comprising a plurality of shards, the control module: generating a first hash wheel distribution of shard allocations by applying a defined hashing function to a first integer value per shard allocation; generating a further hash wheel distribution of shard allocations by applying the defined hashing function to a further integer value per shard allocation; determining a range of hash values associated with data to be transferred between the shard and a destination shard, wherein the range of hash values, the shard and the destination shard are defined based on determining a difference between the first hash wheel distribution of shard allocations and the further hash wheel distribution of shard allocations; selecting and controlling the transfer of data associated with the determined range of hash values between the shard and the destination shard.

14 Claims, 33 Drawing Sheets

(56) References Cited

U.S. PATENT DOCUMENTS

2014/0379988 A1* 12/2014 Lyakhovitskiy ........ G06F 12/12
　　　　　　　　　　　　　　　　　　　　　　　　711/133
2017/0316072 A1* 11/2017 Persson ............... G06F 16/2315
2019/0116238 A1*  4/2019 Bernard .............. H04L 67/2852
2020/0104391 A1*  4/2020 Laskawiec .......... G06F 16/2365

OTHER PUBLICATIONS

Goulah, John , "The Shard Revisited, Tools and Techhniques Used at Etsy", Retrieved from the Internet: URL: https://www.percona.com/live/london-2013/sites/default/files/slides/percona-tools_0.pdf; [retrieved on Jul. 5, 2017] pp. 17, 19, 28, 109-125 XP055387975, Nov. 12, 2013.

* cited by examiner

METHOD AND SYSTEM FOR DATA HANDLING

CROSS-REFERENCE TO RELATED APPLICATIONS

This application is related to an application entitled "METHOD AND SYSTEM FOR DATA HANDLING" and assigned U.S. application Ser. No. 16/257,273, filed on even date concurrently herewith, the entire contents of which are incorporated fully herein by reference

TECHNICAL FIELD

Some embodiments relate to a method and system for data handling in a database server system comprising at least one database server. The database server may be used to handle data requests for the purposes of providing information to and/or receiving information from computer software running on a client device.

BACKGROUND

In computing it is commonplace to communicate over a network to provide functionality or additional functionality to a client device and/or to a server serving the client device. It may be the case that such a server comprises a database for storing data related to the client devices. Such data may relate to users of the client devices, such as user profile information. Where a server or network serves a large number of users and/or a large amount of traffic per user, there may be a high volume of data requests to the database of the server. High traffic to a database can cause delays and affect stability of the database. This can also lead to end-user frustration if it prevents an end user from being able to access the data required for a task.

By way of example, one application where a server or servers need to serve a large number of users is that of computer gaming. A user may require data to be received from or sent to the server(s), for example when playing a game.

Such data may be stored within a database system. The database system may be implemented by an application server which is able to access the information stored over a database layer implemented over a plurality of servers. Where the application server accesses user specific data, the database may comprise user profile information. For example the user profile information may include (by way of non-limiting example): identity information; address information; location information; payment and/or billing information (e.g. credit card details); game related information etc. of one or more users.

A client device may via the application server request a single record from the database servers by sending a 'select' or 'get' request for a single record. Alternatively a plurality of data records and an associated 'select' request may be transmitted. The plurality of records may be a list of records and/or a range of records. The records may be in the form of "keys". A key may comprise an identifier which enables a record to be identified in the database. In some embodiments a key may comprise a unique identifier. In addition to the 'select' request, the server may request modifications of stored data in the database by using data manipulation operations such as 'update', 'insert' and 'delete' requests as those known to the person skilled in the art.

Information in many databases are partitioned in order to assist the management and storage of the information. The information may be partitioned within a server or across servers, or a combination of both. That is the database may be considered to comprise one or more parts. These parts may alternatively be referred to as "shards". Partitioning the database in this manner may facilitate storage of large amounts of information. Partitioning in this manner may also improve reliability of storage and/or retrieval of information. For example if one shard nears or reaches capacity, then information can be transferred to another shard which has capacity to receive more information. Also, if one shard becomes inoperable then the system may still be able to operate satisfactorily using the other shards.

It is known to use a common database server to store information about where data is located. The information about data location may in some embodiments be stored in the common database in the form of a look-up table (LUT). The lookup may resolve the location for users or client devices.

Despite the use of partitioning there may be difficulties associated with storing large quantities of data records in databases. These problems are apparent where the information stored within the database needs to be accessible at all times. For example where data collections are associated with a large number of users/clients that also may be geographically spread it may not be appropriate to shut down the databases during the 'night' and/or weekends to perform database control and maintenance operations.

For example it might be necessary to transfer data collections between shards and not be acceptable to lock a user or device out of a data collection. A process of moving one or more collections between shards may be in response to receiving an external instruction to move the one or more collections. Alternatively or additionally, a moving process may automatically occur in response to a pre-defined parameter. For example a pre-defined parameter may be a threshold capacity level. For example a first shard may be configured to offload some data collections to a second shard when the first shard reaches 80% capacity. The system may be configured to move the information to a second shard whose capacity is below a certain threshold level. For example, the system may be configured to look to move the data collections to a shard that is running at or below 50% capacity.

A data collection lock may frustrate a user who needs to access that information at that time. For example, where the application server comprises a games data function the information may need to be accessed in order to download a game, to start or play a game, or to carry out a certain action in a game. Failure to be able to carry out the action at that moment may cause user frustration, leading to the user giving up and not completing the action in question.

A data collection lock may also cause data errors where information is lost, such as for example the data needs to be uploaded from a 'failing' device and where the data collection is locked and cannot be accessed.

SUMMARY OF DISCLOSURE

According to a first aspect there is provided a control module configured to control transferring data between a shard and at least one destination shard within a database comprising a plurality of shards, the control module comprising at least one processor and at least one memory including a computer program code, the at least one memory and the computer program code configured to, with the at least one processor, cause the control module at least to: generate a first hash wheel distribution of shard allocations by applying a defined hashing function to a first integer value per shard allocation; generate a further hash wheel distribution of shard allocations by applying the defined hashing function to a further integer value per shard allocation; determine at least one range of hash values associated with data to be transferred between the shard and the at least one destination shard, wherein the at least one range of hash values, the shard and the at least one destination shard are defined based on determining a difference between the first hash wheel distribution of shard allocations and the further hash wheel distribution of shard allocations; select and control the transfer of data associated with the determined at least one range of hash values between the shard and the at least one destination shard.

The control module may be further caused to: generate a series of auxiliary hash wheel distributions of shard allocations by applying the defined hashing function to a series of auxiliary integer value per shard allocations, wherein a final of the series of auxiliary integer value per shard allocations may be a target integer value per shard allocation and the further integer value per shard allocation and auxiliary integer value per shard allocations may define a step-wise progression from the first integer value per shard allocation to the final of the series of auxiliary integer value per shard allocations.

The control module may be further caused to determine further ranges of hash values associated with data to be transferred between shards, wherein the further ranges of hash values, the shard and the at least one destination shard may be defined based on determining differences between succeeding auxiliary hash wheel distributions of shard allocations.

The control module caused to select and control the transfer of the determined at least one range of data between the first shard and the at least one destination shard may be further caused to generate and store a hash value associated with each key.

The control module may be caused to generate the hash value based on one of: the defined hashing function applied to the key value for each key; a sum of an additional value and the defined hashing function applied to the key value for each key, wherein the additional value is a pseudorandom value; and a concatenation of an additional value to the defined hashing function hash wheel function applied to the key value for each key, wherein the additional value is a pseudorandom value.

The control module caused to select and control the transfer of data associated with the determined at least one range of hash values between the shard and the at least one destination shard may be caused to select rows from database tables based on the determined at least one range of hash values.

According to a second aspect there is provided a control module configured to control transferring data between a shard and at least one destination shard within a database comprising a plurality of shards, the control module comprising at least one processor and at least one memory including a computer program code, the at least one memory and the computer program code configured to, with the at least one processor, cause the control module at least to: obtain a first integer value per shard allocation and a target integer value per shard allocation; generate a plurality of intermediate integer value per shard allocations, wherein the plurality of intermediate integer value per shard allocations define a step-wise progression from the first integer value per shard allocation to the target integer value of auxiliary integer value per shard allocations; for each pair of successive allocations: determine at least one range of hash values associated with data to be transferred between shards based on determining a difference between a first hash wheel distribution of shard allocations based on a first of the pair of successive allocations and a second hash wheel distribution of shard allocations based on a second of the pair of successive allocations; determine a shard identification from the first of the pair of successive allocations associated with the data to be transferred between shards; and determine a target shard identification from the second of the pair of successive allocations associated with the data to be transferred between shards; select and control the transfer of data associated with the determined at least one range of hash values between a shard based on the determined shard identification and the a target shard based on the determined target shard identification.

The control module caused to determine at least one range of hash values associated with data to be transferred between shards based on determining a difference between a first hash wheel distribution of shard allocations based on a first of the pair of successive allocations and a second hash wheel distribution of shard allocations based on a second of the pair of successive allocations may be further caused to: generate the first hash wheel distribution of shard allocations by applying a defined hashing function to the first of the pair of successive allocations; and generate a second hash wheel distribution of shard allocations by applying the defined hashing function to the second of the pair of successive allocations.

The control module caused to select and control the transfer of data associated with the determined at least one range of hash values between a shard based on the determined shard identification and the a target shard based on the determined target shard identification may be further caused to select rows from database tables associated with the determined at least one range of hash values.

The control module caused to select rows from database tables associated with the determined at least one range of hash values may be further caused to: select rows up to a first limit number of rows from database tables associated with the determined at least one range of hash values; and determine whether further rows are to be selected and repeat selecting rows upto the first limit number of rows and until all rows to be selected are selected.

According to a third aspect there is provided a method for a control module configured to control transferring data between a shard and at least one destination shard within a database comprising a plurality of shards, the method comprising: generating a first hash wheel distribution of shard allocations by applying a defined hashing function to a first integer value per shard allocation; generating a further hash wheel distribution of shard allocations by applying the defined hashing function to a further integer value per shard allocation; determining at least one range of hash values associated with data to be transferred between the shard and the at least one destination shard, wherein the at least one range of hash values, the shard and the at least one destination shard are defined based on determining a difference between the first hash wheel distribution of shard allocations and the further hash wheel distribution of shard allocations; selecting and controlling the transfer of data associated with the determined at least one range of hash values between the shard and the at least one destination shard.

The method may further comprise: generating a series of auxiliary hash wheel distributions of shard allocations by applying the defined hashing function to a series of auxiliary integer value per shard allocations, wherein a final of the series of auxiliary integer value per shard allocations is a target integer value per shard allocation and the further integer value per shard allocation and auxiliary integer value per shard allocations define a step-wise progression from the first integer value per shard allocation to the final of the series of auxiliary integer value per shard allocations.

Determining further ranges of hash values associated with data to be transferred between shards, wherein the further ranges of hash values, the shard and the at least one destination shard may be defined based on determining differences between succeeding auxiliary hash wheel distributions of shard allocations.

Selecting and controlling the transfer of the determined at least one range of data between the first shard and the at least one destination shard further may comprise generating and storing a hash value associated with each key.

Generating the hash value may comprise generating the hash value based on one of: the defined hashing function applied to the key value for each key; a sum of an additional value and the defined hashing function applied to the key value for each key, wherein the additional value is a pseudorandom value; and a concatenation of an additional value to the defined hashing function hash wheel function applied to the key value for each key, wherein the additional value is a pseudorandom value.

Selecting and controlling the transfer of data associated with the determined at least one range of hash values between the shard and the at least one destination shard may further comprise selecting rows from database tables based on the determined at least one range of hash values.

According to a fourth aspect there is provided a method for a control module configured to control transferring data between a shard and at least one destination shard within a database comprising a plurality of shards, the method comprising: obtaining a first integer value per shard allocation and a target integer value per shard allocation; generating a plurality of intermediate integer value per shard allocations, wherein the plurality of intermediate integer value per shard allocations define a step-wise progression from the first integer value per shard allocation to the target integer value of auxiliary integer value per shard allocations; for each pair of successive allocations: determining at least one range of hash values associated with data to be transferred between shards based on determining a difference between a first hash wheel distribution of shard allocations based on a first of the pair of successive allocations and a second hash wheel distribution of shard allocations based on a second of the pair of successive allocations; determining a shard identification from the first of the pair of successive allocations associated with the data to be transferred between shards; and determining a target shard identification from the second of the pair of successive allocations associated with the data to be transferred between shards; selecting and controlling the transfer of data associated with the determined at least one range of hash values between a shard based on the determined shard identification and the a target shard based on the determined target shard identification.

Determining at least one range of hash values associated with data to be transferred between shards based on determining a difference between a first hash wheel distribution of shard allocations based on a first of the pair of successive allocations and a second hash wheel distribution of shard allocations based on a second of the pair of successive allocations may further comprise: generating the first hash wheel distribution of shard allocations by applying a defined hashing function to the first of the pair of successive allocations; and generating a second hash wheel distribution of shard allocations by applying the defined hashing function to the second of the pair of successive allocations.

Selecting and controlling the transfer of data associated with the determined at least one range of hash values between a shard based on the determined shard identification and the a target shard based on the determined target shard identification may further comprise selecting rows from database tables associated with the determined at least one range of hash values.

Selecting rows from database tables associated with the determined at least one range of hash values may further comprise: selecting rows up to a first limit number of rows from database tables associated with the determined at least one range of hash values; and determining whether further rows are to be selected and repeat selecting rows upto the first limit number of rows and until all rows to be selected are selected.

According to a fifth aspect there is provided a control module means for controlling transferring data between a shard and at least one destination shard within a database comprising a plurality of shards, the means for: generating a first hash wheel distribution of shard allocations by applying a defined hashing function to a first integer value per shard allocation; generating a further hash wheel distribution of shard allocations by applying the defined hashing function to a further integer value per shard allocation; determining at least one range of hash values associated with data to be transferred between the shard and the at least one destination shard, wherein the at least one range of hash values, the shard and the at least one destination shard are defined based on determining a difference between the first hash wheel distribution of shard allocations and the further hash wheel distribution of shard allocations; selecting and controlling the transfer of data associated with the determined at least one range of hash values between the shard and the at least one destination shard.

The means may be further for: generating a series of auxiliary hash wheel distributions of shard allocations by applying the defined hashing function to a series of auxiliary integer value per shard allocations, wherein a final of the series of auxiliary integer value per shard allocations is a target integer value per shard allocation and the further integer value per shard allocation and auxiliary integer value per shard allocations define a step-wise progression from the first integer value per shard allocation to the final of the series of auxiliary integer value per shard allocations.

The means for determining further ranges of hash values associated with data to be transferred between shards, wherein the further ranges of hash values, the shard and the at least one destination shard may be further for determining further ranges of hash values based on determining differences between succeeding auxiliary hash wheel distributions of shard allocations.

The means for selecting and controlling the transfer of the determined at least one range of data between the first shard and the at least one destination shard further may be for generating and storing a hash value associated with each key.

The means for generating the hash value may be further for generating the hash value based on one of: the defined hashing function applied to the key value for each key; a sum of an additional value and the defined hashing function applied to the key value for each key, wherein the additional value is a pseudorandom value; and a concatenation of an additional value to the defined hashing function hash wheel function applied to the key value for each key, wherein the additional value is a pseudorandom value.

The means for selecting and controlling the transfer of data associated with the determined at least one range of hash values between the shard and the at least one destination shard may be further for selecting rows from database tables based on the determined at least one range of hash values.

According to a sixth aspect there is provided a control module means for controlling transferring data between a shard and at least one destination shard within a database comprising a plurality of shards, the means for: obtaining a first integer value per shard allocation and a target integer value per shard allocation; generating a plurality of intermediate integer value per shard allocations, wherein the plurality of intermediate integer value per shard allocations define a step-wise progression from the first integer value per shard allocation to the target integer value of auxiliary integer value per shard allocations; for each pair of successive allocations: determining at least one range of hash values associated with data to be transferred between shards based on determining a difference between a first hash wheel distribution of shard allocations based on a first of the pair of successive allocations and a second hash wheel distribution of shard allocations based on a second of the pair of successive allocations; determining a shard identification from the first of the pair of successive allocations associated with the data to be transferred between shards; and determining a target shard identification from the second of the pair of successive allocations associated with the data to be transferred between shards; selecting and controlling the transfer of data associated with the determined at least one range of hash values between a shard based on the determined shard identification and the a target shard based on the determined target shard identification.

The means for determining at least one range of hash values associated with data to be transferred between shards based on determining a difference between a first hash wheel distribution of shard allocations based on a first of the pair of successive allocations and a second hash wheel distribution of shard allocations based on a second of the pair of successive allocations may further be for: generating the first hash wheel distribution of shard allocations by applying a defined hashing function to the first of the pair of successive allocations; and generating a second hash wheel distribution of shard allocations by applying the defined hashing function to the second of the pair of successive allocations.

The means for selecting and controlling the transfer of data associated with the determined at least one range of hash values between a shard based on the determined shard identification and the a target shard based on the determined target shard identification may further be for selecting rows from database tables associated with the determined at least one range of hash values.

The means for selecting rows from database tables associated with the determined at least one range of hash values may further be for: selecting rows up to a first limit number of rows from database tables associated with the determined at least one range of hash values; and determining whether further rows are to be selected and repeat selecting rows upto the first limit number of rows and until all rows to be selected are selected.

An apparatus comprising means for performing the actions of the method as described above.

An apparatus configured to perform the actions of the method as described above.

A computer program comprising program instructions [or a computer readable medium comprising program instructions] for causing a computer to perform the method as described above.

A computer program product stored on a medium may cause an apparatus to perform the method as described herein.

A non-transitory computer readable medium comprising program instructions for causing an apparatus to perform the method as described herein.

An apparatus may comprise a control module as described herein.

An electronic device may comprise apparatus as described herein.

A chipset may comprise apparatus as described herein.

Embodiments of the present application aim to address problems associated with the state of the art.

BRIEF DESCRIPTION OF DRAWINGS

To understand some embodiments, reference will now be made by way of example only to the accompanying drawings, in which.

DETAILED DESCRIPTION OF SOME EMBODIMENTS

The concepts as discussed in further detail hereafter in embodiments is the design of a control module suitable for implementing a controlled multi-phase management of the database. The implementation of a multi-phase control system as described in further detail hereafter may allow the creation of observable periods (which we may also call steps) within the database where store modules accessing the database are configured to handle the processing of data requests started in different phases of the control module. Additionally in some embodiments the control module may implement the migration of data collections in stages, wherein a portion of the data collections are migrated in each stage using the multi-phase management is discussed in further detail. Further embodiments describe the implementation of a hash wheel distribution employed as a look up device for identifying where data collections are stored and thus enable the efficient scanning of the data collections in the implementation of controlled multi-phase management of data collections.

Before discussing the (staged) multi-phase hash-wheel distribution look-up implementation of managed data collection operations we will first discuss an overview of a system which may employ a data collection system.

Figure 1:
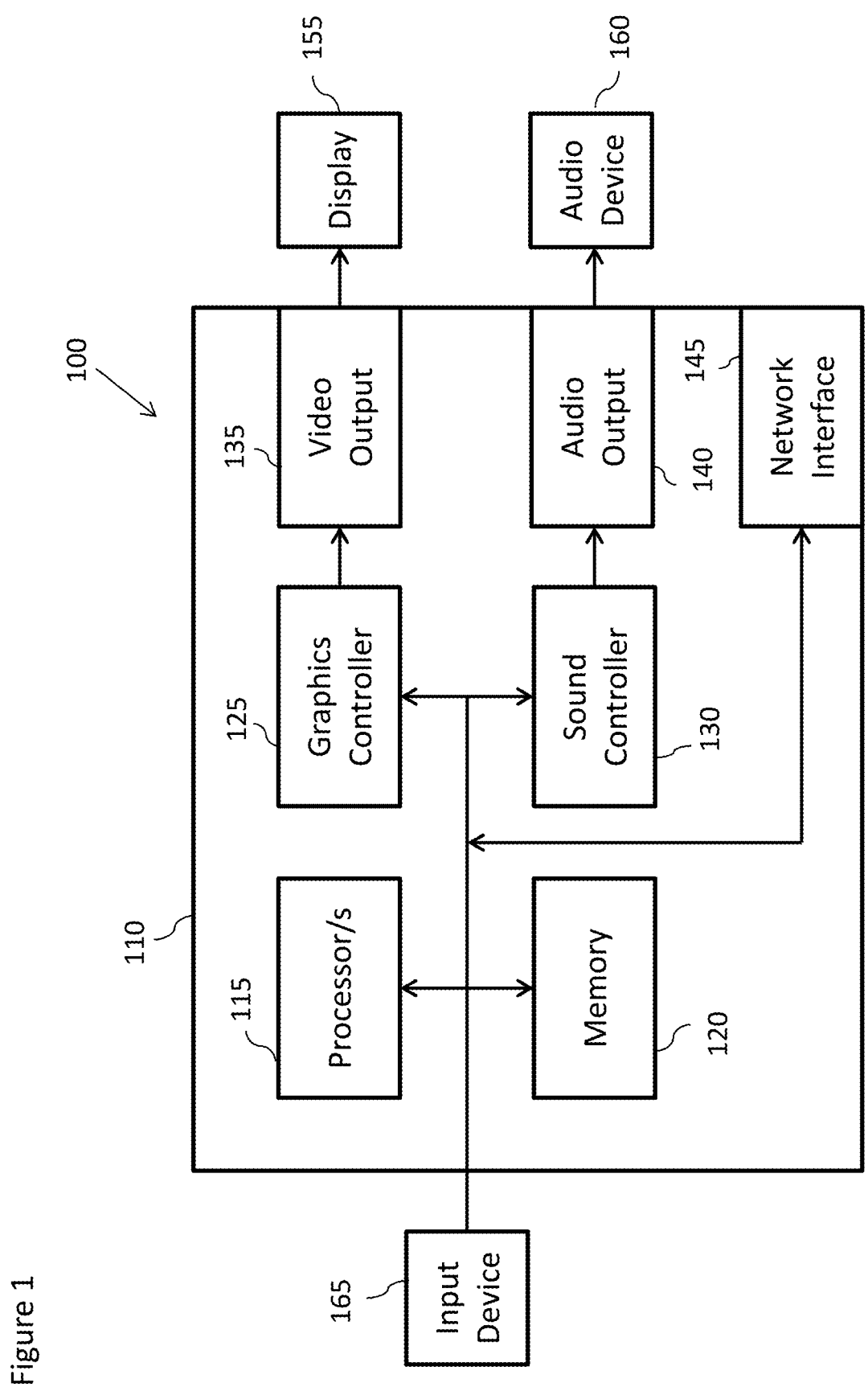
FIG. 1 shows an example computing device suitable for interacting with a database system of an embodiment.

For example a schematic view of a user device 100 suitable for accessing a data collection system according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
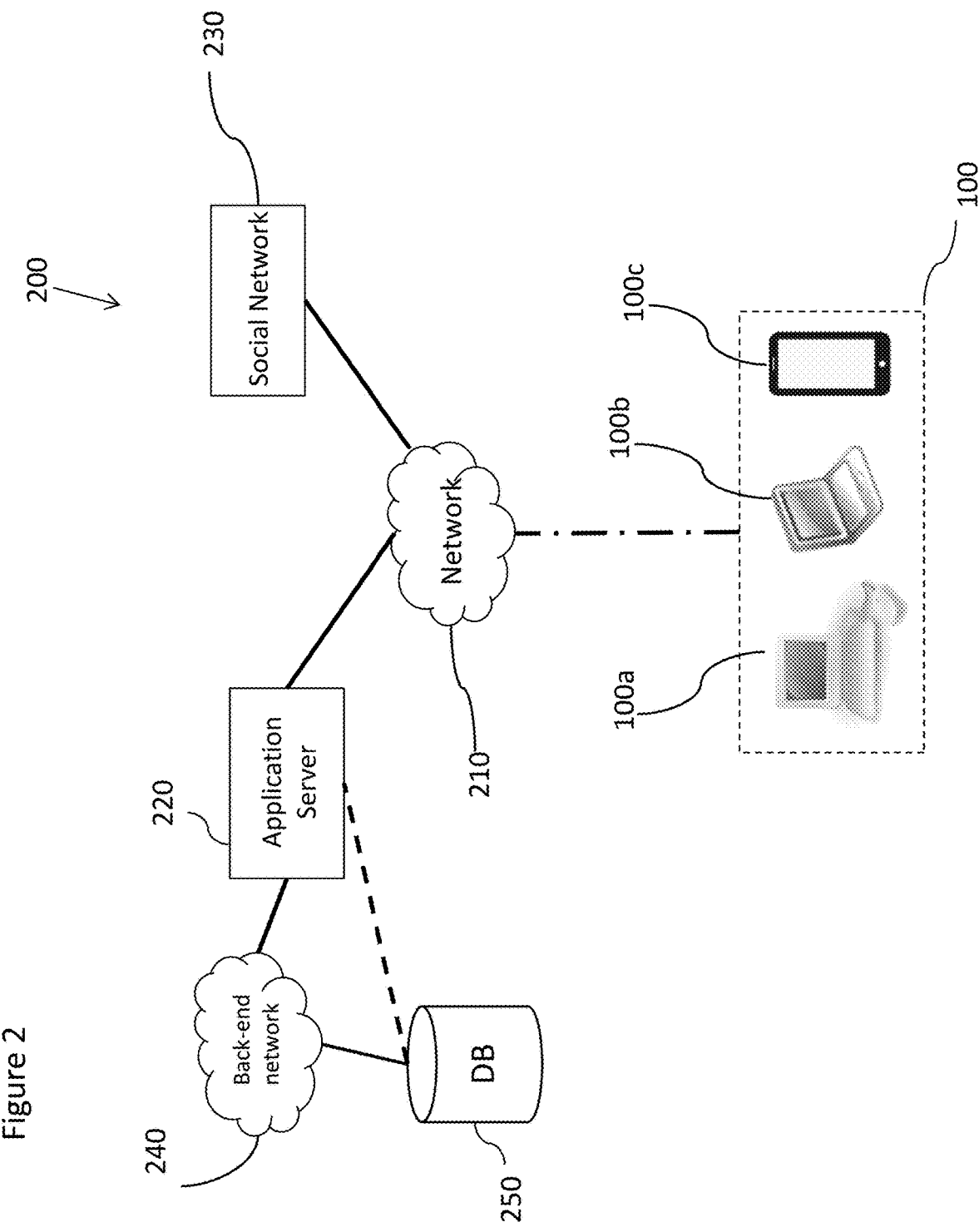
FIG. 2 illustrates an example system in which some embodiments may be provided.

FIG. 2 schematically shows an overview of the operation of the device 100 shown in FIG. 1 in accessing a system 200 comprising a suitable data collection system according to some embodiments. The system 200 comprises an application server 220 which may store or be in communication with a database 250 which may comprise the data collection and thus comprise information on game player's details, profiles, statistics, etc. In practice, although FIG. 2 shows one application server 220, and one database 250 it is understood that a typical system comprises multiple application servers and multiple databases. In other words the system may comprise one or more databases 250, as well as one or more application servers 220. Where more than one application server 220 is provided, the database(s) 250 may be provided in one database 250 or in databases across two or more application servers 220. In some embodiments the application server 220 may provide functions to one or more client user devices. In some embodiments the application server 220 may also have a games data function. This may comprise one or more units of memory to store the computer game program and user behaviour data, and a processor to run the games program and process the user behaviour data.

The application server 220 may communicate via a first network 210, for example the Internet, to one or more user devices 100, shown in the Figure by way of example as user devices 100a, 100b and 100c, and may further provide connections to a social network 230.

In some embodiments the application server 220 may be configured to communicate with the database 250 over a second network 240. The second network may be the same as the first network 210, optionally with logical/security separations as those known to the person skilled in the art. In some embodiments the application server 220 may be configured to communicate with the database 250 directly (such as shown in the dashed line shown in FIG. 2)

Figure 3:
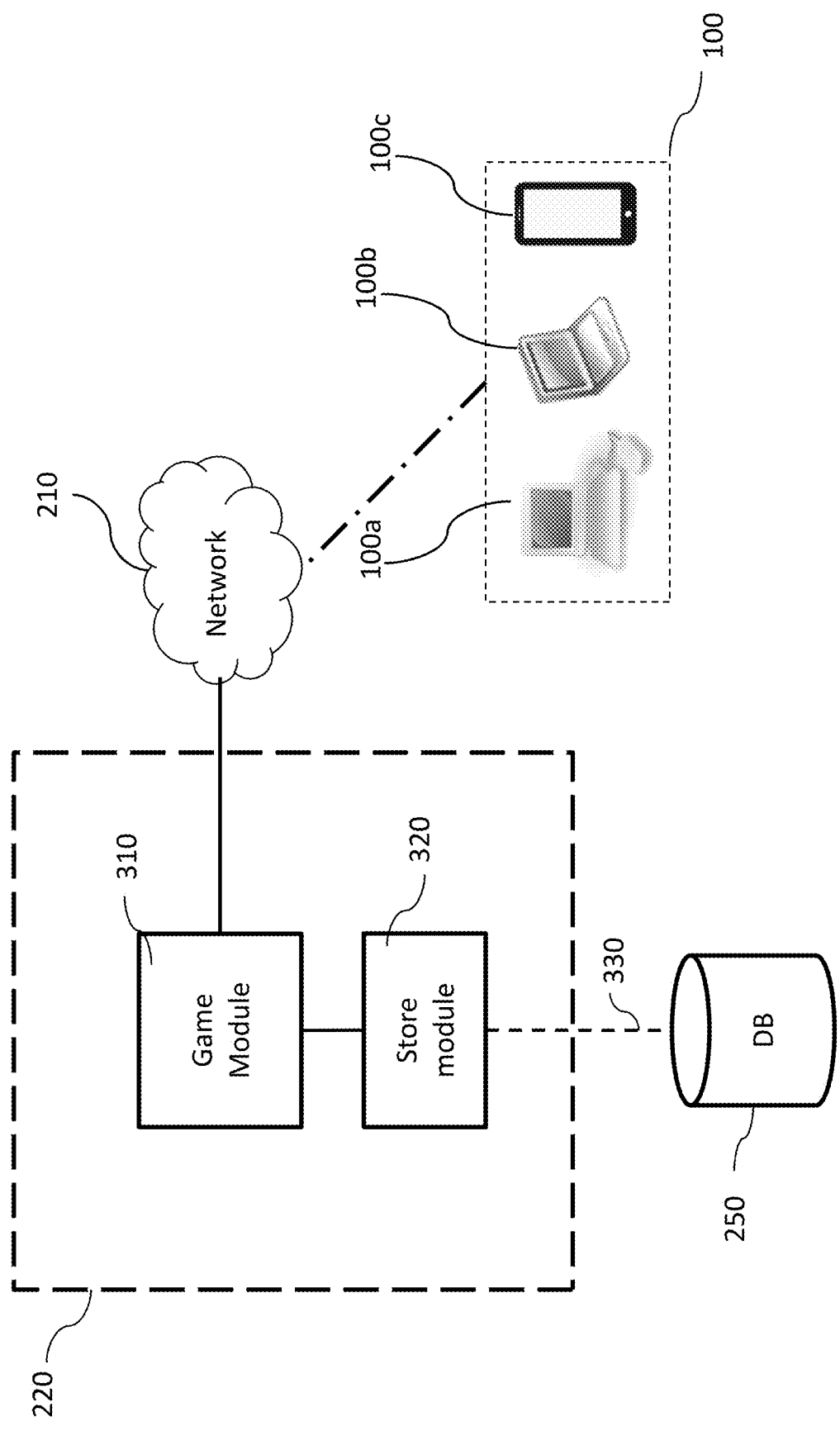
FIG. 3 shows an example application server according to some embodiments.

FIG. 3 illustrates an example application server 220 according to an embodiment. The application server is shown being able to communicate via a network 210, to one or more user devices 100 and further being able to communicate via the link 330 to the database 250. The example application server 220 may comprise a game module 310 suitable for implementing game behaviour. For example the game module 310 may be configured to communicate with a user device running a suitable game application and is able to transfer game data (for example game levels, new character data etc, high score table data, etc.) to the user device 100 and receive game data (for example level completion indicators, level score, and other game statistics) from the user device 100 (for example via network 210). This data may be stored and/or retrieved from the database 250 system. The accessing of the database system may be achieved via a store module 320.

Furthermore in some embodiments the application server 220 comprises a store module 320. The store module 320 may be configured to implement store behaviour such as described in further detail hereafter in such a manner that the game module 310 need not know the configuration or current state of the database system. In other words the store module 320 may be configured to receive requests for access to the database system from the game module and process these requests according to a set of defined rules such as described in further detail herein.

The store module 310 may be connected as shown to the database 250 via link 330 such as shown in FIGS. 2 and 3 by the dashed line. The link 330 may be wired, wireless and/or provided via or through networks such as the second network as shown in FIG. 2, as known to those persons skilled in the art.

The database 250 may comprise information regarding one or more users and/or one or more client devices. For conciseness the term "user" or "users" may also encompass a client device of that user or those users, unless specifically described otherwise. In practice, the database 250 may comprise information regarding many users. For example the database 250 may comprise information on thousands, may be even millions of users. The information stored in the database may be in the form of one or more data records. Each user may have a respective data record associated therewith.

Figure 4:
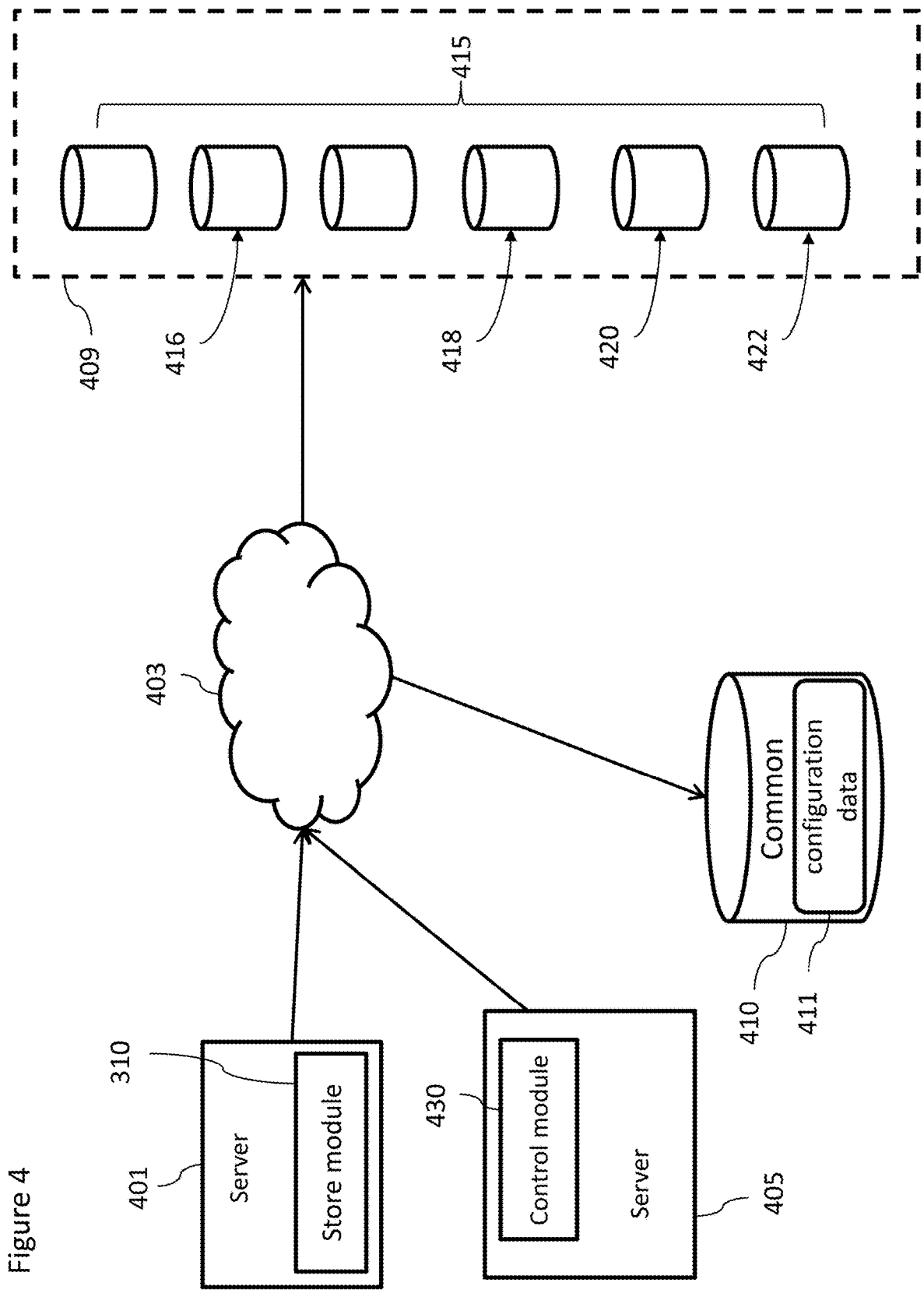
FIG. 4 shows an example database system.

Reference is now made to FIG. 4 which shows a system of apparatus, wherein the application server and store module shown in FIG. 3 is shown together with other components of a distributed database system according to some embodiments. A first server 401 (which may be considered to be the application server 220 as shown in FIG. 3 without the game module shown) is shown connected to a database layer 409 over network 403. Although the example systems described hereafter feature a common database system model it is understood that embodiments may be implemented using other database system models.

The first server 401 is shown employing a store module 310. The network 403 may be the second network. FIG. 4 further shows a second server 405, which in this example is a central node server, connected to the database layer 409 over network 403. The second sever 405 may comprise a control module 430. The control module 430 may be a module configured to control the movement of data in the database layer 409 based on a request for change activation allocations such as described in further detail later. Although the control module 430 and the store module 310 are shown in FIG. 4 as being implemented on separate servers it is understood that in some embodiments that both modules may be implemented on a single server.

The database layer 409 is shown comprising a plurality of servers 415. In case the application server stores user specific data, the database may comprise user profile information. For example the user profile information may include (by way of non-limiting example): identity information; address information; location information; payment and/or billing information (e.g. credit card details); game related information etc. of one or more users.

A game module may thus request a single record from the database by sending a 'select' or 'get' request for a single record to the store module 310. Alternatively a game module (operating on the server) may request a plurality of data records via the store module and the 'select' request may be transmitted for a plurality of records. The plurality of records may be a list of records and/or a range of records. The records may be in the form of "keys". A key may comprise an identifier which enables a record to be identified in the database. In some embodiments a key may comprise a unique identifier. In addition to the 'select' request, the game module (operating on the server) may via the store module 310 request modifications of stored data in the database by using data manipulation operations such as 'update', 'insert' and 'delete' requests as those known to the person skilled in the art.

Information in the database may be partitioned. The information may be partitioned within a server or across servers, or a combination of both. That is the database may be considered to comprise one or more parts. These parts may alternatively be referred to as "shards". Partitioning the database in this manner may facilitate storage of large amounts of information. Partitioning in this manner may also improve reliability of storage and/or retrieval of information. For example if one shard nears or reaches capacity, then information can be transferred to another shard which has capacity to receive more information. Also, if one shard becomes inoperable then the system may still be able to operate satisfactorily using the other shards.

In the embodiment of FIG. 4 the database layer 409 partitioned into a plurality of servers 415. In this embodiment a separate common database 410 may be used to store information (for example configuration data 411) about where data is located. In FIG. 4 the partitions or shards that are labelled for the examples shown hereafter are shard 0 416, shard 1 418, shard 2 420 and shard 3 422 where each shard is implemented on one of the servers 415.

The present inventors realise that there may be difficulties associated with storing large quantities of data records in databases. This may in particular be the case where the database(s) needs to be accessible at all times. For example where data collections are associated with a large number of users/clients that also may be geographically spread it may not be appropriate to shut down the databases during the 'night' and/or weekends to perform database maintenance. As explained above, it might be necessary to transfer data collections between shards for multiple reasons.

The concept as expressed in further detail hereafter is one where the control module is configured to manage the migration of a portion of the data collections from one shard to another shard in a phased manner and the store module able to process the access requests despite the possibility that there may be access requests which were started in different phases of the migration. The concept when implemented in the following embodiments is one wherein a control module is configured to manage the migration of data collections in an efficient manner and a store module able to handle access requests for the data collections in an efficient and error free manner.

One of the aspects of the concept as described hereafter is quick and efficient identification of shard locations associated with a current data collection and/or a potential (or in progress) migration data collection. In some embodiments the quick and efficient identification of shard locations is achieved by distributing data collections across the shards using a distribution known as a hash wheel distribution. The hash wheel distribution maps a hash (or other associated value) to an identified shard based on a known number of shard occurrences or activations. The hash (or associated value may be determined based on a known hash function applied to a database key value which identifies the data collection. In other words from the key value there may be determined a hash value based on a known function or mapping between the key value and the hash value. The data collections in the form of database table structures with rows and columns may be referenced by a key value (which may be a unique identifier identifying each row of the data collection table).

The hash value (or the hash value component of the combination) may then be located on a hash wheel (or circular mapping or hash ring) using a known or defined mapping function. Further every location on the hash wheel is configured to be associated with (or covered by) an occurrence of a shard. In other words the hash wheel may be considered to be constructed from an integer number of occurrences of the available shards. In such a manner any key (a hash or a combination value) can be mapped to a shard by identifying the shard that is allocated the hash (or combination) value on the hash wheel.

Figure 5:
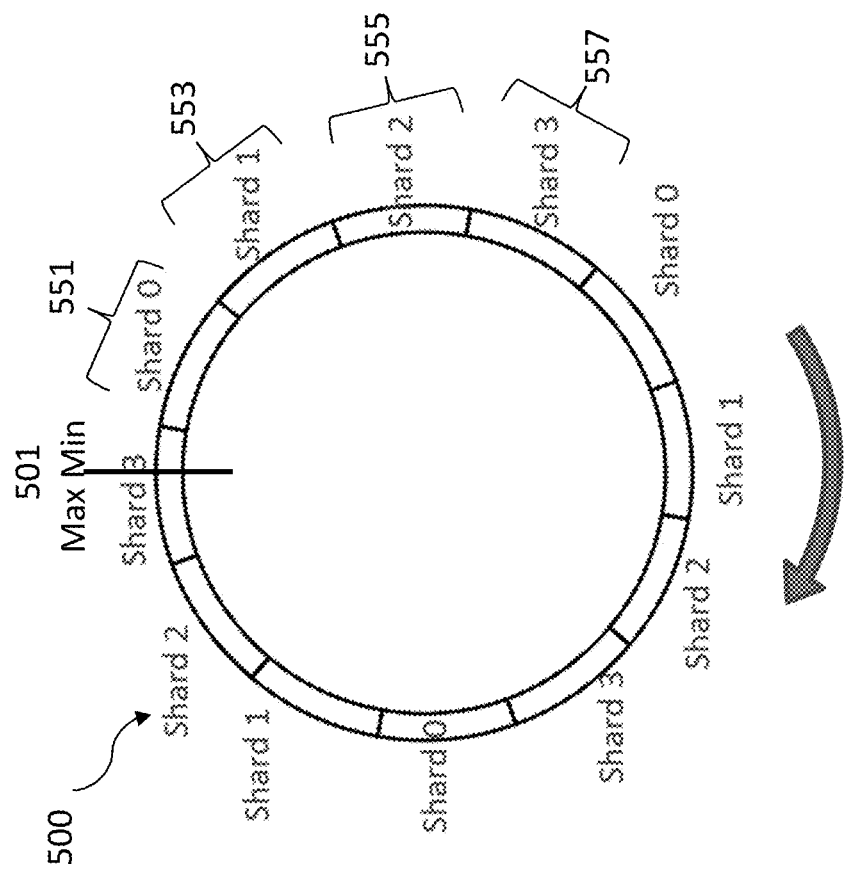
FIG. 5 shows an example hash wheel.

FIG. 5 illustrates an example hash value distribution over a hash wheel 500. The hash wheel 500 shows a max-min value 501 where the hash value wraps-round or loops from the maximum hash value to the minimum hash value. The hash wheel shown in FIG. 5 shows the hash wheel with occurrences (which may also be known as allocations) for four shards which occur on a repeating cycle. Thus FIG. 5 shows the first allocation 551 of the hash wheel 500 for shard 0, the first allocation 553 of the hash wheel 500 for shard 1, the first allocation 555 of the hash wheel 500 for shard 2 and the first (full) allocation 557 of the hash wheel 500 for shard 3. The allocations then repeat round the hash wheel values.

This distribution of destinations on a hash wheel may be a known consistent hashing algorithm. The advantages of implementing this arrangement are firstly when a shard is added, the added shard is added as a number of distributed allocations over the hash wheel like the already existing shards. This ensures a uniform distribution of the keys on all shards, both when shards are added or shards are removed. Furthermore when a shard is added, the added shard takes over a number of keys from existing shards, but other keys will not be affected. Therefore, there may designed a database where no redistribution of keys between existing shards occurs and only movement of keys between existing shards and the new added shard takes place during a phased migration.

In the embodiments described herein an integer number of occurrences per shard (which is also known as an activation value) specifies how many allocations the shard has in the hash wheel. Each allocation for a specific shard in the hash wheel starts at the hash value calculated from the shard number and allocation number, and continues until another shard location appears on the wheel.

An example of this is shown in FIG. 5 where the four shards (shard0, shard1, shard2, shard3) each occur on the hash wheel three times. As such it can be said that each shard is activated three times and has an activation value of 3. Furthermore shard activation values may be represented as an activation vector that defines for all of the shards the number of times they occur on the hash wheel. For example with respect to FIG. 5 the shards 0 to 3, which occur on the hash wheel 3 times each may be represented by the activation vector of [3, 3, 3, 3].

A more realistic or practical example would be a hash wheel with a shard activation vector of [2000, 2000, 0]. This example thus shows a database in which the data collections are distributed such that shard 0 is activated 2000 times (and thus occurs on the hash wheel distributing the data collections 2000 times), shard 1 is activated 2000 times (and thus also occurs on the hash wheel distributing the data collections 2000 times) and while shard 2 exists, it has no activation (and thus there are no occurrences on the hash wheel). In this example shard 0 would have 50% of the total data, shard 1 would have 50% of the total data, and shard 2 would have 0% of the total data. This is a more realistic example since the number of allocations needs to be at least >1000 to have a statistical probability of a good enough uniform distribution of the shard allocations in the wheel.

Although a conventional approach to identify potential data collections which are affected by a data migration between shards is to apply a conventional update function, the large number of rows expected to be migrated result in such an approach being impractical. Furthermore direct table operations does not help either. The large number of rows mean that it is not practical for the control module to both read all rows in all tables and perform hash calculations only to figure out what rows are affected by a step change.

The efficient identification of potential data collections which are affected by a data migration between shards may be achieved by storing the hash value (or associated value which in some embodiments may be known as a partition key value) within the database as an additional column on one of the database table structures and wherein the stored hash value is associated with the key value. This enables a search of the whole database structure to identify any data collections (rows) affected by the migration to be efficient as the search may be performed directly with respect to ranges of hash values as will be discussed in further detail hereafter.

Storing the hash value has the advantage that any search to identify potential data collections to be moved during the shard migration may be identified without the need to determine the hash values from the key values but rather a search of the stored hash values in the additional indexed database table column can be performed and the data collections to be moved in the migration identified directly.

For a given step (with an 'old' shard activation and a 'new' shard activation), it is possible to calculate the hash value ranges on the hash wheel that are affected by the move. Using the example step with 'old' shard activation [2000, 2000, 0] and 'new' shard activation [2000, 2000, 100] there are 100 hash value ranges affected by the change. Each hash value range covers an allocation on the hash wheel that has changed from shard 0 to shard 2 or shard 1 to shard 2.

Thus the rows affected can be found by performing range queries using the hash value (for example a PartitionKey value) column, such as:

SELECT . . . FROM TABLE WHERE ((PARTITIONKEY>=5436 AND
PARTITIONKEY<=5703) OR (PARTITIONKEY>=127580 AND
PARTITIONKEY<=133997) OR . . . )

However, the control module cannot select all rows in the table as one SQL Select operation as this action would disturb any other store modules currently accessing the database. Therefore, when scanning the table, a SQL SELECT LIMIT command is implemented to reduce the locking impact and operation time, as:

SELECT . . . FROM TABLE WHERE ((PARTITIONKEY>=5436 AND PARTITIONKEY<=5703) OR (PARTITIONKEY>=127580 AND PARTITIONKEY<=133997) OR . . . ) ORDER BY PARTITIONKEY ASC LIMIT 200

In order to enable the operation to select all of the rows be continuous the control module may define a variable X as the last found hash value (PartitionKey) from the query above. The next scan can then continue the scan by performing the operation such as:
SELECT . . . FROM TABLE WHERE PARTITIONKEY>=X AND ((PARTITIONKEY>=5436 AND PARTITIONKEY<=5703) OR (PARTITIONKEY>=127580 AND PARTITIONKEY<=133997) OR . . . ) ORDER BY PARTITIONKEY ASC LIMIT 200

The query above is repeated with updated X until no rows are returned.

However in some embodiments there may exist more rows with the same hash value (PartitionKey) than the SQL LIMIT value (especially for composite keys). In this case, the last found hash value (PartitionKey) would be same as the first, and the scanning pattern describe above does not work.

Furthermore for composite keys, all rows with the same main key need to be located on same shard. Thus where there are more sub-keys than the SQL LIMIT value the scan may cause unacceptable issues.

An example of which may be shown with respect to the following table

| Main-Key | Sub-Key | PartitionKey | Data |
|---|---|---|---|
| 123 | 0 | 5436 | . . . |
| 123 | 1 | 5436 | . . . |
| 123 | 2 | 5436 | . . . |
| 123 | 3 | 5436 | . . . |
| 124 | 0 | 880123 | . . . |
| 124 | 1 | 880123 | . . . |
| 124 | 2 | 880123 | . . . |

In this example if the SQL LIMIT is 3 (less than the amount of sub-keys for same main-key), the last found hash value (PartitionKey) would be 5436, and the second query would fetch the same rows again. In other words, the scanning would go into an infinitive loop.

In some embodiments therefore the hash value is determined and an additional value is added to the hash value before storing it in the additional indexed table column within the database along with the other data of the data collection. This additional value may be a pseudorandom value. The additional value is concatenated with the hash value such that the hash value are the upper bits (or most significant bits) and the additional value are the lower bits (the least significant bits). The combination values may then be stored. Thus the additional value is added or concatenated to the hash value (PartitionKey) before storing it in the table column. An example of the added value (ChaosHash) is a pseudorandom value that is combined with the hash value (PartitionKey) before their concatenation is written to each table as the modified hash value (PartKeyChaosHash) column. In such embodiments the hash key (PartitionKey) value is stored in the upper bits so the range concept or scanning or searching for transition ranges can also be implemented.

For example scenario may be to implement an example additional value (ChaosHash) range of 000000-999999. Then the scan may be implemented by:
SELECT . . . FROM TABLE WHERE ((PARTKEYCHAOSHASH>=5436000000 AND PARTKEYCHAOSHASH<=5703999999) OR (PARTKEYCHAOSHASH>=127580000000 AND PARTKEYCHAOSHASH<=133997999999) OR . . . ) ORDER BY PARTKEYCHAOSHASH ASC LIMIT 200

The variable X may be the last found modified hash value (PartKeyChaosHash) from the query above. Then the next scan can be continued by implementing the following:
SELECT . . . FROM TABLE WHERE PARTKEYCHAOSHASH>=X AND ((PARTKEYCHAOSHASH>=5436000000 AND PARTKEYCHAOSHASH<=5703999999) OR (PARTKEYCHAOSHASH>=127580000000 AND PARTKEYCHAOSHASH<=133997999999) OR . . . ) ORDER BY PARTKEYCHAOSHASH ASC LIMIT 200

The '>=' operator is implemented to cover the case when the limit result in a range of several rows with same modified hash (PartKeyChaosHash) value, which will cause some of the last found rows to be found again.

This when implemented in embodiments with a modified hash (PartKeyChaosHash) column produces an effective table scanning to enable the control module to very efficiently find all rows affected by a step change.

This method for efficient scanning of the tables to identify any rows within the data collection which are affected by the migration can be implemented by the control module. One of the advantages of implementing the migration of keys between shards using a hash wheel distribution is the ability to furthermore implement a stepwise series of small changes in shard activation. As each step moves only a small subset of the keys the probability of any single access request being affected by a migration at any specific time is reduced. In other words only a small number of data collections per step is affected by the migration and thus at any instance over the whole migration period the effect is smaller than performing a single step phased migration. Furthermore employing a hash wheel and hash value based phased migration has the advantage that typically existing shards, in other words shards which occur on the hash wheel, do not transfer or migrate data collections between themselves during a migration and thus typically data collections migrate from an existing shard (one with a positive integer number of occurrences or activations) to a new shard (one with a 0 number of occurrences or activations prior to the data collection migration).

Another aspect of the concepts as described hereafter is the manner in which the control module 430 is configured to transfer to the store module 310 information enabling the store module 310 to identify a data collection shard location, whether the data collection is affected by the migration and if so which phase in a defined multiphase controlled migration or transfer of data collection the control module 430 is currently in.

This information which enables the store module 310 to determine such information may in some embodiments be 'configuration' information retrieved from a common database 410. The common database 410 may therefore be used to store the configuration information (configuration data 411) which may be generated by a control module as it executes the phased migration.

The configuration data 411 may in some embodiments be stored in the common database 410 in the form of a database configuration file The store module and/or control module may in some embodiments be configured to read and/or refresh the configuration data 411.

In some embodiments the configuration information stored in the common database may comprise an activation vector which defines a current shard data collection distribution. Thus for a stable phase, one in which no migration of data collections is occurring, the configuration information may be used by the store module to determine the shard location of a data collection by applying the hash value associated with the access request to the current shard data collection distribution. For a transition phase, a phase in which migration of data may be occurring, the configuration information stored in the common database may comprise an activation vector which defines an 'old' shard data collection distribution and a 'new' shard distribution. By applying the hash value associated with the access request to the 'old' and 'new' shard data collection distributions it may be possible to determine whether the current access request is affected by the data collection migration operation and furthermore the locations of the 'old' shard and the 'new' shard.

In some embodiments the configuration data further comprises information on whether a data collection migration is in progress and thus whether the database is in a stable or transition mode, where a stable mode indicates that there is currently no data collection migration in progress and a transition mode indicates that there is a data collection migration in progress. Furthermore in some embodiments the configuration data further comprises an indicator of the current phase of the data collection migration in order to assist the store module when processing an access request.

In some embodiments the configuration data may be in the format 'configTxt', current/old activation vector, {new activation vector, phase value}

Where 'configTxt' is the information as to whether the data collection is in progress, and may be 'StableConfig' for a stable or no data collection migration mode of operation and may be 'TransitionConfig' for a transition or in progress data collection migration mode of operation. The current/old activation vector is the information defining the current or old hash wheel occurrences or activations for each shard. The new activation vector is the information defining the new hash wheel occurrences or activations for each shard after the data collection migration has occurred. The phase value is the information defining the data collection migration phase.

Thus for example a database in a stable phase and has a shard data collection distribution such that shard 0 occurs on the hash wheel (or is activated) 2000 times, shard 1 is activated 2000 times and while shard 2 exists, it has no occurrences or activations may have configuration data of
'StableConfig', [2000,2000,0]

As a further example the database may be implementing a data collection migration (transition mode) and it may be currently in transition phase 3. Furthermore the current or old activation vector defining the distribution of the shards may be defined such that shard 0 is activated 2000 times, shard 1 is activated 2000 times and while shard 2 exists, it has no activation. The target or new activation vector may also define the distribution of the shards such that that shard 0 is activated 2000 times, shard 1 is activated 2000 times and shard 2 is activated 100 times.

In such an example the configuration data may be
'TransitionConfig', [2000,2000,0], [2000,2000,100], 3.

This is only an example of configuration data formatting. Also the database configuration data which comprises the information being stored within the common database 410 is an example of how the database information may be stored, maintained and made available to store modules. The database information may be made available to the store modules according to any suitable manner. For example the database information may be retrieved from the common database 410 and cached with a suitable timestamp. The timestamp may help define a time after which any further requests may not use the cached information.

In some embodiments the common database 410 may be configured to generate the information in response to a request from the store module following a received access request. In other words the common database may be configured to generate for each query the database information in real-time in response to a database query.

In some embodiments the updating of the information is achieved in other ways. For example the control module may be configured to broadcast directly to store modules the configuration data. Furthermore in some embodiments the control module may intercept requests for data and return to the store module the configuration data. It is therefore possible to use the activation vectors and hash wheel function to determine the location of the data collection records which are to be moved and furthermore to determine the location to which the data records are to be moved to. These values can be determined based on the hash value associated with the access request data collection key value and applying the hash value to the hash wheel distribution defined by the activation vector defining the number of occurrences of each shard on the hash wheel.

In some embodiments the common database 410 may be configured to generate/update the database information on a regular interval to ensure that the database information is up-to date.

In the following examples a status of the database may be defined by the configuration data values. The configuration data values may indicate a stable mode or a transition mode. A stable mode is one where there is no movement of data collections in progress and thus the database is stable. A transition mode is one where movement or migration of data collections is in progress and thus the database is in a transitional state where potentially a data collection may be about to be moved or in the process or being moved from one shard to another. The transition mode can furthermore be divided into phases. As the movement of data collections does not occur in isolation the database (and thus the behaviour of the store module) is designed so that the database is able to process data collection access requests from store modules started in different phases. This effect of 'overlapping phase' handling by the database may define observation periods as discussed in further detail later.

In other words (and as shown in the following examples) there is a managed phased database migration comprising a number of phases. The database is further designed such that there may be observed periods where 'overlapping' phase access requests (or threads) occur. An overlapping phase access period is where within the database system as a whole or within each store module there may be some active access requests (or threads) which started in a defined phase and other active access requests (or threads) which started in an earlier or later phase.

Figure 6:
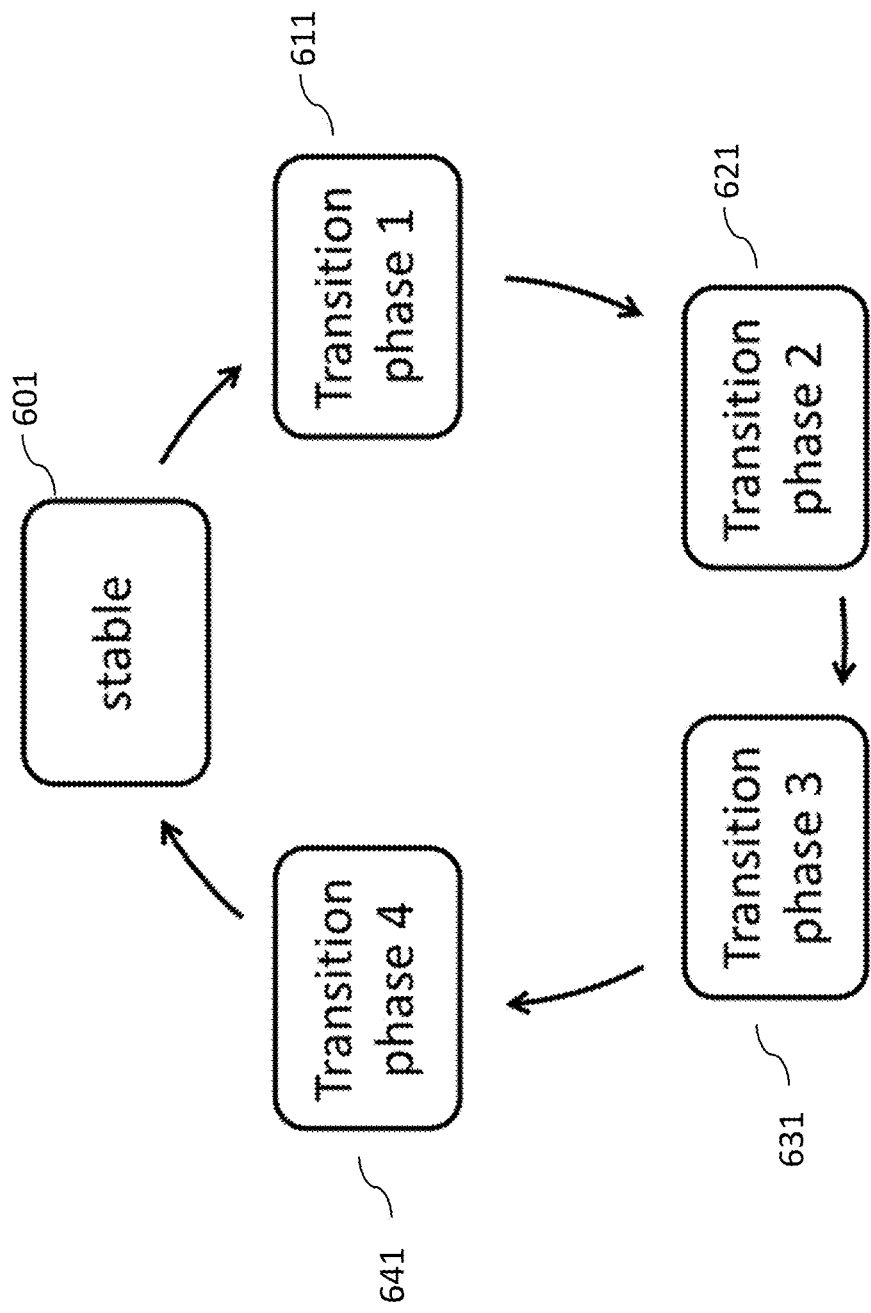
FIG. 6 shows an example range of configuration phases according to an embodiment.

FIG. 6 shows an example flow diagram of a phased database migration. These phases, as will be described in further detail, may be implemented in the control modules to control the movement of data collections from one shard to another shard. FIG. 6 thus shows a stable mode 601. After a determined period the control module (and following a request to move data collections) passes to a transition phase 1 611. The control module after a further period may pass to a transition phase 2 621. The control module after another period may pass to a transition phase 3 631. This may continue such that the control module may then furthermore pass to transition phase 4 641. After this transition phase (and following the completion of the migration of the data collections) the control module may then pass back to the stable mode 601.

The control module may control the implementation of the phased migration. This is described with respect to FIG. 7 which shows a flow diagram of an example phased migration implementation loop.

In some embodiments the control module is configured to control the phased migration operation and further configured to enable the store module to access the database during the phased migration by defining phase periods.

The operations of the control module in controlling the implementation of the phased migration operation may be performed by a series of loops where each loop represents the control module in a different phase.

Figure 7:
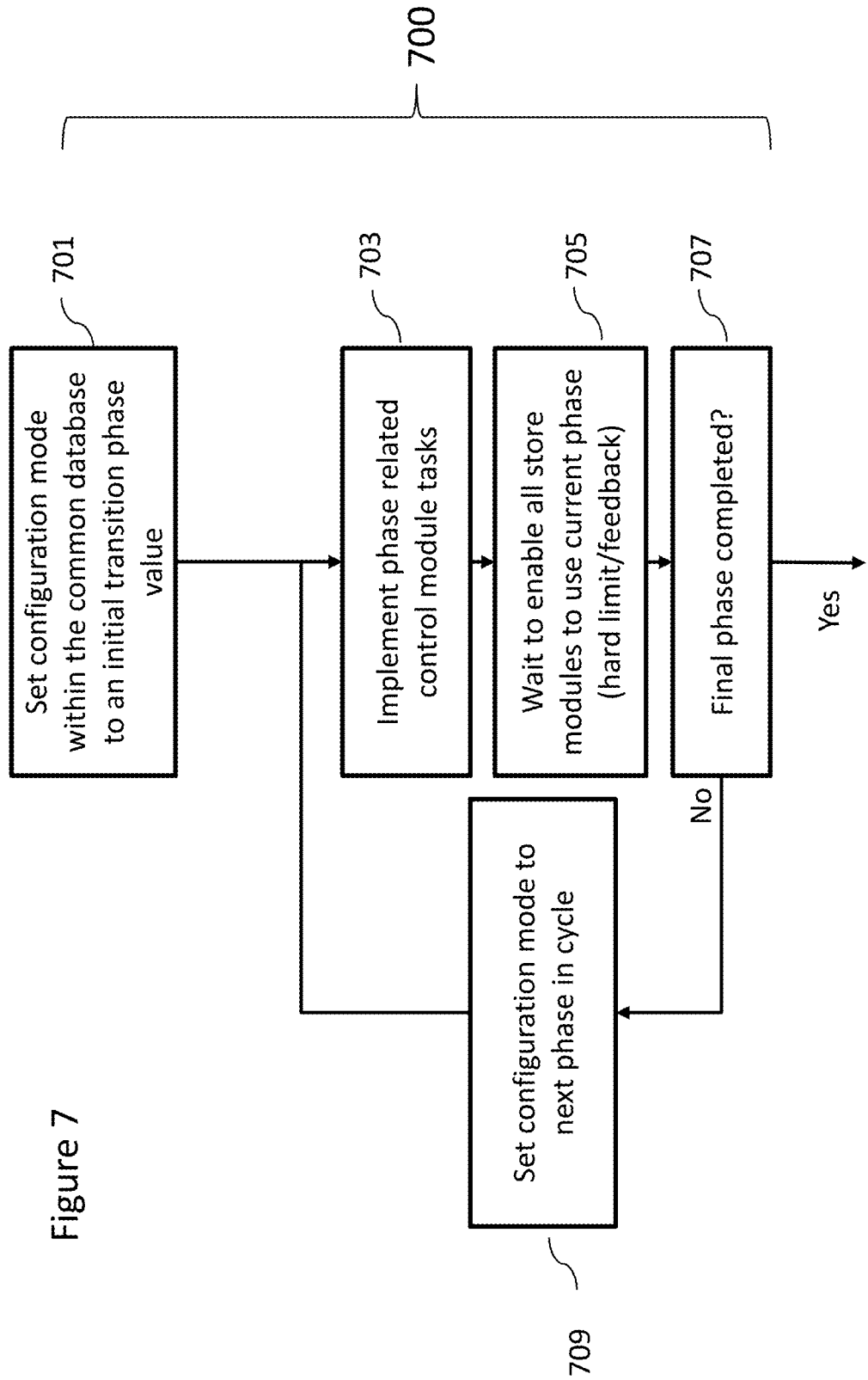
FIG. 7 is a flow chart of a method for implementing a multi-phase/stepped control module according to an embodiment.

The phased migration operation may thus begin by setting the configuration data value within the common database to an initial transition phase value. The operation of setting the configuration data value within the common database to an initial transition phase value is shown in FIG. 7 by step 701. Thus for example as shown with respect to FIG. 6 the control module may set the configuration data 411 value to indicate that the control module is starting transition phase 1.

Having initialised the multiphase movement of data collections between shards, or set the configuration data to an initial (or in later iterations a new) phase the control module is configured to implement any phase related control module tasks associated with the current phase or configuration mode value.

The operation of implementing any phase related control module tasks is shown in FIG. 7 by step 703.

In some embodiments the next operation (or one which may be performed in parallel with the phase related control module task) is to wait until all of the store modules are only implementing the current phase. This waiting may be implemented in any suitable manner.

This wait may be a passive operation, in that the wait involves no interaction with a third party. For example in some embodiments the control module is configured to wait a determined time period, the determined time period being calculated such that all of the store modules have received the current phase instruction from the control module, are implementing the current phase and furthermore that all of the store modules running threads initialised under the previous phase have finished.

The wait may be in response to an active transaction. In some embodiments the control module is configured to request an acknowledgement from each store module when all threads started are operating in a new phase. The acknowledgement may thus comprise information that the store module is only implementing 'current' phase threads or processes. The control module may therefore wait until acknowledgements have been received from all of the store modules. In some embodiments the control module may determine configurations of each store mode (either by actively polling them or by requesting an acknowledgement when the store module retrieves the current phase value) and generate a message for the control module when all store modules are implementing and executing the same phase threads.

The operation of waiting a determined period is shown in FIG. 7 by step 705.

Having implemented any phase related control module tasks associated with the current phase and waiting for the store modules to implement the current phase the control module may be configured to determine whether a final phase has been performed.

The operation of determining whether the final phase has been performed is shown in FIG. 7 by step 707.

Where the final phase has been performed the control module is configured to end the phased migration. As described previously, this then will cause the control module in some embodiments to change to a stable mode of operation and perform any stable phase related control module tasks (for example where configuration data values in the common database are used to indicate to the store module the current phase of the migration then the control module may be configured to update the configuration data).

Where the final phase has not been performed then the control module is configured to change the phase to the next phase in the cycle.

The operation of setting the configuration mode to the next transition phase in the cycle is shown in FIG. 7 by step 709. The control module may then be further configured to implement the next phase related control module task. This is shown in FIG. 7 by a loop back to the step 703 where the control module may be configured to implement the 'new' phase related tasks.

Figure 8:
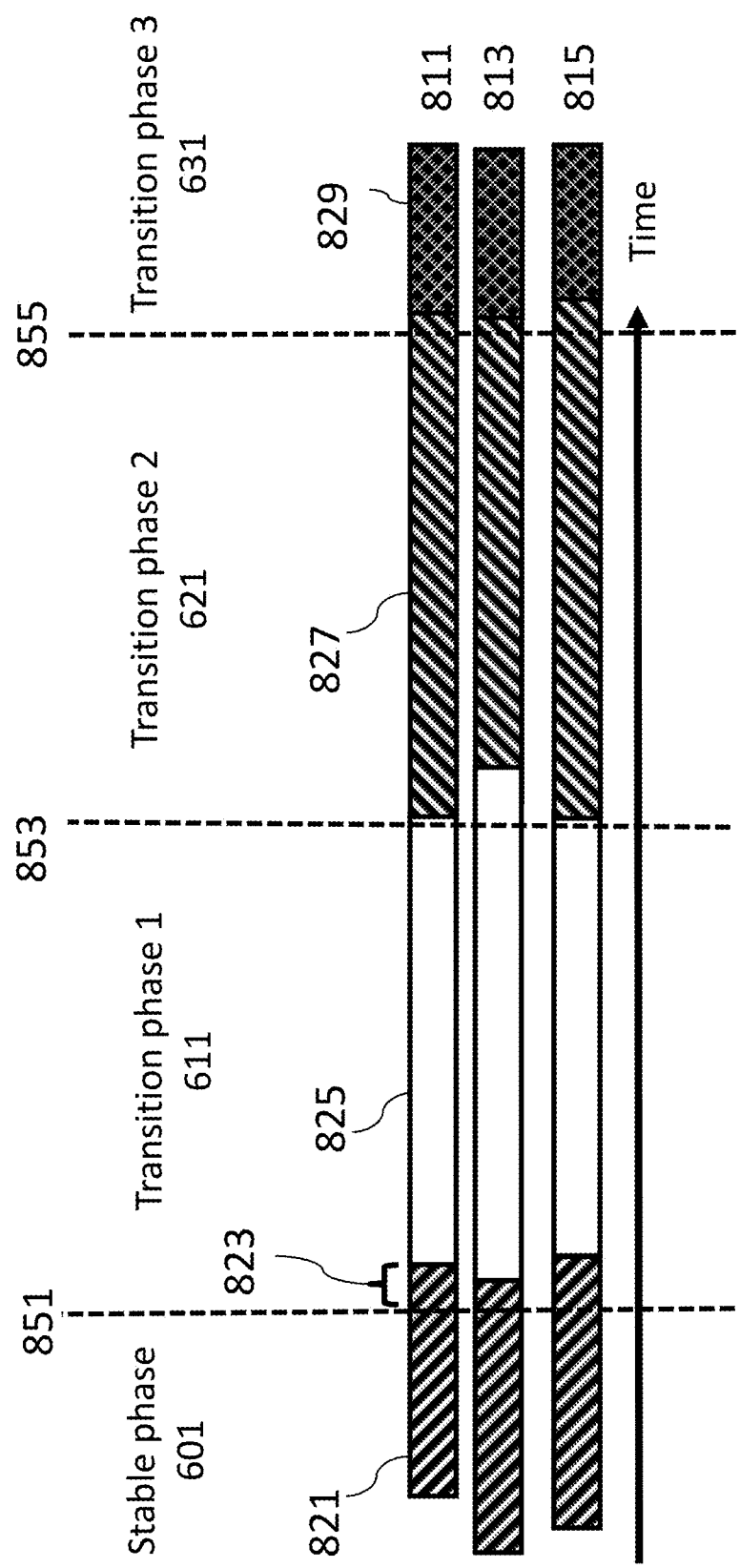
FIG. 8 is a schematic time line view of multiple store modules becoming aware of the control module phases within a system according to an embodiment.
Figure 9:
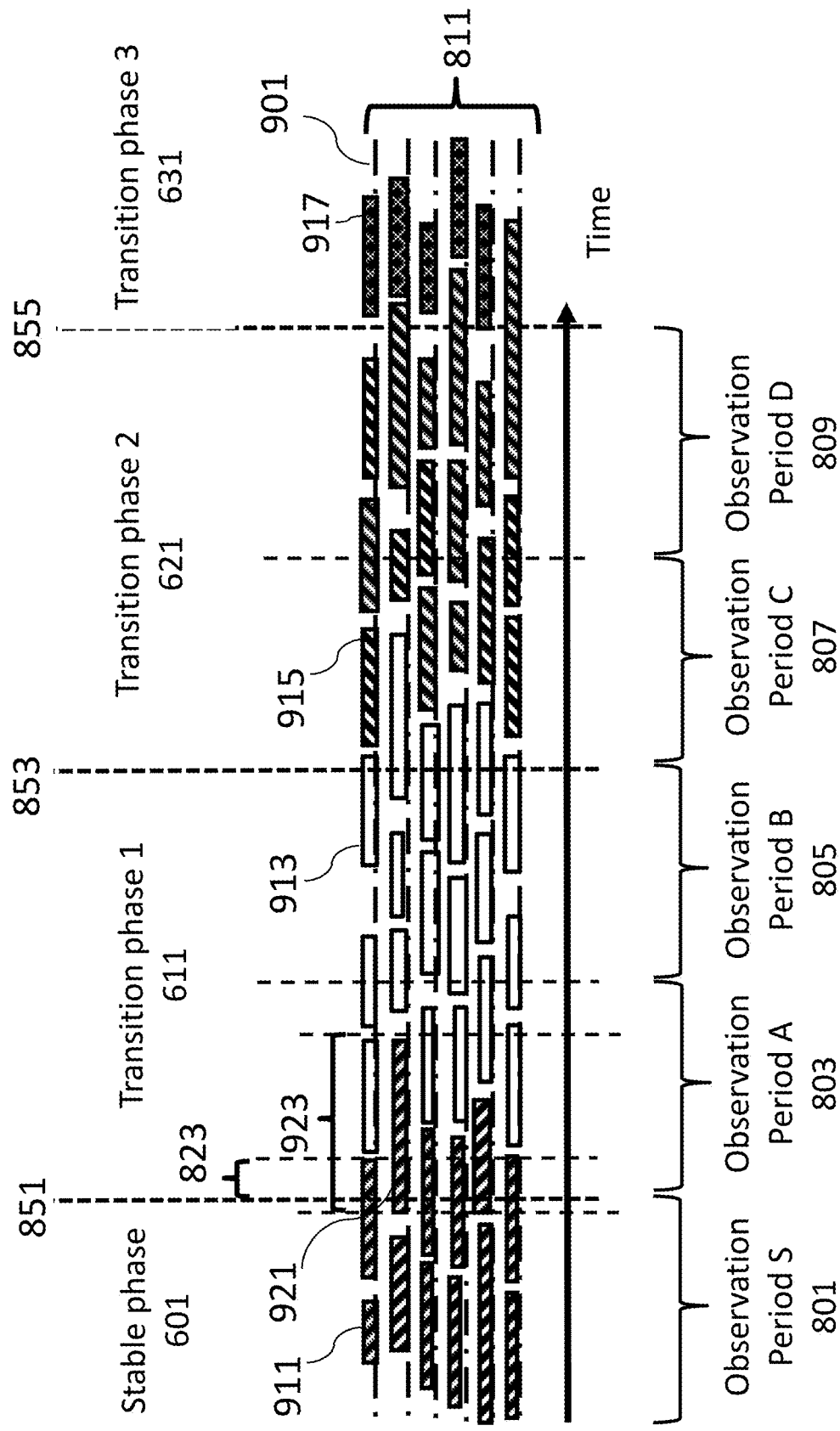
FIG. 9 is a schematic time line view of threads within a store module as shown in FIG. 8 according to an embodiment.

Although the above phased database migration implemented with respect to the control module only has one phase at a time, this is not true for the store modules as is shown with respect to FIGS. 8 and 9.

FIG. 8 shows in a graphical timeline for multiple example store modules and awareness with respect to example control module phases (and transitions between phases. Each horizontal block shows a store module. For example FIG. 8 shows a first store module 811, a second store module 813 and a third store module 815. FIG. 8 thus shows (from the point of view of the control module implementation) an initial stable phase 601, a first transition 851 to the transition phase 1 611, a second transition 853 to a transition phase 2 621 and a third transition 855 to a transition phase 3 631. On the time line is shown shading indicating when each store module becomes aware of the current phase implemented by the control module.

Thus with respect to the first store module 811 there is shown with a downward diagonal shading a time 821 where the module is aware of the stable phase (and therefore any thread on the store module started at this time would be 'started' within the stable phase). Furthermore is shown a no shading time 825 where module 811 is aware of the transition phase 1 611 (and therefore any thread on the store module started at this time would be 'started' within the transition phase 1). There is shown a difference in time 823 between the control module transitioning from the stable phase 601 to the transition phase 1 611 and the first store module 811 becoming aware of it.

There is also shown an upward diagonal shading time 827 where the store module is aware of the transition phase 2 (and therefore any thread on the store module started at this time would be 'started' within the transition phase 2).

Also with respect to FIG. 8 there is shown an outlined diamond shading time 829 where the store module is aware of the transition phase 3 (and therefore any thread on the store module started at this time would be 'started' within the transition phase 3).

As can be seen in FIG. 8 the 'delay' between the transition implemented by the control module and the awareness of the transition on the store modules may vary from transition to transition and from store module to store module. This 'delay' is one factor which is accounted for in the embodiments as described herein and further described with respect to FIG. 9.

FIG. 9 shows for the first store module 811 (as previously shown in FIG. 8) various example access threads and their starting and stopping times as rectangular boxes 811, 813, 815, 917. In the example shown in FIG. 9 the store module comprises multiple processors or processor cores on which the threads start and stop and which are shown as the horizontal lines such as line 901 on which the blocks are organised. Furthermore each of the threads is shown in FIG. 9 with a shading indicating the phase in which each thread was started. Thus for example thread 911 with a downward diagonal shading was started within the stable phase. The thread 913 with no shading was started within the transition phase 1, the thread 915 with upward diagonal shading was started within the transition phase 2 and the thread 917 with outlined diamond shading was started within the transition phase 3.

As described with respect to FIG. 8 there is a delay between the control module implementing a phase change and the awareness of this phase change at the store module. FIG. 9, for example, shows the delay 823 between the control module implementing a transition between the stable phase to the transition phase 1 and the awareness of the transition at the store module. After this initial 'delay' any new thread started by the store module will implement behaviour determined by the 'new' phase.

However there is potentially a second 'delay' in the implementation of the control module transition at the store module. As shown in FIG. 9 although the store module may be aware of the transition and any new thread is started with the new phase due there may be existing threads which have not yet stopped. For example thread 921 which has a completion time 923 does not stop until after the store module is aware of the phase transition. As such there may be an 'safe' wait time before the store module is only implementing current phase threads may be defined. This 'safe' wait time may be defined as a combination of the expected maximum awareness time, and an expected maximum thread start-stop or duration time.

Based on these 'safe' wait times there is shown in FIG. 9 observation periods, such as period S 801 within which all active access requests are stable phase 601 requests, period A 803 within which there may be some active threads started in the stable phase and some in the transition phase 1, period B 805 in which all active threads were started in transition phase 1, period C 807 in which there may be some active threads in transition phase 1 and some in transition phase 2 and period D 809 where all active threads are in transition phase 2. As previously described, there is a major problem regarding how the control module implements the migration of data collections while the store modules attempt to access the database. The known approaches have previously been configured to lock the data and to enable all store modules accessing the data to implement a behaviour change at exactly the same moment in time with no ongoing database operations in order to prevent any possible overlapping phase access operations such as those shown in FIGS. 8 and 9.

As a first example we will discuss the behaviours of an example control module phased migration and store module using the five phase (stable phase, transition phase 1, transition phase 2, transition phase 3, and transition phase 4) system shown in FIG. 5 using the database structure, configuration data and shard distributions described above. This example phased approach is one example of a phased data collection migration. In other embodiments there may be more than or fewer than four managed transition phases in a (staged) data migration. Furthermore the example described hereafter is one where the data collection migration is one where the activation vector changes from [2000, 2000,0] to [2000,2000,100].

The stable phase 601 may, as described previously, be where the database system is in a stable mode and there is no data collection migration or redistribution being performed. In other words in the database there are no keys/data/records being moved from shard to shard as part of a data collection migration. This may be identified by a stable configuration data value.

For example the control module may be configured to set the configuration data 411 using the example format defined above to 'StableConfig', [2000,2000,0].

The store module behaviour within the observation period S as shown in FIGS. 8 and 9 is one in which all access requests are implemented by the store module to access the data collection at the shard indicated by generating the access request data collection hash value and applying it to the activation vector distributed hash wheel.

The start (or transition 851) of the transition phase 1 611 causes the control module to update the configuration data 411 within the common database 410 (using the above example format for the configuration data) to 'TransitionConfig', [2000,2000,0], [2000,2000,100], 1.

As soon as a store module determines the control module initiated change to the transition phase 1 611 (for example by retrieving the configuration information from the common database when executing a new access request), the store module may start new access requests (either using the determined single shard location as discussed later where the 'new' and 'old' shard locations are the same location) by attempting to read from the 'new' shard location as determined by the new vector applied to the hash wheel but to fall back to using the 'old' shard location as determined by the original vector applied to the hash wheel for the data collection if the location in the new shard does not exist. In other words where there is no data collection (or table row) at the new shard location to read the old shard data collection (or table row). Furthermore with respect to a write/update transaction the store module may be configured to acquire all rows in both the new shard location and the old shard by locking existing rows and inserting dummy rows where rows do not exist. The store module may then be configured to write all updates to the new shard only if any rows associated with the key value already existed there, otherwise the store module may be configured to write to the old shard.

Within the observation time period 805 all of the threads executed on the store module will be executing transition phase 1 behaviour. In other words all of the stable phase threads would have finished.

Similarly following the point of initiating 853 transition phase 2 621 the control module is implementing transition phase 2 621 behaviour and in some embodiments is configured to update the configuration data 411 within the common database 410 (using the above example format for the configuration data) to 'TransitionConfig', [2000,2000,0], [2000,2000,100], 2.

Transition phase 2 is a phase primarily defining a change in behaviour within the store module when attempting to access the data collections and is implemented as a precursor phase to transition phase 3 to ensure that all store module operations which are started during transition phase 1 have completed before the control module implements the operations of transition phase 3.

Thus the store module, as soon as the store module determines the control module initiated change to transition phase 2, is caused to process access requests using the determined single shard location as discussed later where the 'new' and 'old' shard locations are the same location or such that read access requests started in transition phase 2 are read from any new shard location and fallback to the old shard if the data collections (rows) do not exist at the new shard location. Furthermore with respect to a write or update request all of changes are performed on the data collection (rows) of the new shard location, and therefore the new shard is the 'updated' shard. The strategy is thus to always lock the new shard first, then also lock the old shard. This locking order is independent of what shard is updated. The transaction in the updated shard is committed, while the transaction for the other shard is rolled back. This ensures within the servers that the rat-race to perform an operation on a same row will be handled sequentially by the database engine. It also ensures that undetected deadlocks between multiple database engines can be avoided.

As described earlier there is an observation period D within which all store module access requests that are active were started while the store module had implemented transition phase 2 621.

The control module, having implementing transition phase 3 631 is in some embodiments caused to update the configuration data 411 within the common database 410 (using the above example format for the configuration data) to 'TransitionConfig', [2000,2000,0], [2000,2000,100], 3.

The control module within transition phase 3 is configured to perform the migration of any identified data collections from one shard to another shard. Thus the control module during transition phase 3 is configured to identify data collection rows and copy these from an 'old' shard to a 'new' shard as part of the data collection migration. The control module may in some embodiments use an affected row select operation for rows that are affected by the change. The control module may then read all selected rows from the old shards, and perform a SQL INSERT IGNORE operation into their new shards. Since the SQL INSERT IGNORE operation will only insert rows whose primary key is missing this will effectively copy all missing rows to the new shard without requiring the overhead of row locks that are needed by the store and without disturbing the running store modules. Furthermore the control module may then delete the identified rows in the old shard.

The store module behaviour as soon as the store module determines the control module initiated change to transition phase 3, is caused to process access requests in the same manner as described with respect to in transition phase 2 621 (using the determined single shard location as discussed later where the 'new' and 'old' shard locations are the same location or) such that read access requests are read from any new shard location and fallback to the old shard if the data collections (rows) do not exist at the new shard location. Furthermore with respect to a write or update request all of changes are performed on the data collection (rows) of the new shard location, and therefore the new shard is the 'updated' shard.

There may be an observed time period (which may be called F) where all store module access requests that are active were started while the database is in transition phase 3 631.

Also, although not shown, with respect to transition phase 4 641 the control module may be caused to implement transition phase 4 641 and update the configuration data 411 within the common database 410 (using the above example format for the configuration data) to TransitionConfig', [2000,2000,0], [2000,2000,100], 4.

The store module behaviour with respect transition phase 4 may further be caused to process any access requests by implementing read and write transactions using the new shard location only.

There may be a defined time periods G (where the store module may be handling active requests initiated in transition phase 3 and 4) and H where all store module access requests that are active were started while the control module was within transition phase 4 641.

Finally, with respect to the passing back to the stable phase 601 from the transition phase 4 641 the control module may be configured to indicate this change by setting the configuration data 411 within the common database 410 to the string 'StableConfig', [2000,2000,100].

The store module behaviour with respect to access requests started when the 'new' stable phase is implemented by the store module by using the stable phase determined shard location in the same manner as described before but for the new activation vector.

In some embodiments the phases may be merged where the access request behaviour is the same and thus reducing the number of stored configurations.

As such the database system is configured such that the control module phased migration operation is clearly defined on a phase by phase basis. Also the database system is configured such that store module shows observation periods where the access requests were all started in the same migration phase and also periods where there are access requests started in neighbouring or adjacent migration phases.

In such a manner by implementing the stable and four transition phases the behaviour of the control module in migrating the data and the store module in accessing the data is controlled such that locking of the database is not required and furthermore knowledge of the shard to read from or write to may be determined accurately and without data being out-of-date when being read or data being corrupted when being written to. As such the movement of data collections are rendered invisible to a gaming server that wishes to retrieve data collections or write to data collections as the store module is able to implement the behaviour rules in a step wise manner which is associated with the phase value.

Figure 10:
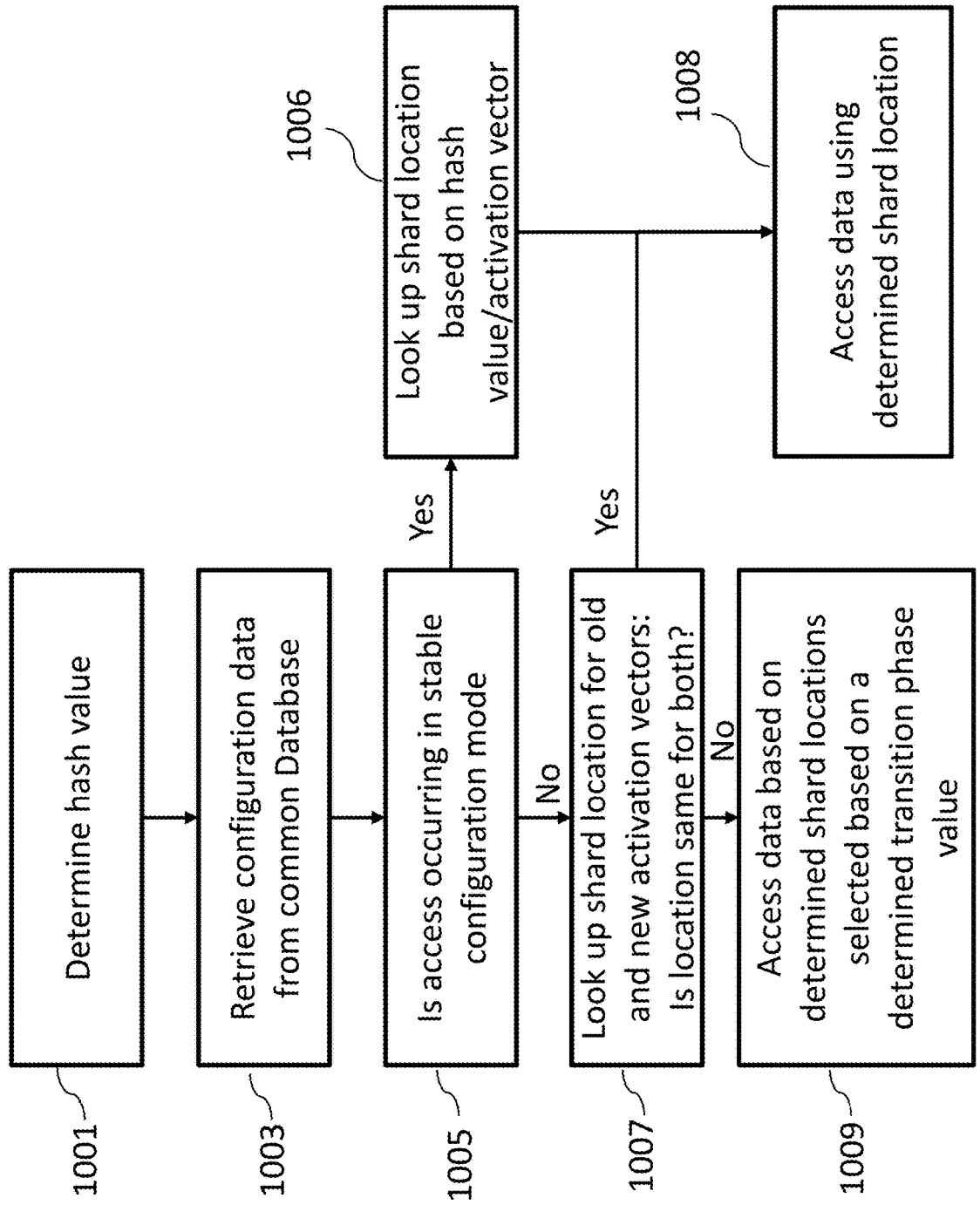
FIG. 10 is a flow chart of a method for implementing a store module according to an embodiment.

Having described in some embodiments the control module and store module implements the phased migration and the distribution of the data collections using hash values applied to a hash wheel FIG. 10 shows an example flow diagram which shows in further detail the operations of the store module having received an access request. The access request may comprise a key or key range of values associated with the data wished to be accessed.

Before the store module attempts to access data for a requested key, it needs to resolve where the key is located and the step behaviour (potentially determined by a phase or overlapping phases) to follow in accessing the data.

This location may be a single location when the database migration is in a stable phase or when the database migration is currently in a transition phase and the result of resolving the location of the shard results in the current and new shard activations location being the same (in other words the record is not affected by the current migration). However this location may be one of two locations (an 'old' and 'new' location) when the database migration is in a transition phase (or was in a transition phase for overlapping phase periods) where resolving the shard location may produce a different value for the 'old' and 'new' activation vectors (in other words data migration is in progress).

FIG. 10 for example shows a first step wherein the store module is configured to process a data/key access request to determine a hash key value based on the key value.

The operation of determining the hash key value is shown in FIG. 10 by step 1001.

The store module may in some embodiments be configured to determine the current migration or transition phase (for example by retrieving configuration data 411 from a common database 400, receive broadcast configuration information or to retrieve from a local store previously transmitted configuration data or any other suitable manner).

The operation of determining the data migration phase (for example as shown in FIG. 10 retrieving the configuration data from the common database in step 1003).

The store module may then be configured to determine whether the database is in a stable phase (for example when determining the migration or transition phase the database configuration data may comprise a 'StableConfig' string indicating that the database is in a stable phase or a 'TransitionConfig' string indicating that the database is not in a stable phase).

The operation of determining or checking whether the database is in a stable phase is shown in FIG. 10 by step 1005.

Where the database is in a stable phase (for example within observation period S as shown in FIGS. 8 and 9) the store module may determine that the requested record or records from the data collection are each located at a single (location) shard. The store module may then use the configuration information (for example the activation vector) and the hash value to determine the location of the shard. In other words the store module may be configured to 'look up' the shard location associated with the requested record.

The operation of looking up a shard location having determined a stable configuration mode is shown in FIG. 10 by step 1006.

Furthermore having looked up or determined the shard location the store module may be configured to use the shard location to access the database and perform the requested access operation.

The operation of using the shard location to access the data is shown in FIG. 10 by step 1008.

Where the database is not in a stable phase (for example the database configuration data has a 'TransitionConfig' string value) then the store module may be configured to determine whether, for the requested data access, the application of the hash value to the old and new activation vectors (also determined from the configuration data) produces the same shard location. In other words whether the current migration being implemented by the control module has any effect on the requested data record.

The operation of looking up and determining whether the shard location for the old and new activation vectors applied to the hash value is shown in FIG. 10 by step 1007.

Where the location of the shard for the old and the new activation vectors is the same (in other words the migration has no effect on the requested data and there is only one possible shard location) then the store module may use the single determined shard location to access the data. In other words pass to the step 1008 of FIG. 10.

Where the location of the shard for the old and the new activation vectors is not the same (in other word the migration has an effect on the requested data and there is a 'new' and 'old' location) then the store module is configured to access the data based on the determined 'new' and 'old' shard locations and further based on the determined transition phase store module behaviour such as described previously and summarised in the following table.

| Determined Phase | Store module behavior using 'new' and 'old' shard locations |
| --- | --- |
| Transition Phase 1 | Use new shard if and only if rows exist there. Otherwise use old shard |
| Transition Phase 2 | Use new shard, but copy missing rows from old shard |
| Transition Phase 3 | Use new shard, but copy missing rows from old shard |
| Transition Phase 4 | Use new shard |

The determined transition phase value may, for example, be read from the configuration data in the common database when the configuration data is read from the common database such as shown in step 1003.

The operation of determining the phase value and then accessing the data according to step based behaviour is shown in FIG. 10 by step 1009.

This approach may be modified in further embodiments in several ways. For example in some embodiments additional features may be added, either as new phases or as new behaviours for currently defined phases which enable further improvements to the system.

For example in some embodiments an additional feature may be performing a delete operation on new shard locations for data which is to be moved. This deletion may be performed using a row selection method similar to that described previously. The delete operation on the respective new shards for the hash value or modified hash value ensures that for the hash value ranges that will be moved in the phased migration no rows shall exist in the tables for the moved keys in their new shards.

Furthermore in some embodiments additional control module phases and appropriate store module behaviours may be introduced in order that the database may implement a reliable delete feature from the point of view of the games modules. Deletion of rows from the games module (for example from an application programming interface (API) perspective) is problematic for data which is being migrated. A delete request is received by a store module and rows are deleted during the migration of data controlled by the control module, any further store module which attempts to access the data may attempt to fall back and use a previous value from an old shard that has been deleted. Thus in some embodiments a deletion access request which is received by the store module while the data migration is in progress is not deleted in a normal manner. The store module thus may be configured to flag the selected row and then following the end of the migration the deletion operation is then performed.

Figure 11:
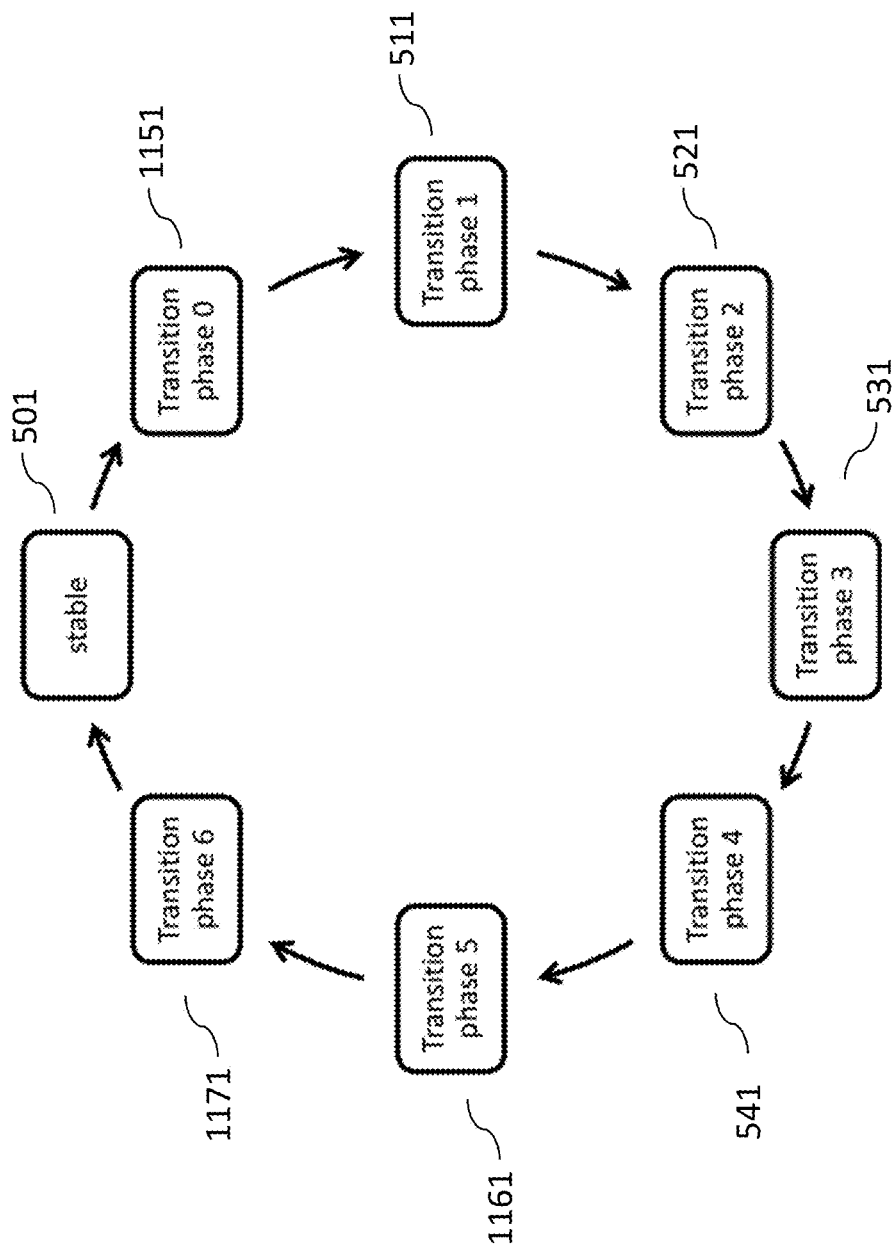
FIG. 11 is a further example range of configuration phases according to an embodiment.

With respect to FIG. 11 a further phased migration system is shown suitable for enabling delete operations to be performed without corrupting the data during migration. FIG. 11 thus shows the insertion of a transition phase 0 1151 located after the stable phase 601 and before transition phase 1 611, the insertion of a transition phase 5 1161 located after transition phase 4 641 and transition phase 6 1171 located after transition phase 5 1161 and before the stable configuration mode 601.

In some embodiments the flag is implemented by using a NULL value as data in the table row. In such embodiments the store module is configured to not support NULL values as valid data. The store module may be configured to treat all data found with NULL data as a non-existing data. This may be applied to all phases.

Thus by extending the examples shown above where there is a data migration from [2000, 2000, 0] to [2000, 2000, 100] with respect to transition phase 0 1151 the control module in some embodiments may, update the configuration data in the common database by writing the configuration data. For example the configuration data written may be 'TransitionConfig', [2000, 2000, 0], [2000, 2000, 100], 0 indicating that the database is now within transition phase 0, the old activation vector is [2000, 2000, 0], the 'new' activation vector is [2000, 2000, 100].

The store module in some embodiments, on detecting and implementing transition phase 0 behaviour, may be configured to process data requests comprising deletes in such a manner that any delete request is not processed as a conventional delete but instead a flag value is written (for example a NULL value as data) to the identified shard location.

The handling of the migration of data and the handling of other access requests may be performed as described earlier in the application with respect to transition phases 1 to 4.

With respect to transition phase 5 1161 the control module may in some embodiments be configured to update the configuration data 411 within the common database 410. For example the control module may set the configuration data to 'TransitionConfig', [2000, 2000, 0], [2000, 2000, 100], 5 indicating that the database is now within a transition phase 5. The transition phase 5 is a precursor phase to transition phase 6 to ensure that all store module operations which are started during the earlier phases up to and including transition phase 4 have completed before the control module finalises the delete operations.

In other words transition phase 5 is introduced for a similar reason to the introduction of transition phase 2 and to ensure that all of the store modules are behaving to a common behaviour before implementing a control module behaviour change.

With respect to transition phase 5 the store module, on detecting a transition phase 5, may be configured to implement data requests processing comprising deletes by resuming normal delete operations to the new shard.

With respect transition phase 6 the control module may in some embodiments be configured to update the configuration data within the common database 410. For example the control module may set the configuration data to 'TransitionConfig', [2000, 2000, 0], [2000, 2000, 100], 6 indicating that the database is now within transition configuration mode phase 6.

The control module may in transition phase 6 then perform a clean up of previous flagged delete operations, having ensured that all of the store modules implementing step behaviour started during transition phase 4 have completed and thus no store module is implementing the flag delete operation and are implementing 'real' delete behaviour as introduced by the store module in transition phase 5. Thus no potential 'false' delete flags are missed during transition configuration mode phase 6.

The control module may be configured to clean up the flagged delete operations by deleting rows by the identified hash value ranges on the new shards where the data is NULL and therefore tidy up the records where the false deletion of rows has occurred.

In such a manner the advantages of the embodiments described previously may be improved by the flagged delete behaviour.

In some embodiments the data migration operation may be staged. In other words the data migration is managed as stages within which a portion of the total data is migrated using the phased migration approach described above. As each stage moves only a small subset of the keys the effect of the migration of data from shard to shard with respect to any instant or stage is reduced. In other words a trade-off between the smaller overhead and larger (migration) effect of a single stage migration compared with the larger overhead and smaller (per stage) effect of the multi stage migration.

For example a change from [2000, 2000, 0] to [2000, 2000, 2000] can in some embodiments be performed as several stages. For example a first stage of [2000, 2000, 0] to [2000, 2000, 100], a second stage of [2000, 2000, 100] to [2000, 2000, 200] and so on. Each stage moves only a small subset of all keys affected by the activation of shard 2. This continues until shard 2 has the same allocation as shard 0 and shard 1. As previously described the change to [2000, 2000, 2000] may require data to be moved from shard 0 to shard 2 and from shard 1 to shard 2 while not requiring any data to be moved between shard 0 and shard 1.

In performing a staged movement of data collections it may be possible to significantly limit the effect of any movement of data collections. In embodiments implementing staged migration of data collections only a portion of the data collections are moved in each movement. Thus any problems with respect to reading from or writing to the data collection while the migration is being performed are limited to only the portion of the data collection being moved.

Figure 12:
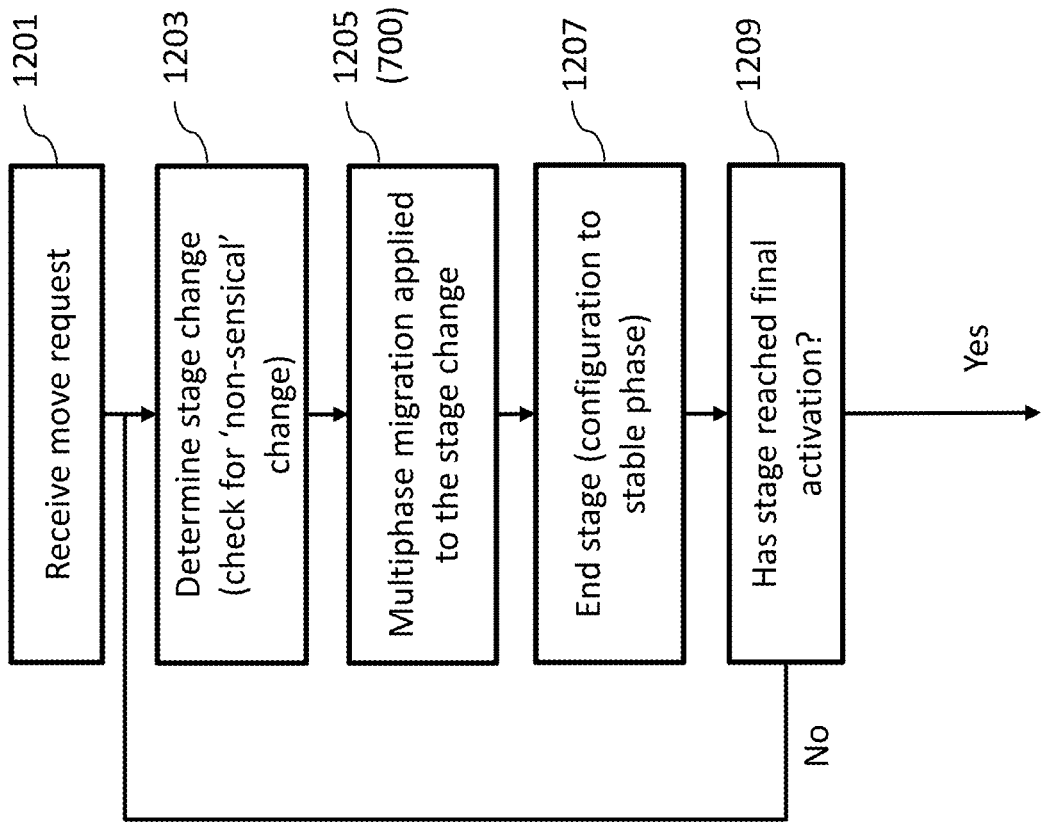
FIG. 12 is a flow chart of a method of operating a control module to perform staged (further sequences of phases) migrations according to an embodiment.

The staged control of movement of data collections can be seen for example with respect to FIG. 12, which shows an example flow chart of an overview of a method for implementing a staged management data collections migration.

In FIG. 12 the control module 430 is shown having received a request to move some data collections from one or more shards to one of more shards and thus change the partitioning.

The operation of receiving the request to change partitioning is shown in FIG. 12 by step 1201.

There may be many reasons for changing partitioning of collections. A first reason is to move data collections based on size and capacity of the shards. For example using the example shown in FIG. 4, where there is a situation wherein shard 0 416, shard 1 418, and shard 2 420 are at a high load level (or almost full) but shard 3 422 is empty and ready to be added then in order to distribute the storage load, the data collections can be moved or transferred between the shards.

In addition to size capacity reasons, data collections may be moved between shards to help control load capacity and/or network capacity. For example additionally or alternatively data collections may be moved between shards for hardware cost optimization. Additionally or alternatively data collections may be moved between shards due to user/device co-location etc.

It will be understood that in addition to transferring data collections individually, data collections can also be transferred in groups or sets. That is multiple collections can be transferred at the same time. In some embodiments different collections within a set of collections being transferred can be transferred to different shards, if need be.

In some embodiments the control module 430 may be configured to determine a stage size change from a current data collection distribution to a data collection distribution towards the target distribution. The control module 430 is configured to determine a stage size change such that each stage moves only a small subset of all keys affected by the data collection movement.

In some embodiments the control module may be configured to (and optionally on the initial step determination only) determine that the request does not contain or cause a non-sensical or ridiculous distribution change. Thus a change from [2000,2000,0] to [2000,2000,100] results in a small number of record changes whereas a change from [1000,1000,1000] to [900000,900000,900000] which would change almost every record location would be determined to be a non-sensical or ridiculous activation change.

The operation of determining a stage change is shown in FIG. 12 by step 1203.

Having determined a stage change and a change in the activation vector the control module may be configured to implement a phased migration using the old and new activation vectors.

The operation of performing a staged migration is shown in FIG. 11 by step 1205.

The staged migration may then end bringing the database back to a stable phase.

The operation of ending the stage of the migration is shown in FIG. 11 by step 1207.

Having completed the stage (multi-phase) migration the control module may be configured to determine whether the stage move has resulted in the final move position or data collection distribution being reached.

The operation of determining whether the final move position (the final activation vector) has been reached is shown in FIG. 12 by step 1209.

Where the control module determines the final activation vector has not been reached then the control module is configured to furthermore perform a further stage with a further change in the activation vector and re-iterate the operations of initiating a further move. In other words the operation may loop back to step 1203.

Where the control module determines the final activation vector has been reached then the move ends.

As discussed previously the ability to implement staged migration of data results in the number of keys and data records being effected by the migration at any time is significantly less than performing the migration in one stage, since only the keys that are affected by that stage move will produce different shard locations during the transition phases. Thus for example a location query result which results in a stable configuration determination and an activation vector of [2000, 2000, 0] produces 100% of keys as single location (and 0% as moving location keys). Whereas a transition phase with the staged size change example from a current activation vector of [2000, 2000, 0] to a new activation vector of [2000, 2000, 100]—a 2.5% change produces ~97,5% as single location keys (i.e. not affected by that stage of the migration) and ~2,5% as moving location keys (i.e. affected by that stage of the migration).

In the following sections implementations and examples of the embodiments described above are discussed with respect to simplified scenarios. These attempt to introduce the embodiments in such a way to further explain their advantages.

Figure 13:
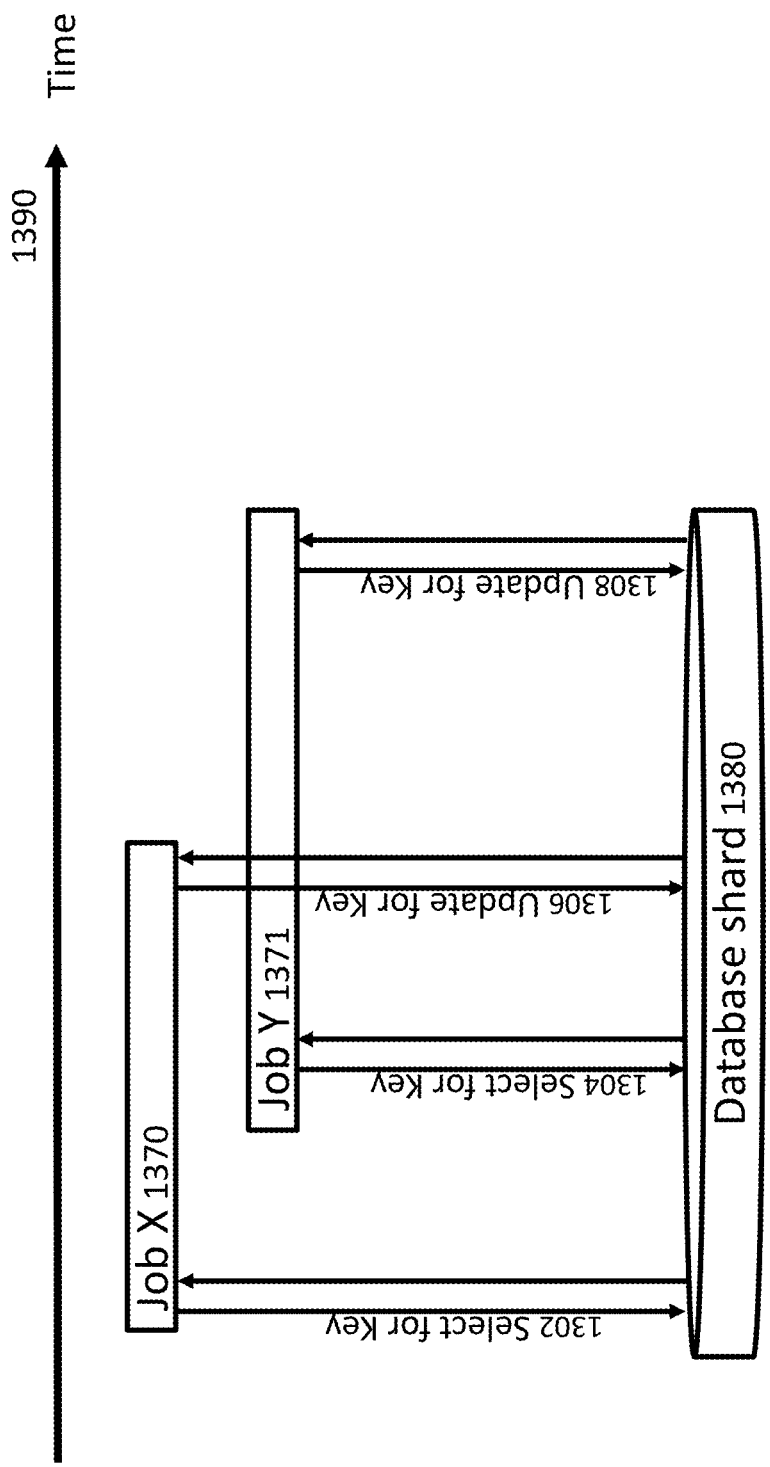
FIG. 13 is a schematic time line view of an example overwrite of data.

FIG. 13 for example shows a schematic time line view of an example overwrite of data scenario wherein two separate access jobs or tasks, Job X 1370 and Job Y 1371 attempt to access a database shard 1380 along a time axis 1390.

Job X 1370 performs a select for key 1302 database access operation which returns data.

Afterwards Job Y 1371 performs a select for the same key 1304 database access operation which returns the same data.

Job X 1370, after the Job Y select operation then performs an update for key 1306 database access operation which stores updated data on the database shard 1380.

Additionally after this Job Y 1371 also then performs an update for key 1308 database access operation which stores updated data on the database shard 1380. As can be seen Job Y 1371 overwrites the result from Job X 1370 which leads potentially to an incorrect value being read and/or stored for the key.

Figure 14:
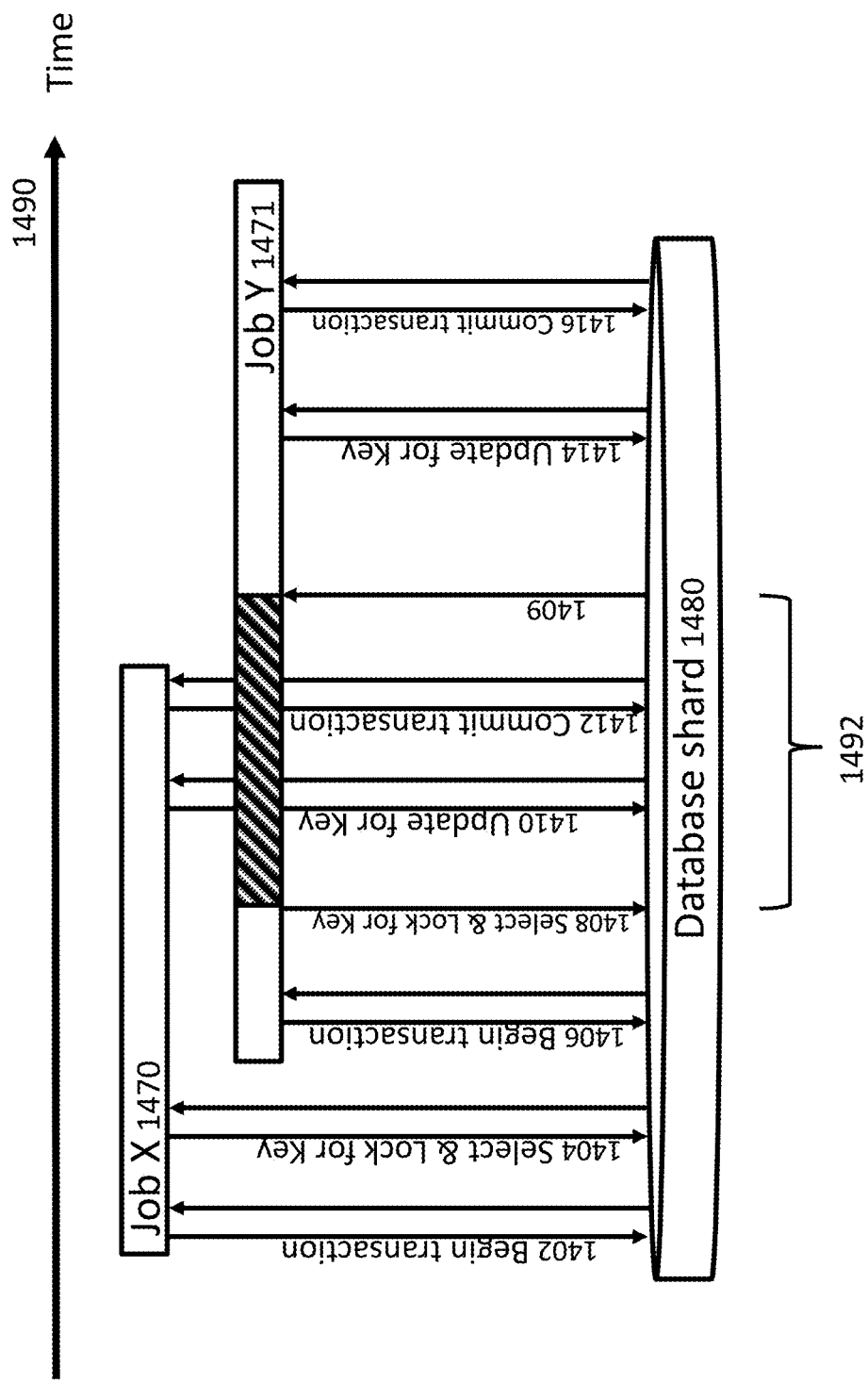
FIG. 14 is a schematic time line view of an example of a locking mechanism attempting to prevent an overwrite situation such as shown in FIG. 13.

FIG. 14 shows a schematic time line view of an example of a locking mechanism attempting to prevent an overwrite situation such as shown in FIG. 13.

In this example the two separate access jobs or tasks, Job X 1470 and Job Y 1471 attempt to access the database shard 1480 along a time axis 1490.

Job X 1470 performs a begin transaction 1402 database operation on the database shard 1480. Furthermore Job X performs a select and lock for key 1404 database operation which returns data and locks the key from any other job access.

Afterwards Job Y 1471 performs a begin transaction 1406 database operation on the database shard 1480. Furthermore Job Y attempts a select and lock for key 1408 database operation. The database key being locked does not respond and Job Y 1471 waits as shown by the hatched region period 1492.

Job X 1470, during the period that Job Y is waiting is performs an update for key 1410 database access operation which stores updated data on the database shard 1480. Furthermore Job X 1470 performs a commit transaction 1412 which unlocks the key.

The database then returns 1409 the unlocked data associated with the key which allows Job Y to stop waiting and re-locks the key to prevent any further accessing of the key while Job Y is processing the data.

Additionally after this Job Y 1471 can performs an update for key 1414 database access operation which stores updated data on the database shard 1480.

Furthermore Job Y 1471 performs a commit transaction 1416 which unlocks the key.

As can be seen Job Y 1471 can no longer overwrite the result from Job X 1470 which would have potentially led to an incorrect value being read and/or stored for the key.

Figure 15:
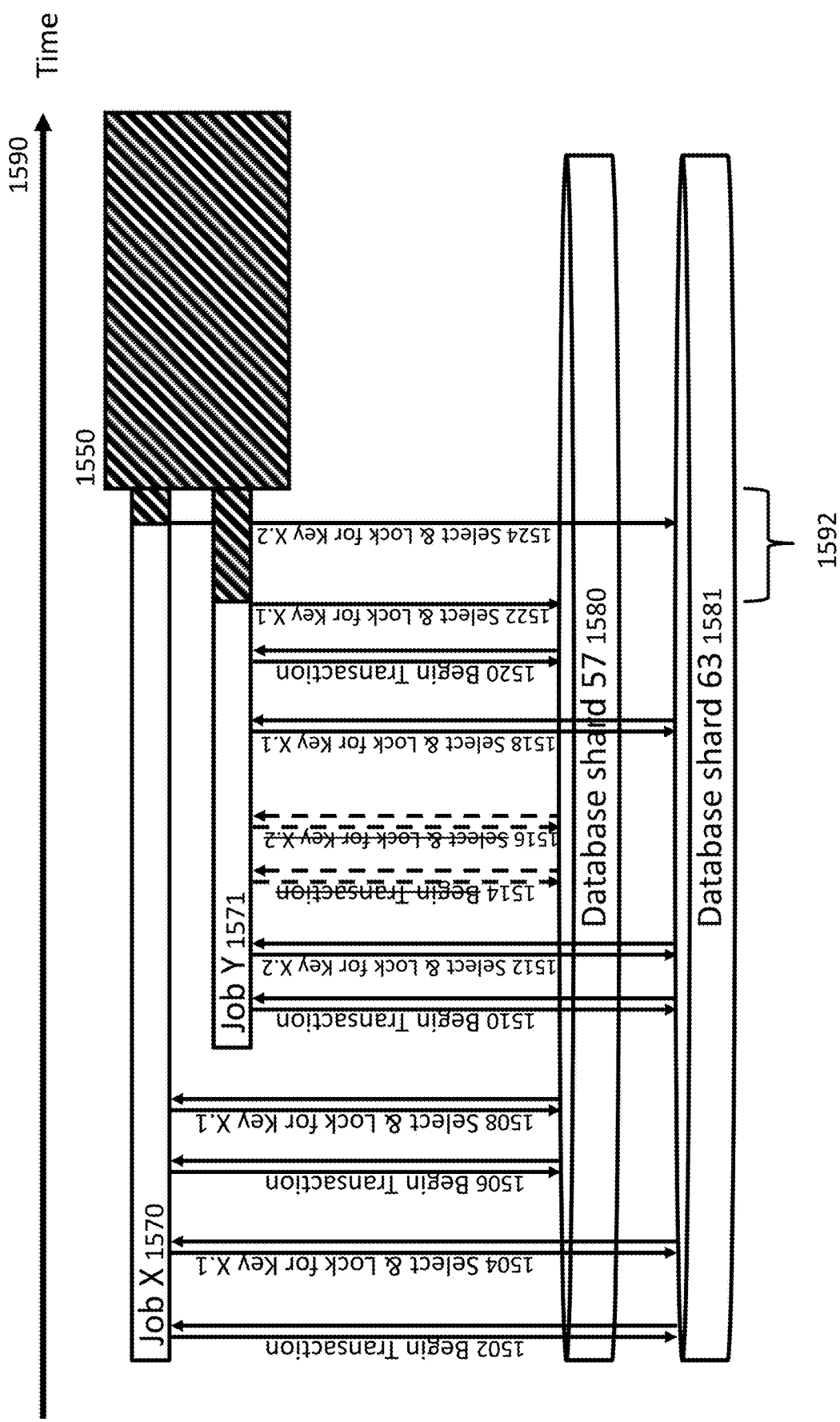
FIG. 15 is a schematic time line view of an example of a deadlock caused by a locking mechanism attempting to prevent an overwrite situation such as shown in FIGS. 13 and 14.

FIG. 15 shows a schematic time line view of an example of a locking mechanism attempting to prevent an overwrite situation during a shard migration.

In this example the two separate access jobs or tasks, Job X 1570 and Job Y 1571 attempt to access the database shard '57' 1580 and shard '63' 1581 along a time axis 1590. Also Job X 1570 attempts to read and update value for Key X.1 and value for Key X.2, while Job Y needs to read and update value for Key X.2 and value for Key X.1. Furthermore a shard migration is being performed wherein, shard '63' is the new location for data, while shard '57' is the old location for the data. In this example the rows might already be in shard '63', or still in shard '57', or not exist at all.

Job X 1570 performs a begin transaction 1502 database operation on the database shard '63' 1581. Furthermore Job X performs a select and lock for key X.1 1504 database operation which attempts to return data and locks the key on shard '63' 1581 from any other job access. This operation returns a miss as the rows are not located on shard '63' 1581.

Job X 1570 then based on the miss by operation 1504 performs a fallback to shard '57' and performs a begin transaction 1506 database operation on the database shard '57' 1580. Furthermore Job X performs a select and lock for key X.1 1508 database operation which attempts to return row data and locks the key on shard '57' 1580 from any other job access attempting to access key X.1. This operation returns a hit as the rows are located on shard '57' and the row data for key X.1 is returned and locked from any other job access.

Afterwards Job Y 1571 performs a begin transaction 1510 database operation on the database shard '63' 1581. Furthermore Job Y attempts a select and lock for key X.2 1512 database operation. This operation returns a hit as the rows are located on shard '63' 1581 and the row data for key X.2 is returned and locked from any other job access.

This hit by operation 1512 permits skipping a begin transaction 1514 database operation on the database shard '57' 1580 and a select and lock for key X.2 1516 database operation, since the row data have already been successfully fetched.

Furthermore is also shown where Job Y attempts a select and lock for key X.1 1518 database operation on database shard '63' 1581. As discussed with respect to the Job X access this returns a miss and a fall back to shard '57'.

Thus Job Y 1571 based on the miss performs a begin transaction 1520 database operation on the database shard '57' 1580. Furthermore Job Y performs a select and lock for key X.1 1522 database operation on database shard '57' 1580. The database key being locked does not respond and Job Y 1571 waits as shown by the hatched region period 1592.

Additionally Job X 1570 performs a select and lock for key X.2 1524 database operation on database shard '63' 1581. The database key being locked does not respond and Job X 1570 waits.

This causes a deadlock shown by hatching 1550 where Job X 1570 locks Key X.1 on shard '57' while waiting for access to Key X.2 on shard '63' in parallel with Job Y 1571 which locks Key X.2 on shard '63' while waiting for access to Key X.1 on shard '57'. This deadlock may not be detected by a database server since shard '57' and shard '63' may be located on different database servers. In such a situation the jobs will neither complete nor be aborted which may cause possible endless hanging processing.

Figure 16:
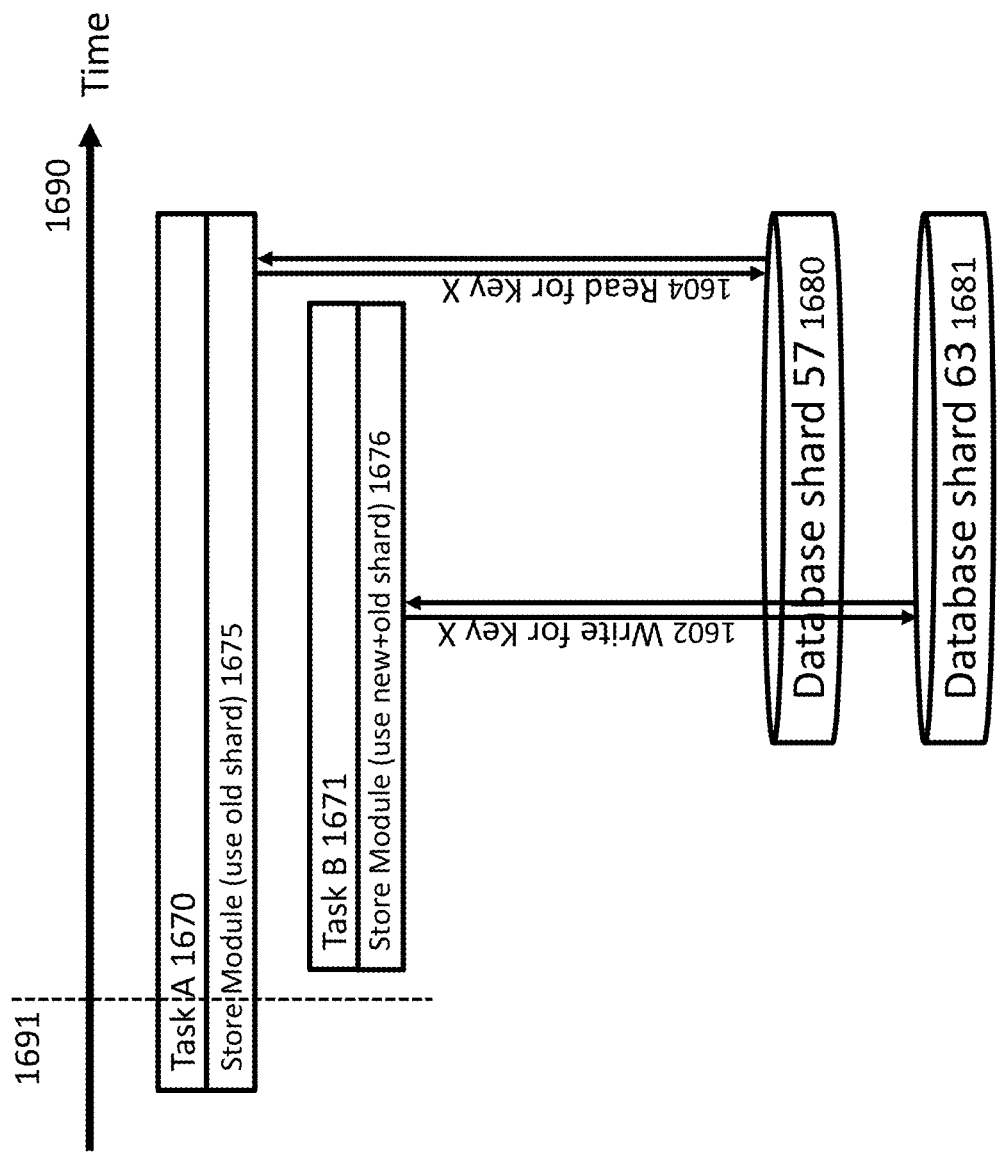
FIG. 16 is a schematic time line view of a phase 0/2 only example implementation where one task only uses the old shard, while another task has started to use a new shard.

As previously described in this application the introduction of phase based control of migration of data and also of store module behaviour may prevent such a situation occurring. For example the principle of moving the data to a new shard by the store module changing to write data to the new shard, while using the old shard as fallback if data is missing from the new shard is shown in FIG. 16 (which may be summarised as the implementation of a phase 0/2 only example implementation where one task only uses the old shard, while another task has started to use a new shard).

In this example there are two separate access tasks, Task A 1670 and Task B 1671. Task A performs a store read operation at the end of its progression. Task B performs a store write operation at the middle of its progression.

These tasks are served by store module 1675 and store module 1676, and each the store module handles the requested store operations and releases them into the needed operations towards the databases.

Store module 1675 is operating under phase 0 behaviour and accessing the old shard as the Task A 1670 is started before the dashed line 1691 which represents a change in database configuration as in the transition from phase 0 to phase 2 behaviour as determined at the store module. Store module 1676 is operating under phase 2 behaviour and accessing the new shard as the Task B 1671 is started after the dashed line 1691.

In this example store module 1676 serving Task B 1671 is configured to perform the requested write for Key X as a 1602 database operation on shard '63' 1681 according to phase 2 behaviour. Store module 1675 serving Task A 1670 is configured to perform the requested read for Key X as a 1604 database operation on shard '57' 1680 according to phase 0 behaviour.

In such a scenario the store module for Task A is only using the old shard, while the store module for Task B has started to use the new shard. Since Task B's store module have the instructions to store the updated data on shard '63' before the Task A has completed Task A will read the old (and not the updated data) from shard '57'.

Figure 17:
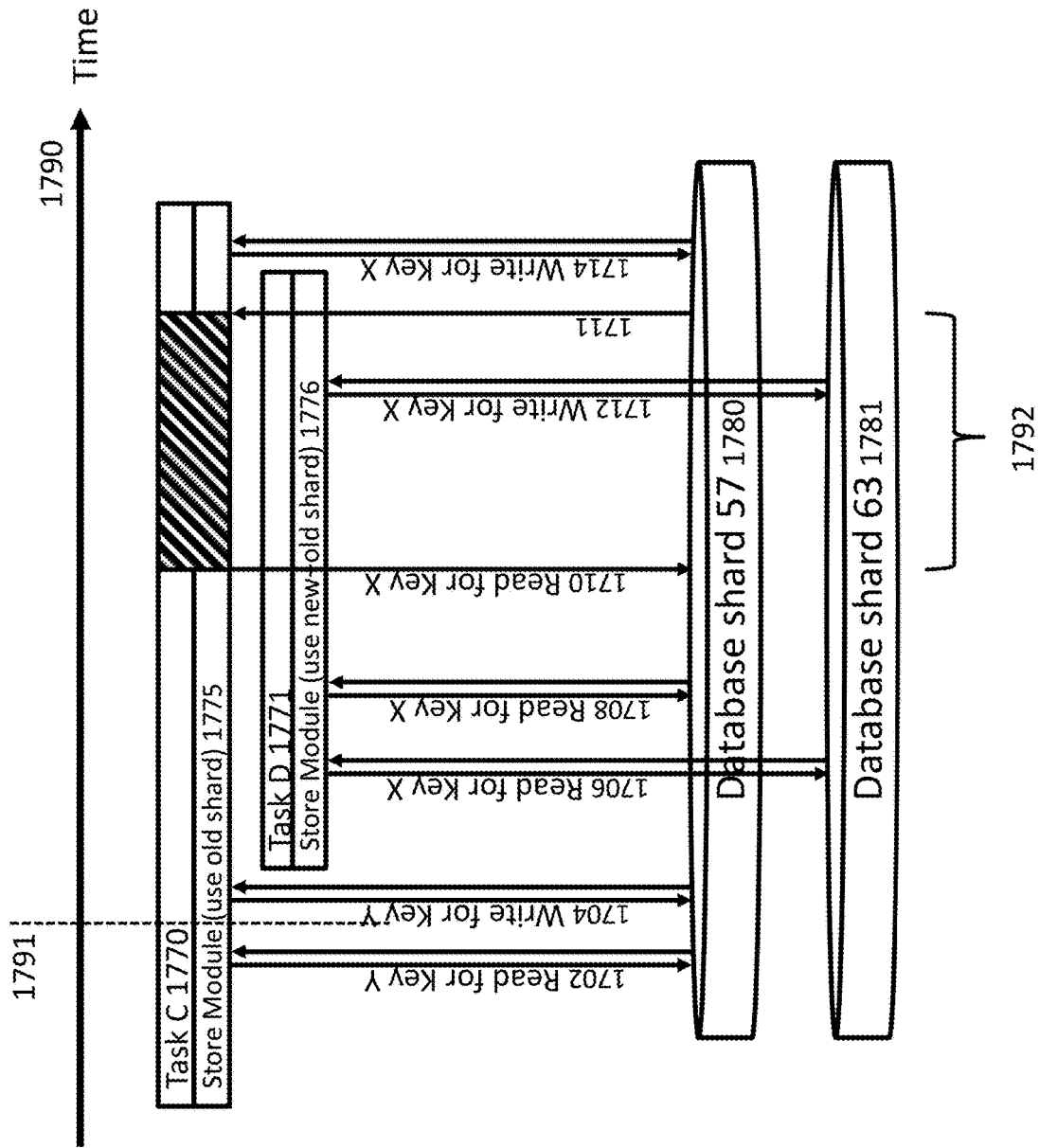
FIG. 17 is a schematic time line view of a further phase 0/2 only example implementation where the store modules utilize database isolation and row locking.

FIG. 17 shows a schematic time line view of a further phase 0/2 only example implementation where the store modules utilize database isolation and row locking.

In this example there are two separate access tasks, Task C 1770 and Task D 1771. Task C performs a store read and store write for key Y, later followed by a store read and store write for Key X. Task D performs a store read and store write for key X.

These tasks are served by store module 1775 and store module 1776 respectively, and each store module handles the requested store operations and releases them into the needed operations towards the databases.

Store module 1775 is operating under phase 0 behaviour and accessing the old shard as the Task C 1770 is started before the dashed line 1791 which represents a change in database configuration as in the transition from phase 0 to phase 2 behaviour as determined at the store module. Store module 1776 is operating under phase 2 behaviour and accessing the new shard as the Task D 1771 is started after the dashed line 1791.

In this example store module 1775 serving Task C 1770 is configured to perform the requested read for Key Y as a 1702 database operation on shard '57' 1780 according to phase 0 behaviour. The store module 1775 serving Task C 1770 may be configured to perform the later requested write for Key Y as a 1704 database operation on shard '57' 1780 according to phase 0 behaviour (even though the operation is implemented after the transition 1791).

Store module 1776 serving Task D 1771 is configured to perform the requested read for Key X as a 1706 database operation on the 'new' shard '63' 1781, and then based on a miss fallback the read for Key X as a 1708 database operation on the 'old' shard '57' 1780 according to phase 2 behaviour.

In this example the read operation may also perform a locking operation on the key.

Therefore when store module 1775 serving Task C 1770 is configured to perform a later requested read for Key X as a 1710 database operation on shard '57' 1780 based on phase 0 behaviour and the database does not reply because of the lock then store module and Task C may wait as shown by the hatched period 1792.

The lock may for example be removed by store module 1776 serving Task D 1771 performing a requested write for Key X as a 1712 database operation on the 'new' shard '63' 1781 according to phase 2 configuration and further releasing all database locks since Task D completes.

After the lock is removed then the Key X data is returned 1711 to store module serving Task C from shard '57' 1780. In this example this is followed by a store module 1775 serving Task C 1770 is requested a write for Key X that is performed as 1714 database operation on shard '57' 1780 based on phase 0 behaviour.

As can be seen in FIG. 17 when the store module processing Task D fetches the data for Key X, there is no data available on shard '63', so it continues and reads the data from shard '57'. Due to the usage of row locks, the store module processing Task C is blocked in its fetch of data for key X in 1710 but by the time the fetch is unlocked the data has been written and updated on shard '63' and the data fetched from shard '57' is out of date.

FIGS. 16 and 17 therefore show the problem overlapping phase 0 and 2 behaviours.

Figure 18:
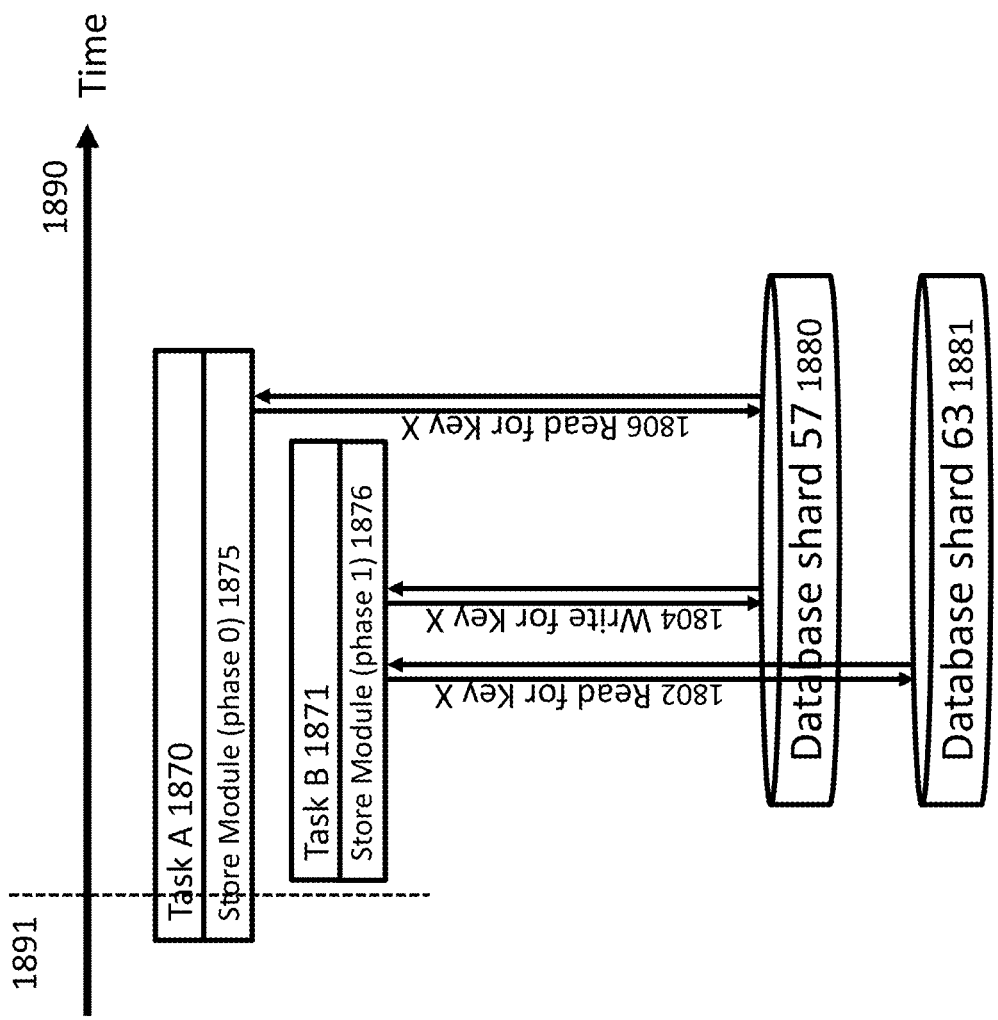
FIGS. 18 and 19 are schematic time line views of the introduction of phase 1 to the example shown in FIG. 16.
Figure 19:
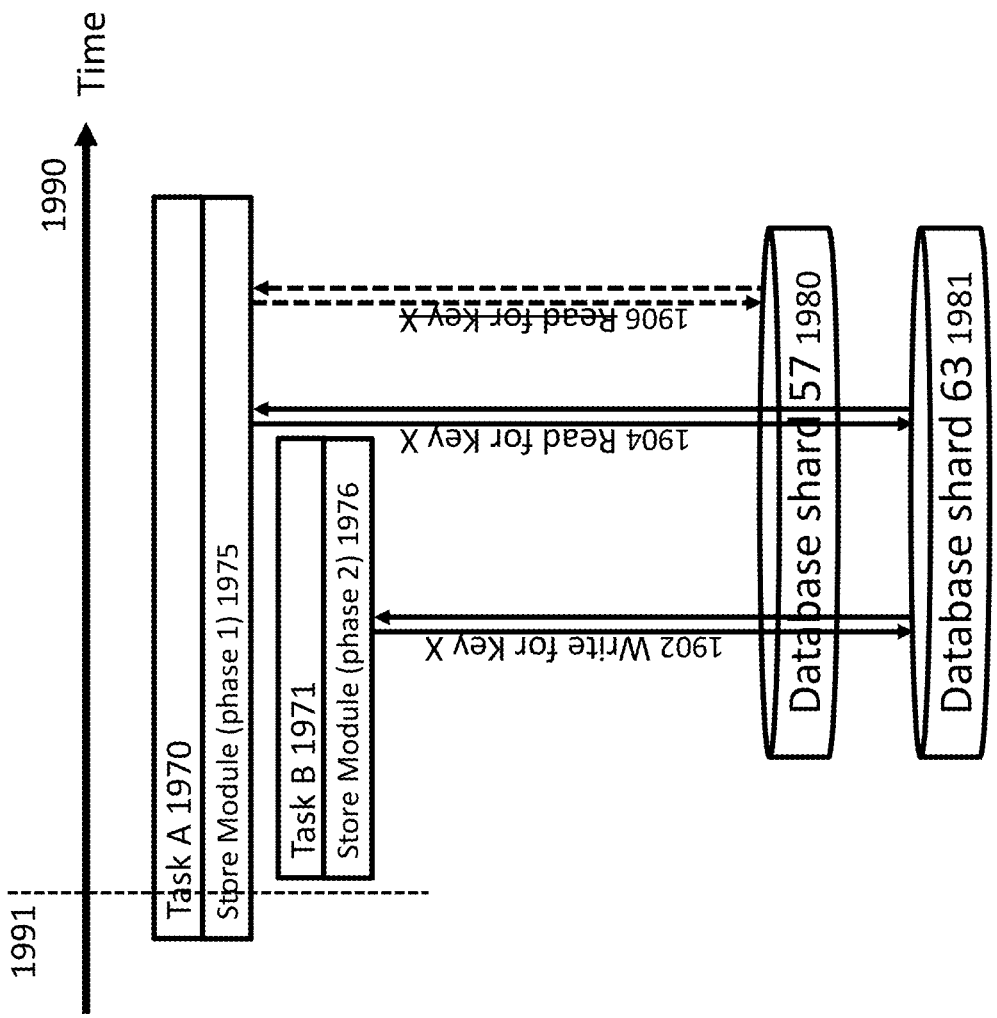

FIGS. 18 and 19 show how the introduction of phase 1 behaviour may improve the behaviour, correctness of data handling, data integrity, data correctness and so on based performance of the system in the Task A and B scenario shown in FIG. 16.

FIG. 18 for example shows the introduction of phase 1 and the transition between phase 0 and 1 behaviour with respect to the FIG. 16 Task A and Task B scenario.

In this example the two separate access tasks, Task A 1870 and Task B 1871 are served by store module 1875 and store module 1876. Store module 1875 is operating under phase 0 behaviour and accessing the old shard as the Task A 1870 is started before the dashed line 1891 on the time line 1890 which represents a change in database configuration as in the transition from phase 0 to phase 1 behaviour as determined at the store module. Store module 1876 is operating under phase 1 behaviour and accessing the new shard as the Task B 187 is started after the dashed line 1891.

In this example store module 1876 serving Task B 1871 is performing a write requested by Task B. First the store module perform a read for Key X as a 1802 database operation on shard '63' 1881 to check if the data is already stored on the 'new' shard as needed by the phase 1 behaviour. Since the data was not stored in the 'new' shard the store module 1876 performs the requested write for Key X as a 1804 database operation on shard '57' 1880 according to phase 1 behaviour.

Store module 1875 serving Task A 1870 is configured to perform the requested read for Key X as a 1806 database operation on shard '57' 1880 according to phase 0 behaviour.

In this example even when the store module 1876 implementing Task B does not want to read the data for key X, the phase 1 behaviour makes the store module 1876 check the new shard '63' 1881 for the existence of data for key X by performing an initial read operation. Since the data is not found, the data is then written on the old shard '57' 1880.

FIG. 19 shows the introduction of phase 1 and the transition between phase 1 and 2 behaviour with respect to the FIG. 16 Task A and Task B scenario.

In this example the two separate access tasks, Task A 1970 and Task B 1971 are served by store module 1975 and store module 1976. Store module 1975 is operating under phase 1 behaviour as the Task A 1970 is started before the dashed line 1991 on the time line 1990 which represents a change in database configuration as in the transition from phase 1 to phase 2 behaviour as determined at the store module. Store module 1976 is operating under phase 2 behaviour as the Task B 1971 is started after the dashed line 1891.

In this example store module 1976 serving Task B 1971 is configured to perform the requested write for Key X as a 1804 database operation on shard '63' 1981 according to phase 2 behaviour.

Store module 1875 serving Task A 1870 is configured to perform the requested read for Key X as a 1904 database operation on shard '63' 1981 according to phase 1 behaviour. As the read operation is a hit then the following read for Key X 1906 operation on shard '57' 1980 according to phase 1 behaviour may be skipped.

In other words the phase 1 behaviour makes the store module serving Task A check if any data exists in the new shard '63'. Since it finds the data, it does not continue and is not required to read the data from the old shard '57'.

Figure 20:
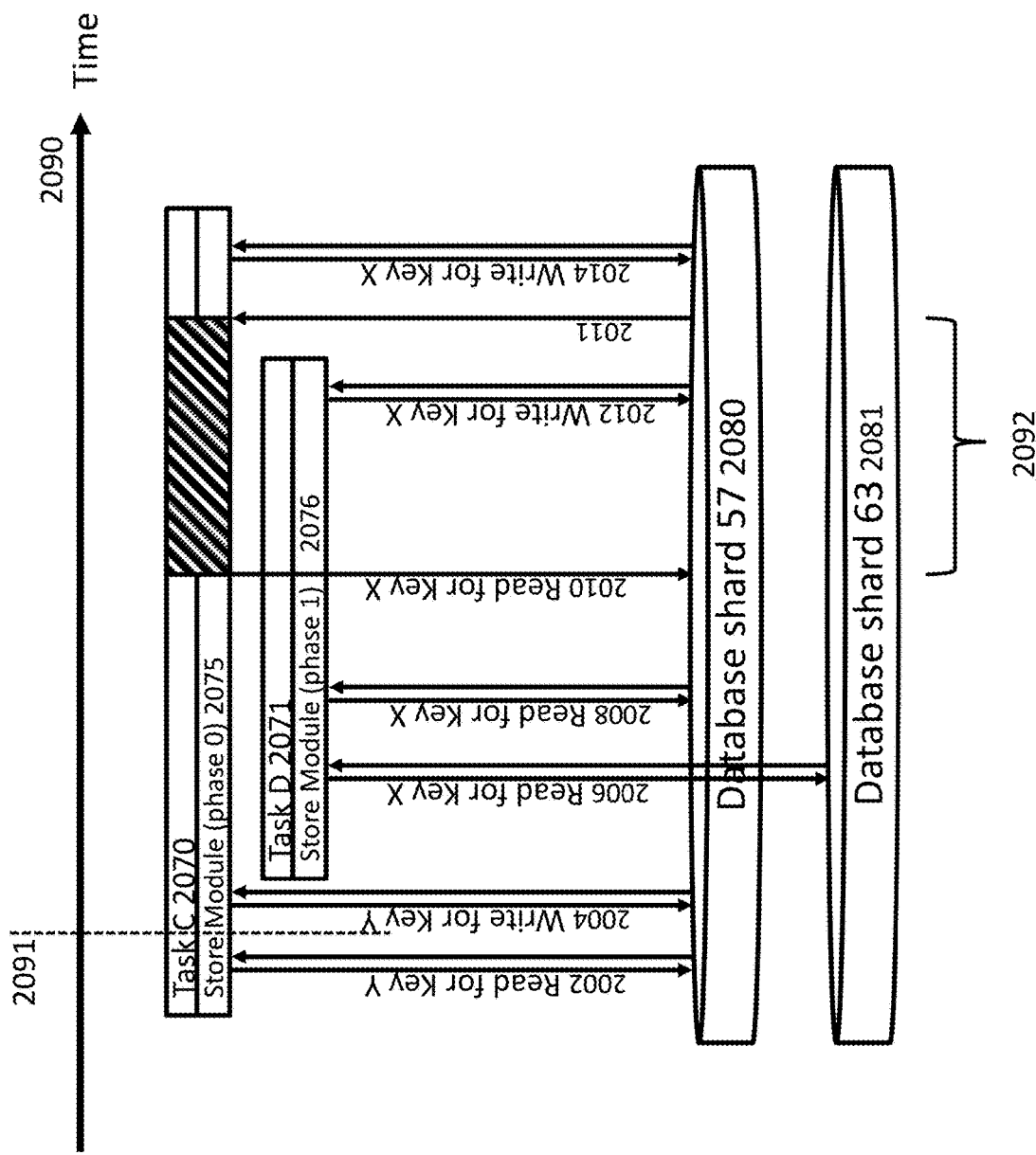
FIGS. 20 and 21 are schematic time line views example implementation of the introduction of phase 1 to the example shown in FIG. 17.
Figure 21:
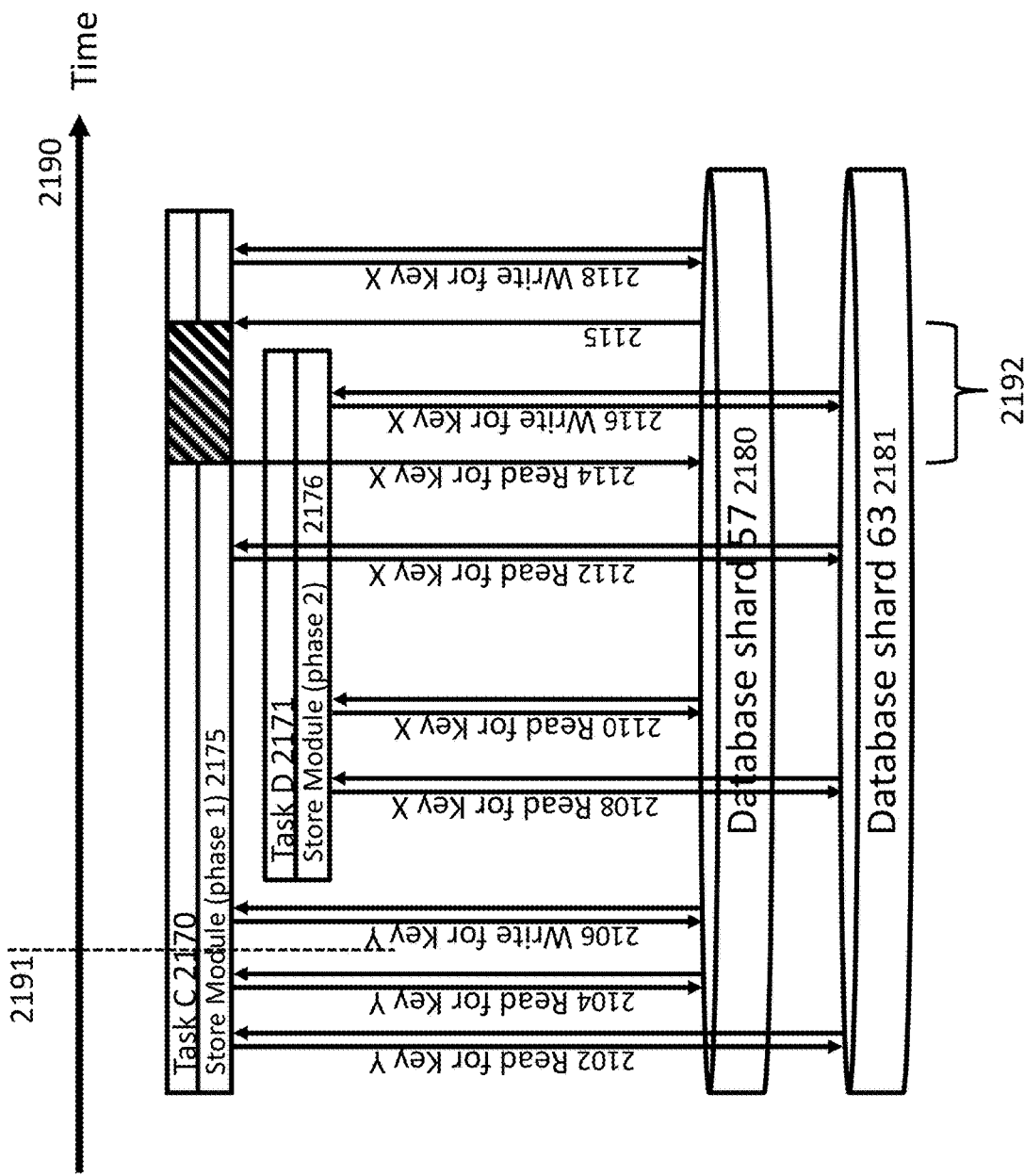

FIGS. 20 and 21 show how the introduction of phase 1 behaviour may improve the behaviour, correctness of data handling, data integrity, data correctness and so on based performance of the system in the Task C and D scenario shown in FIG. 17.

FIG. 20 for example shows the introduction of phase 1 and the transition between phase 0 and 1 behaviour with respect to the FIG. 17 Task C and Task D scenario.

In this example the two separate access tasks, Task C 2070 and Task D 2071 are served by store module 2075 and store module 2076 respectively. Store module 2075 is operating under phase 0 behaviour and accessing the old shard as the Task C 2070 is started before the dashed line 2091 which represents a change in database configuration as in the transition from phase 0 to phase 1 behaviour as determined at the store module. Store module 2076 is operating under phase 1 behaviour as the Task D 2017 is started after the dashed line 2091.

In this example store module 2075 serving Task C 2070 is configured to perform the requested read for Key Y as a 2002 database operation on shard '57' 2080 according to phase 0 behaviour. The store module 2075 serving Task C 2070 may further be configured to perform the requested write for Key Y as a 2004 database operation on shard '57' 2080 according to phase 0 behaviour (even though the operation is implemented after the transition 2091).

Store module 2076 serving Task D 2071 is configured to perform the requested read for Key X as a 2006 database operation on the 'new' shard '63' 2081, and then based on the miss perform the read for Key X as a 2008 database operation on the 'old' shard '57' 2080 according to phase 1 behaviour.

In this example the read operation may also perform a locking operation on the key.

Therefore when store module 2075 serving Task C 2070 gets a request for a further read for Key X it is configured to perform that request as 2010 database operation on shard '57' 2080 based on phase 0 behaviour and the database does not reply because of the lock then store module 2075 and Task C 2070 may wait as shown by the hatched period 2092.

The lock may for example be removed by store module 2076 serving Task D 2071 performing the requested write for Key X as a 2012 database operation on the 'old' shard '57' 2081 according to phase 1 behaviour and further releasing all database locks since Task D completes. In other words this phase 1 behaviour is based on how the data is found. It will always read data from both new shard and old shard, and write the data (in the simplified case) on the new shard if any data was found on any new shard.

After the lock is removed then the Key X data is returned 2011 to service module and Task C from shard '57' 2080. In this example this is followed by a store module 2075 serving Task C 2070 performing the requested write for Key X as a 2014 database operation on shard '57' 2080 based on phase 0 behaviour.

As can be seen in FIG. 20 when compared with FIG. 17 when the store module serving Task D fetches the data for Key X, there is no data available on shard '63', so it continues and reads the data from shard '57' and then writes the data back to shard '57' where it can be read by the 'earlier' phase 0 Task and the data is correct.

Thus in summary the phase 1 behaviour makes the store module for Task D to check if any data exists in the 'new' shard '63'. Since it does not find the data for key X, it writes the result to the 'old' shard '57'. Hereby Task C will get the updated data for Key X as input, and the result of that both Task C and Task D performs their data manipulations correctly.

FIG. 21 shows the introduction of phase 1 and the transition between phase 1 and 2 behaviour with respect to the FIG. 17 Task C and Task D scenario.

In this example the two separate access tasks, Task C 2170 and Task D 2171 are served by store module 2175 and store module 2176 respectively. Store module 2175 is operating under phase 1 behaviour as the Task C 2170 is started before the dashed line 2191 which represents a change in database configuration as in the transition from phase 1 to phase 2 behaviour as determined at the store module. Store module 2176 is operating under phase 2 behaviour as the Task D 2171 is started after the dashed line 2191.

In this example store module 2175 serving Task C 2170 is configured to perform the requested read for Key Y as a 2102 database operation on shard '63' 2181 according to phase 1 behaviour. This may register a miss and cause the store module to perform a read for Key Y as a 2104 database operation on shard '57' 2180 to obtain the row data.

The store module 2175 serving Task C 2170 may further be configured to perform the requested write for Key Y as a 2106 database operation on shard '57' 2180 according to phase 1 behaviour (even though the operation is implemented after the transition 2191).

Store module 2176 implementing Task D 2171 is configured to perform the requested read for Key X as a 2108 database operation on the 'new' shard '63' 2181, and then based on a miss perform the read for Key X as a 2110 database operation on the 'old' shard '57' 2180 according to phase 2 behaviour.

In this example the read operation may also perform a locking operation on the key.

Therefore when store module 2175 serving Task C 2170 is configured to perform a further requested read for Key X it first performs a read 2112 database operation on shard '63' 2181 and then attempts a read 2114 database operation on shard '57' 2080 based on phase 1 behaviour. As the database shard '57' does not reply because of the earlier lock then store module 2175 and Task C 2170 may wait as shown by the hatched period 2192.

The lock may for example be removed by store module 2176 serving Task D 2171 performing the requested write for Key X as a 2116 database operation on the 'new' shard '63' 2181 according to phase 2 behaviour and further releasing all database locks since Task D completes.

After the lock is removed then the Key X data is returned 2115 to Task C from shard '57' 2180. In this example this is followed by a store module 2175 serving Task C 2170 performing the requested write for Key X as a 2118 database operation on shard '57' 2180 based on phase 1 behaviour.

In this manner the phase 1 behaviour makes the store module for Task C check if any data exists in the 'new' shard '63'. Since it does not find the data for key Y, it writes the result to the 'old' shard '57' for key Y.

However, this figure also shows a problem when Task C reads data 2112 for key X from 'new' shard '63'. Since Task D did not find any data from key X in the 'new' shard '63' the database server may not allocate a row lock for this operation. This may cause Task C in 2112 to not be blocked, as illustrated in the figure. Task C continues and becomes blocked in 2114 waiting for the row lock on the 'old' shard '57'. When Task D completes and releases the database locks, Task C can continue in 2115, but will now miss the updated data for key X that was written by Task D to the 'new' shard '63' in 2116.

A similar problem may also occur if no data exists on either the 'old' shard or 'new' shard, so now row locks occur.

Figure 22:
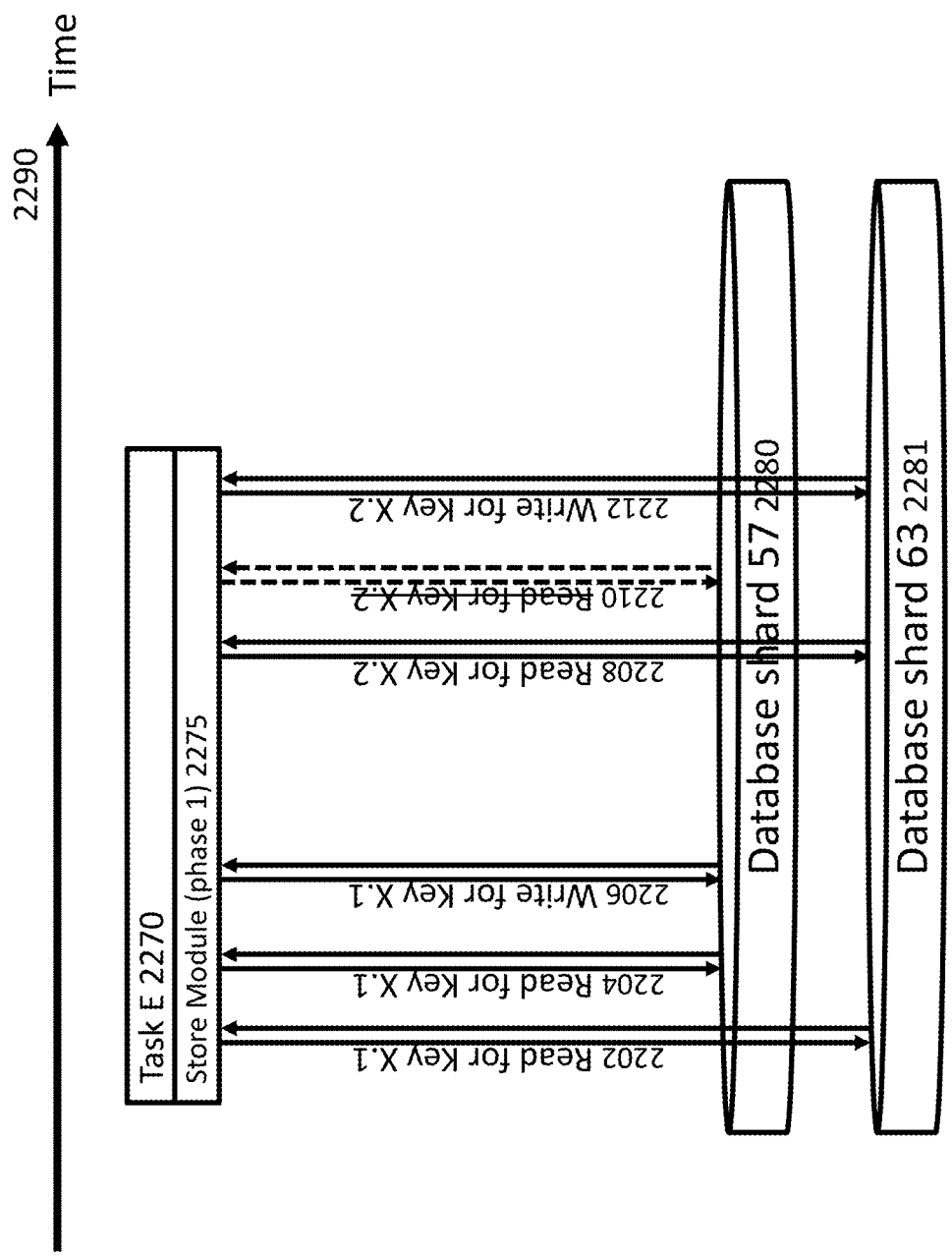
FIG. 22 is a schematic time line view of an example implementation where more than one key is affected by a shard move.

FIG. 22 is a schematic time line view of an example implementation where more than one key is affected by a shard move. In this example a store module 2275 (operating in phase 1) is serving Task E 2270 along the time line 2290. Task E performs a store read and store write for key X.1, followed by a later store read and store write for key X.2.

With respect to a first key, Key X.1, store module 2275 serving Task E 2270 is configured to perform the requested read for Key X.1 as a 2202 database operation on the 'new' shard '63' 2281, and then based on the miss perform a read for Key X.1 as a 2204 database operation on the 'old' shard '57' 2280 according to phase 1 behaviour.

Store module 2275 serving Task E 2270 is then configured to perform the requested write for Key X.1 as a 2206 database operation on the 'old' shard '57' 2280 according to phase 1 behaviour.

With respect to a second key, Key X.2, the store module 2275 serving Task E 2270 is configured to perform the requested read for Key X.2 as a 2208 database operation on the 'new' shard '63' 2281, and then based on successful returned row data may skip performing a read for Key X.2 as a 2210 database operation on the 'old' shard '57' 2280 according to phase 1 behaviour.

Store module 2275 implementing Task E 2270 is then configured to perform the requested write for Key X.2 as a 2212 database operation on the 'new' shard '63' 2281 also according to phase 1 behaviour.

In other words when a store module uses several keys during the life-time of a Task, where more than one key is affected by a shard move, the phase 1 dynamic behaviour may cause problems with transaction integrity as illustrated in FIG. 22, where the store module 2275 causes key X.1 to be updated in the 'old' shard '57' and key X.2 to be updated in 'new' shard '63'. Even if each database shard server supports transactional integrity, a transaction integrity may not be applied to the updated data since different database servers are involved.

Figure 23:
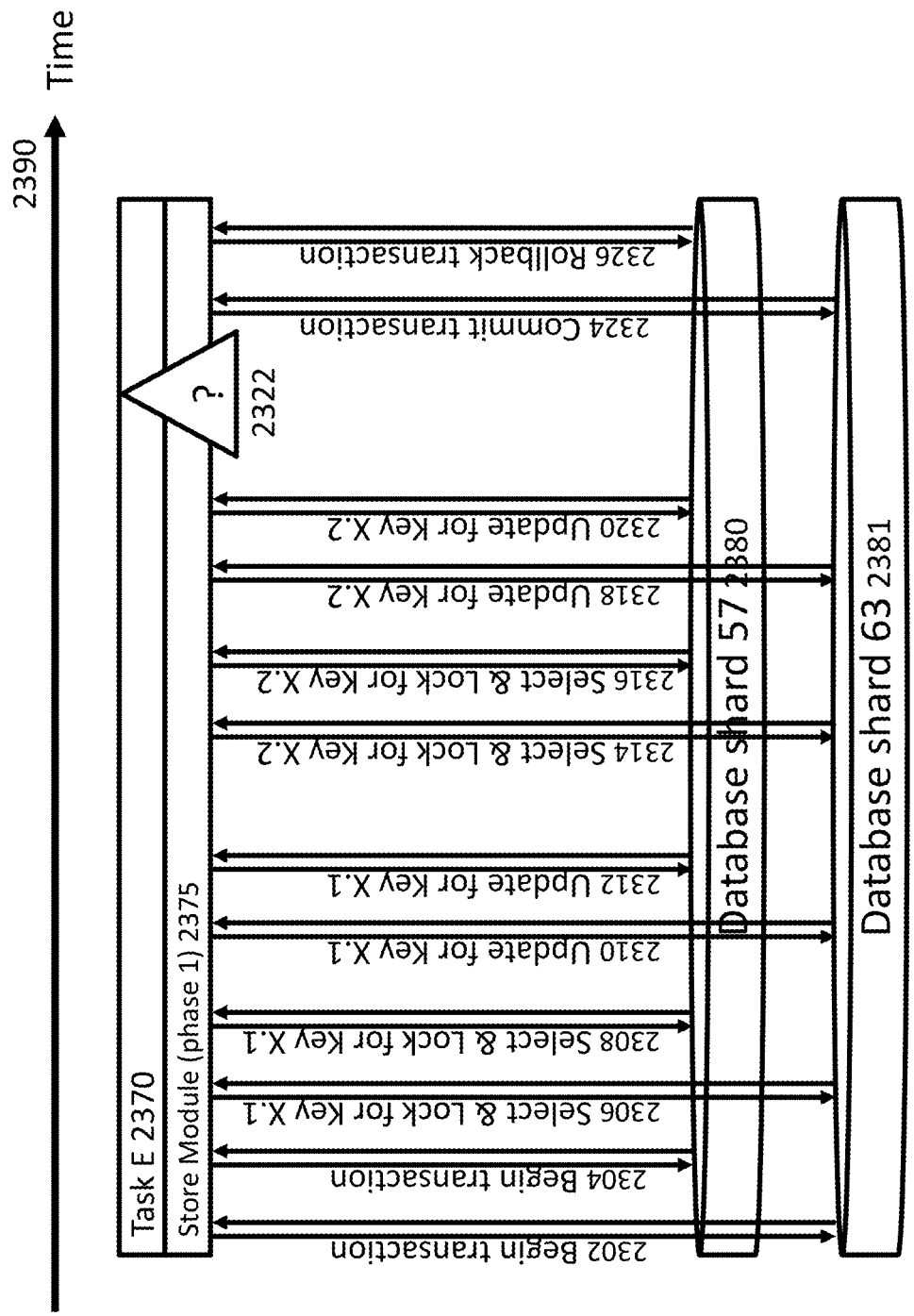
FIGS. 23 and 24 are schematic time line views of example implementation where such as shown in FIG. 22 where phase 1 behaviour is caused to perform all update operations to both the old shard and the new shard.
Figure 24:
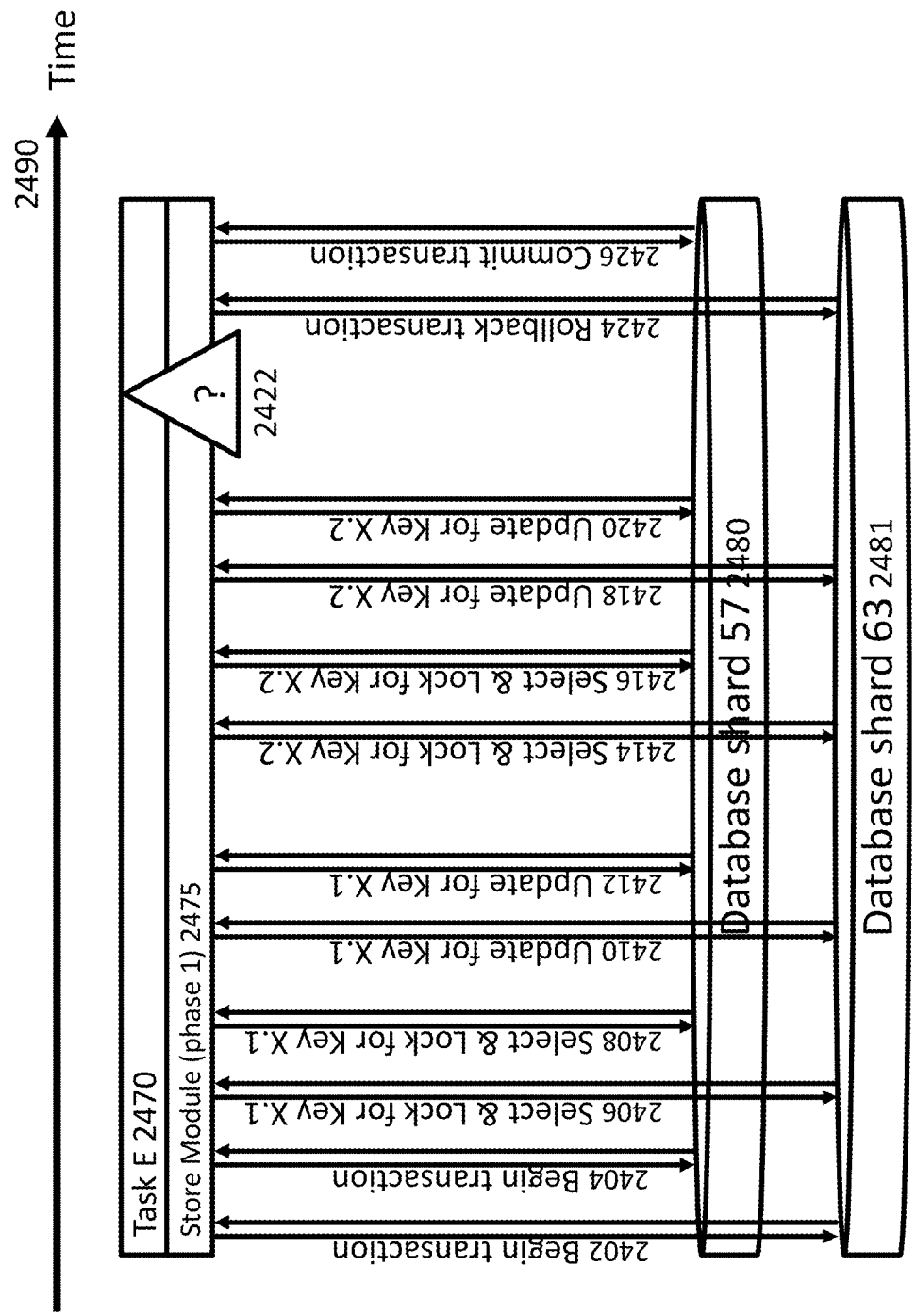

FIGS. 23 and 24 show how phase 1 behaviour that performs all update operations towards both the old shard and the new shard can prevent this issue.

With respect to FIG. 23 a store module 2375 serving Task E 2370 is configured to perform a begin transaction 2302 database operation on the 'new' shard '63' 2381, and a begin transaction 2304 database operation on the 'old' shard '57'

2380. Task E 2370 in this example is configured to do the same actions as the previous figures Task E 2270.

Then the store module 2375 is configured to perform a select and lock for Key X.1 2306 database operation on the 'new' shard '63' 2381, and then based on the miss perform a select and lock for Key X.1 2304 database operation on the 'old' shard '57' 2380.

Store module 2375 serving Task E 2370 is then configured to perform an update for Key X.1 2310 database operation on the 'new' shard '63' 2381 followed by performing an update for Key X.1 2312 database operation on the 'old' shard '57' 2380.

With respect to a second key, Key X.2, the store module 2375 serving Task E 2370 is configured to perform a select and lock for Key X.2 2314 database operation on the 'new' shard '63' 2381, and then even when 2314 successful returned row data the store module will still performing a select and lock for Key X.2 2316 database operation on the 'old' shard '57' 2380. The successful data found in 2314 operation has priority and it is returned back to the Task E as the result of the read operation. This may furthermore apply to some of the further examples (but is not explicitly marked).

Store module 2375 serving Task E 2370 is then configured to perform an update for Key X.2 2318 database operation on the 'new' shard '63' 2381 followed by performing an update for Key X.2 2320 database operation on the 'old' shard '57' 2380.

Some time later when the Task E 2370 completes the store module 2375 will determine, as indicated by 2322, that it shall perform a commit transaction 2324 operation on 'new' shard '63' 2381 and follow this with a rollback transaction 2326 operation on 'old' shard '57' 2380.

In such a manner at the end of the task, the phase 1 behaviour is configured where no rows existed in the new shard, perform the rollback transaction on new shard and then commit the transaction on the old shard. In case of rows existed in the new shard, the phase 1 behaviour shall commit transaction on new shard and then rollback the transaction on the old shard.

FIG. 24 differs from FIG. 23 in that the select and lock for Key X.2 generates a miss rather than a hit.

With respect to FIG. 24 a store module 2475 serving Task E 2470 is configured to perform a begin transaction 2402 database operation on the 'new' shard '63' 2481, and a begin transaction 2404 database operation on the 'old' shard '57' 2480.

Then the store module 2475 is configured to perform a select and lock for Key X.1 2406 database operation on the 'new' shard '63' 2481, and then based on the miss perform a select and lock for Key X.1 2404 database operation on the 'old' shard '57' 2480.

Store module 2475 serving Task E 2470 is then configured to perform an update for Key X.1 2410 database operation on the 'new' shard '63' 2481 followed by performing an update for Key X.1 2412 database operation on the 'old' shard '57' 2480.

With respect to a second key, Key X.2, the store module 2475 serving Task E 2470 is configured to perform a select and lock for Key X.2 2414 database operation on the 'new' shard '63' 2481, and ignoring the outcome of 2414 always perform a select and lock for Key X.2 2416 database operation on the 'old' shard '57' 2480. The data found in 2414 operation has priority, but was missing, hereby the result of 2416 operation is returned back to the Task E as the result of the read operation. This may furthermore apply to some of the further examples (but is not explicitly marked).

Store module 2475 implementing Task E 2470 is then configured to perform an update for Key X.2 2418 database operation on the 'new' shard '63' 2481 followed by performing an update for Key X.2 2420 database operation on the 'old' shard '57' 2480.

Some time later, when the Task E 2470 completes, the store module 2475 will determine, as indicated by 2422, that it shall perform a commit transaction 2424 operation on 'new' shard '63' 2481 and follow this with a rollback transaction 2426 operation on 'old' shard '57' 2480. Thus as shown in FIG. 23 and FIG. 24 phase 1 behaviour is configured where no rows existed in the new shard, perform the rollback transaction on new shard and then commit the transaction on the old shard. In case of rows existed in the new shard, the phase 1 behaviour shall commit transaction on new shard and then rollback the transaction on the old shard.

Depending on what transaction isolation offered by the database server the store module can receive transaction support for the database manipulations. However, in the cases where multiple database shards involved there can exist problems as described in previous text and figures.

These problems may be addressed by the embodiments as discussed herein implementing the three principles:

The store module is configured to apply strict ordering between all operations for the new shard and old shard. The ordering defined is that the store module is configured to perform each operation on the new shard before the old shard.

The store module is configured to perform wanted database locking on both shards, even if the store module does not actually use the data.

The store module is configured to be able to create rows on the fly, and always ensure that rows with relevant database locks exists. Since any other stored modules may create row in parallel, this may require retry mechanisms to be implemented.

Figure 25:
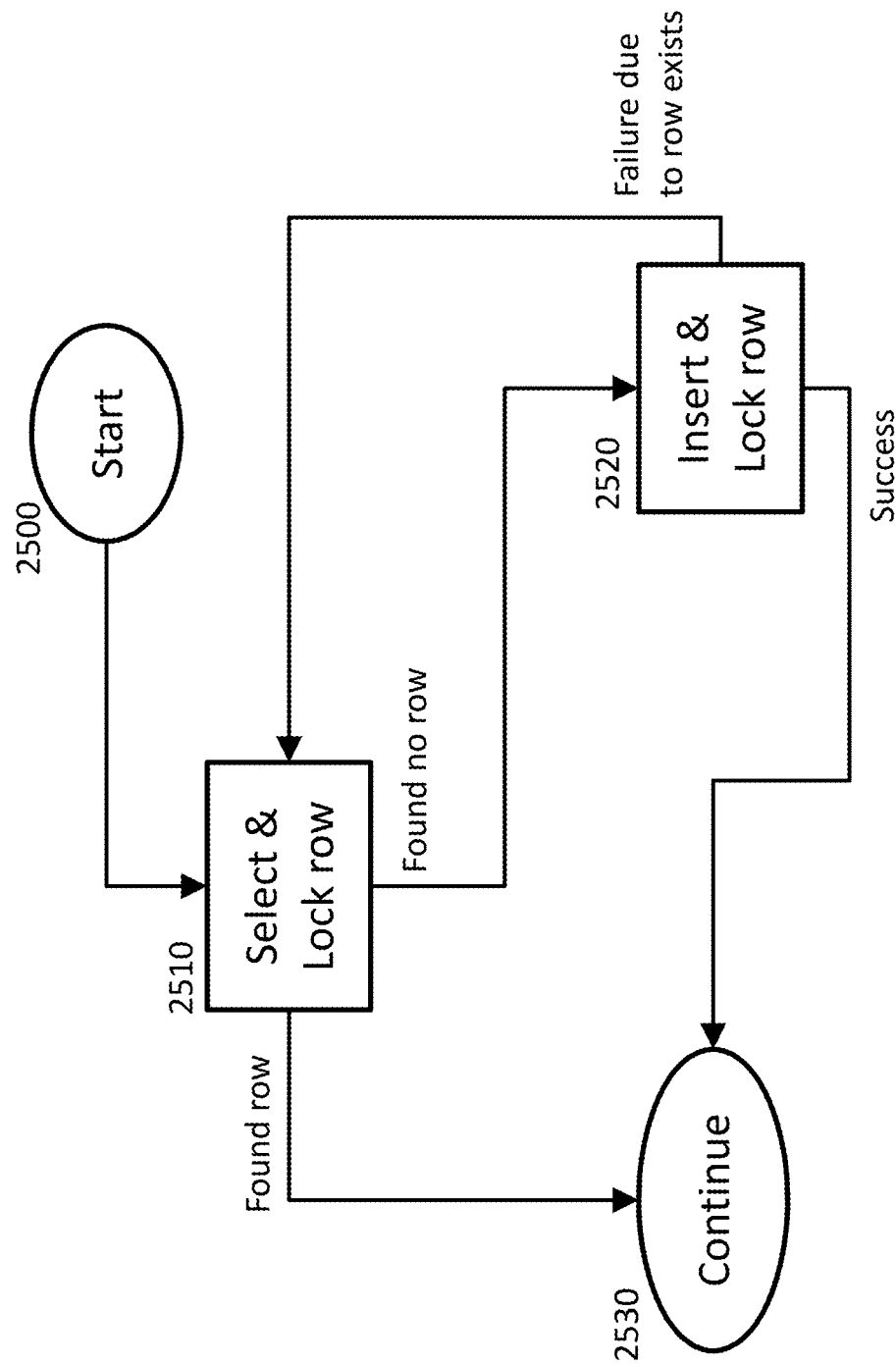
FIGS. 25 to 26 show flow diagrams of the create-row-if-missing with retry behaviour according to some embodiments.

Thus for example in FIG. 25 is shown a flow diagram of an example create-row-if-missing with retry behaviour according to some embodiments.

The first operation start 2500 is followed by a select and lock row operation 2510.

Where the select and lock row 2510 operation finds the row then the task process continues 2530.

Where the select and lock row 2510 operation finds no row then an insert and lock row 2520 operation is performed.

Where the insert and lock row 2520 operation succeeds then the task process continues 2530.

Where the insert and lock row 2520 operation fails due to the row existing then the next operation is one of performing a select and lock row 2510 operation and then continuing from there.

Figure 26:
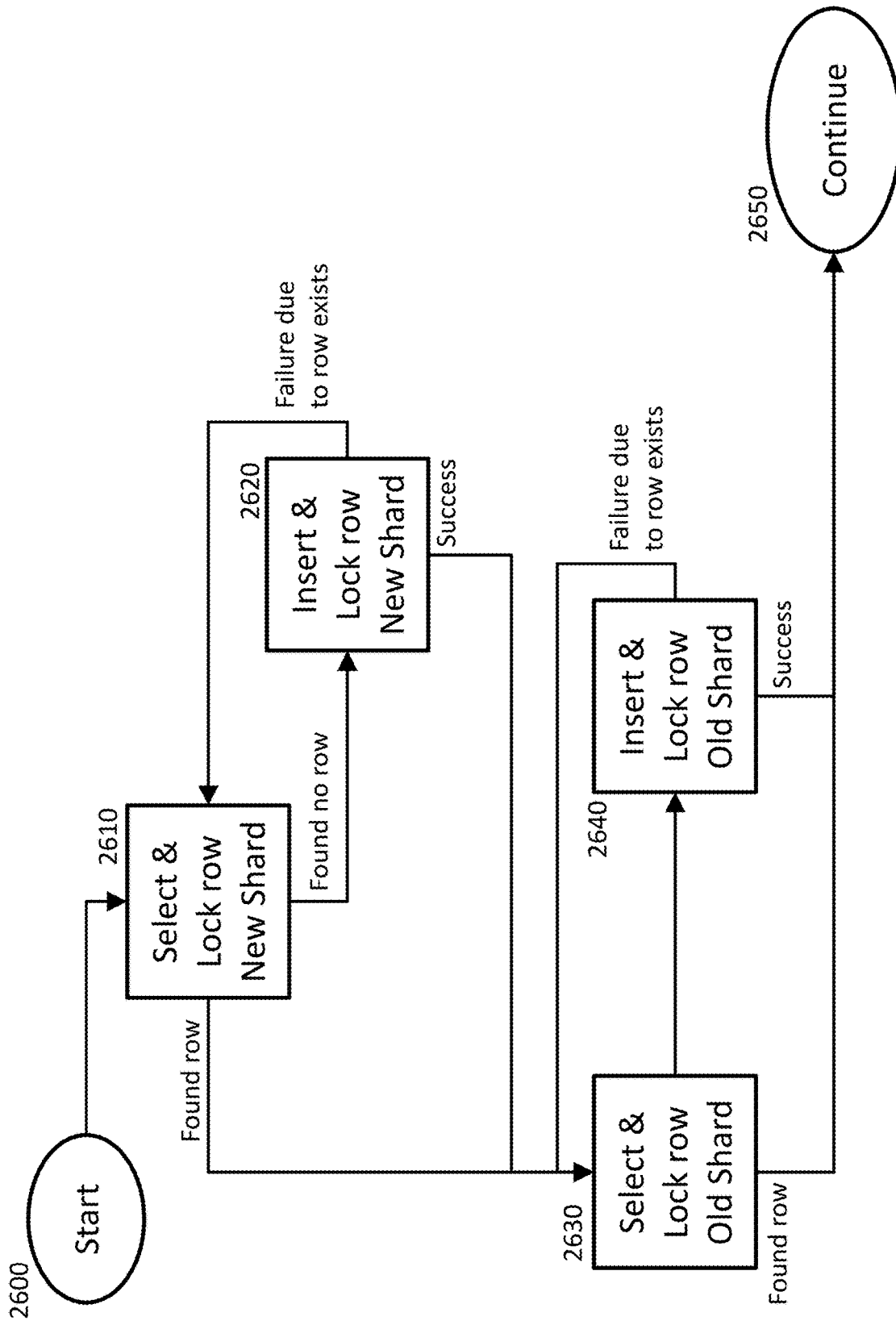

FIG. 26 furthermore shows a flow diagram of an example create-row-if-missing with retry behaviour in new and old shards according to some embodiments.

The first operation start 2600 is followed by a select and lock row on the new shard operation 2610.

Where the select and lock row on the new shard 2610 operation finds no row then an insert and lock row on the new shard 2620 operation is performed.

Where the insert and lock row 2620 operation fails due to the row existing then the next operation is one of performing a (further) select and lock row on the new shard 2610 operation as shown by the arrow looping back.

Where the insert and lock row on the new shard 2620 operation succeeds or the select and lock row on the new shard 2610 operation finds the row then a select and lock row on the old shard operation 2630 is performed.

Where the select and lock row on the old shard 2630 operation finds no row then an insert and lock row on the old shard 2640 operation is performed.

Where the insert and lock row on the old shard 2640 operation fails due to the row existing then the next operation is one of performing a (further) select and lock row on the old shard 2630 operation as shown by the arrow looping back.

Where the insert and lock row on the old shard 2640 operation succeeds or the select and lock row on the old shard 2630 operation finds the row then the task continues 2650.

Figure 27:
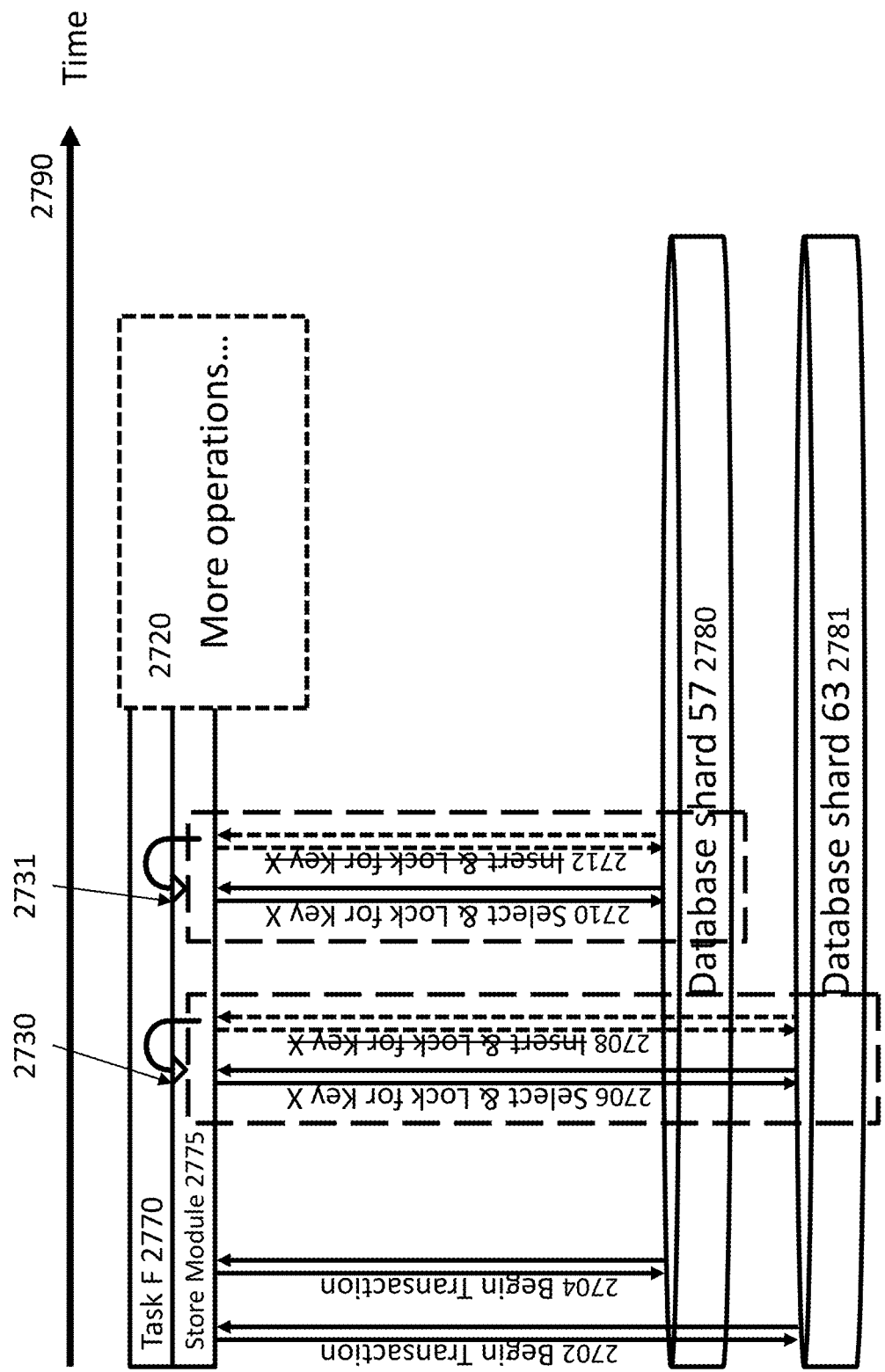
FIG. 27 is a schematic time line view of the create-row-if-missing with retry behaviour according to some embodiments shown in FIGS. 25 and 26.

With respect to FIG. 27 is shown the implementation of the flow diagram shown in FIG. 26.

With respect to FIG. 27 a store module 2775 serving Task F 2770 is shown on time line 2790. The store module is configured to perform a begin transaction 2702 database operation on the 'new' shard '63' 2781, and a begin transaction 2704 database operation on the 'old' shard '57' 2780.

Upon a requested read of Key X from the Task F 2770, the store module 2775 is configured to perform the first group of steps shown in FIG. 26 in that the store module is configured to attempt a select and lock for Key X 2706 database operation on the 'new' shard '63' 2781 and based on detecting a row skip an insert and lock for Key X 2708 database operation on the 'new' shard '63' 2781 and skip a loop back 2730 to the insert and lock database operation.

Furthermore store module 2775 implementing Task E 2770 is then configured to perform an select and lock for Key X 2710 database operation on the 'old' shard '57' 2780 and based on detecting a row skip an insert and lock for Key X 2712 database operation on the 'old' shard '57' 2780 and skip a loop back 2731 to the insert and lock database operation and then continue on to more operations 2720.

Figure 28:
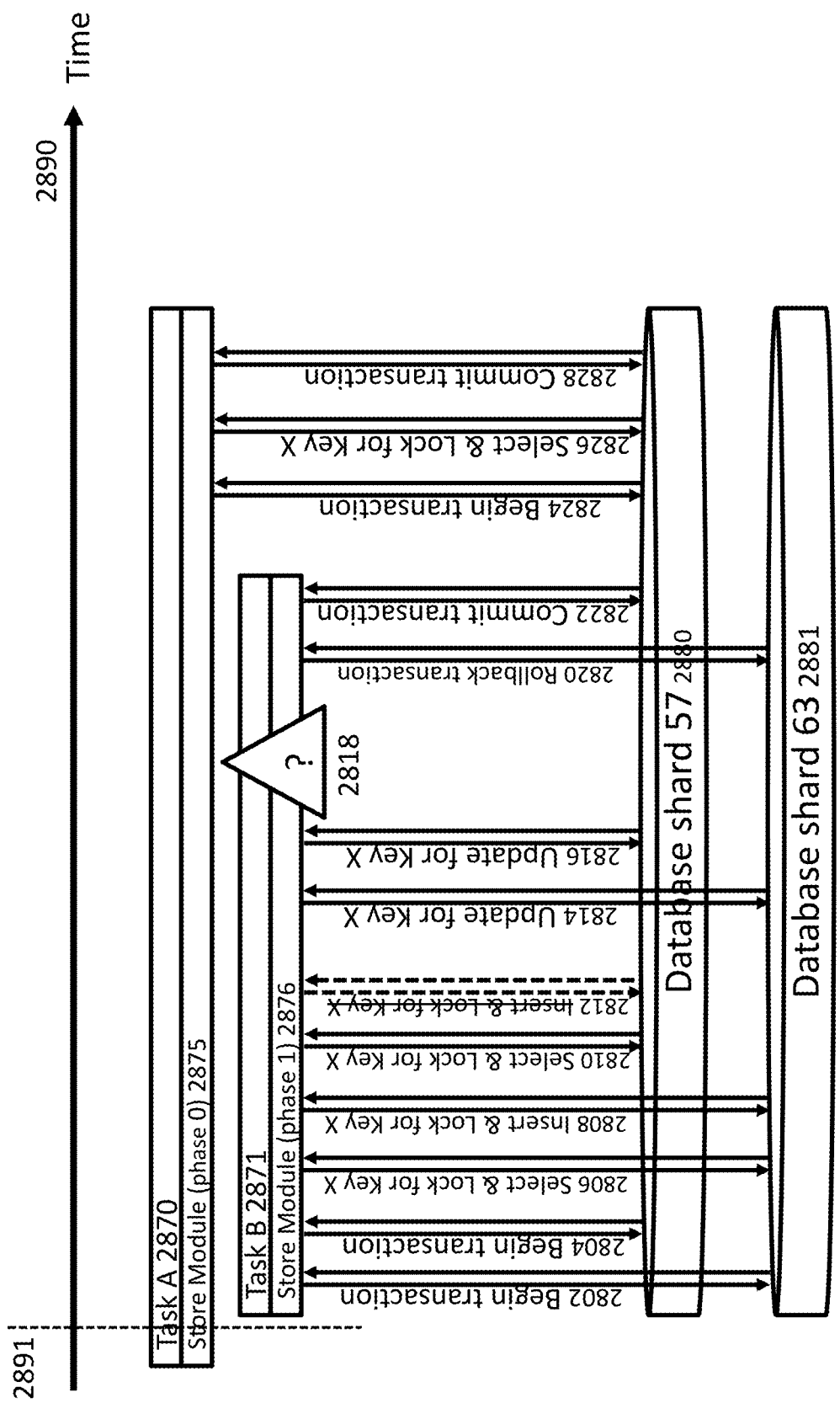
FIGS. 28 to 31 are schematic time line views of a first example implementation where one task only uses the old shard, while another task has started to use a new shard according to some embodiments.

With respect to FIG. 28 is shown an example of the combination of the enhancements as described above as applied to the Task A and B example shown in FIG. 16. FIG. 28 for example shows a combination of the introduction of phase 0 to 1 transition behaviour and locking with respect to the FIG. 16 Task A and Task B scenario shown earlier.

In this example the two separate access tasks, Task A 2870 and Task B 2871 are served by store module 2875 and store module 2876. Store module 2875 is operating under phase 0 behaviour and accessing the old shard as the Task A 2870 is started before the dashed line 2891 on the time line 2890 which represents a change in database configuration as in the transition from phase 0 to phase 1 behaviour as determined at the store module. Store module 2876 is operating under phase 1 behaviour and accessing the new shard as the Task B 2871 is started after the dashed line 2891.

In this example store module 2876 serving Task B 2871 is configured to perform a begin transaction 2802 database operation on the 'new' shard '63' 2881, and a begin transaction 2804 database operation on the 'old' shard '57' 2880.

Upon a write request of Key X from Task B 2871, the store module 2876 is then configured to perform a select and lock for Key X 2806 database operation on the 'new' shard '63' 2881 and based on detecting there is no row then perform an insert and lock for Key X 2808 database operation on the 'new' shard '63' 2881 (in this example the insert succeeds).

Furthermore, during the same write request of Key X from Task B 2871, the store module 2876 is also then configured to perform a select and lock for Key X 2810 database operation on the 'old' shard '57' 2880 and based on detecting a hit then skip an insert and lock for Key X 2812 database operation on the 'old' shard '57' 2880.

Furthermore, during the same write request of Key X from Task B 2871, the store module 2876 is also then configured to perform an update for Key X 2814 database operation on 'new' shard '63' 2881 followed by an update for Key X 2816 database operation on 'old' shard '57' 2880. All these operations are performed according to phase 1 behaviour as described herein.

When the Task B 2871 completes the store module 2876 will determine as indicated by 2818 that it shall perform a rollback transaction 2820 operation on 'new' shard '63' 2881 and commit transaction 2822 operation on 'old' shard '57' 2880, because all data was found on the 'old' shard '57' 2880.

Store module 2875 serving Task A 2870 is configured to perform a begin transaction 2824 database operation on the 'old' shard '57' 2880, then (upon the read key X request from Task A 2870) perform a select and lock for Key X 2826 database operation on the 'old' shard '57' 2880 and then (upon completes of Task A 2870) a commit transaction 2828 operation on 'old' shard '57' 2880.

Figure 29:
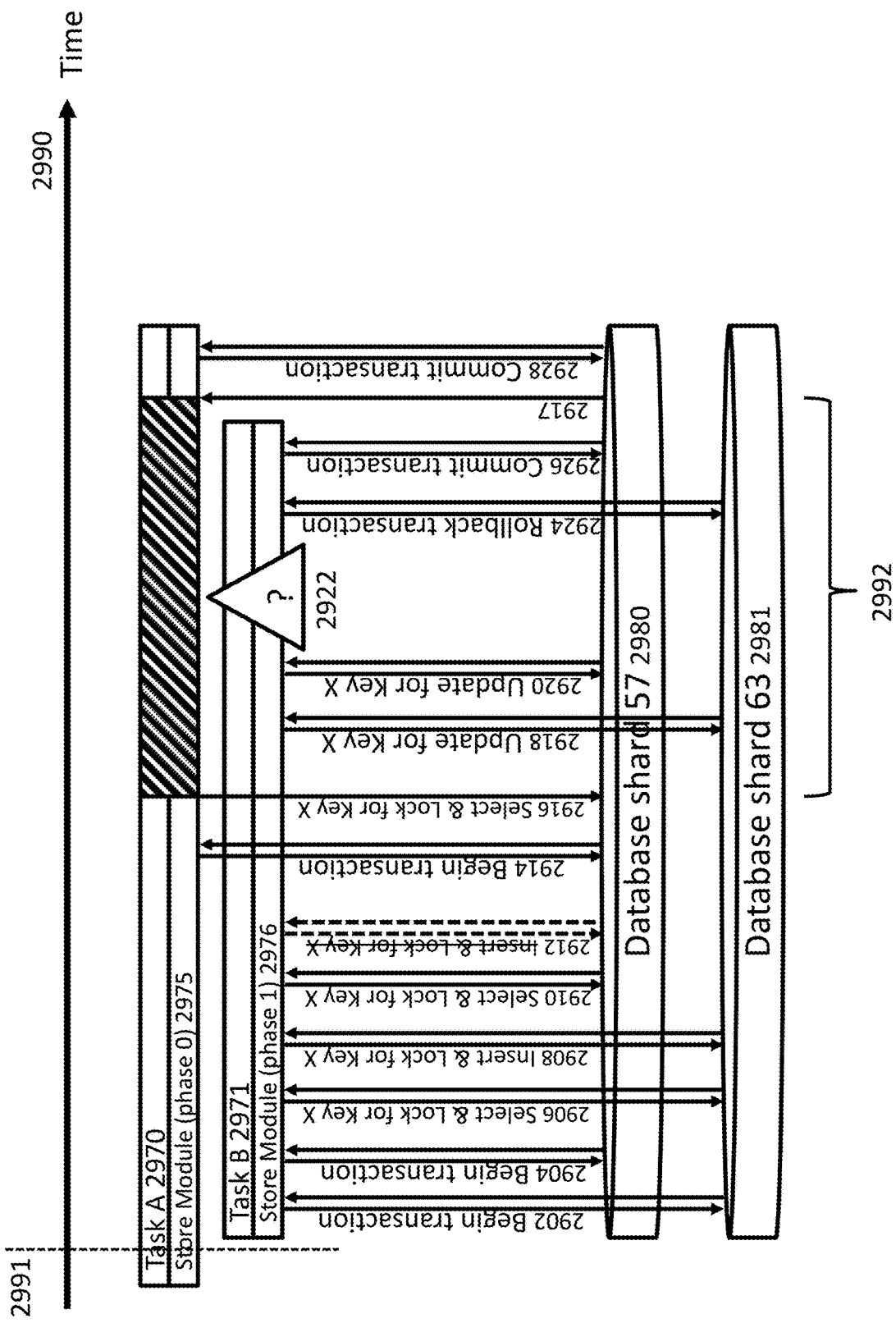

FIG. 29 shows an alternative scenario where the two separate access tasks, Task A 2970 and Task B 2971 are served by store module 2975 and store module 2976. The main difference compared with FIG. 28 is that Task A requests the read of Key X slightly earlier, and FIG. 29 shows how the store modules resolves this situation. Store module 2975 is operating under phase 0 behaviour and accessing the old shard as the Task A 2970 is started before the dashed line 2991 on the time line 2990 which represents a change in database configuration as in the transition from phase 0 to phase 1 behaviour as determined at the store module. Store module 2976 is operating under phase 1 behaviour and accessing the new shard as the Task B 2971 is started after the dashed line 2991.

In this example store module 2976 serving Task B 2971 is configured to perform a begin transaction 2902 database operation on the 'new' shard '63' 2981, and a begin transaction 2904 database operation on the 'old' shard '57' 2980.

Upon a write request of Key X from Task B 2971, the store module 2976 is then configured to perform a select and lock for Key X 2906 database operation on the 'new' shard '63' 2981 and based on detecting there is no row then perform an insert and lock for Key X 2908 database operation on the 'new' shard '63' 2981 (in this example the insert succeeds).

Furthermore, during the same write request of Key X from Task B 2971, the store module 2976 is also then configured to perform a select and lock for Key X 2910 database operation on the 'old' shard '57' 2980 and based on detecting a hit skip an insert and lock for Key X 2912 database operation on the 'old' shard '57' 2980.

In this scenario the Task A 2970 requests a read Key X, causing the store module 2975 serving Task A 2970 to perform a begin transaction 2924 database operation on the 'old' shard '57' 2980, then perform a select and lock for Key X 2916 database operation on the 'old' shard '57' 2980, this while the write request from Task B still is under processing in store module 2976.

Thus in this example scenario the Key X is locked in shard '57' and the database operation does not respond causing store module 2975 and Task A 2970 to wait for period 2992.

Furthermore, during the same write request of Key X from Task B 2971, the store module 2976 serving Task B 2971 is also configured to perform an update for Key X 2918 database operation on 'new' shard '63' 2981 followed by an update for Key X 2920 database operation on 'old' shard '57' 2980. All these operations are performed according to phase 1 behaviour as described herein.

When the Task B 2971 completes the store module 2976 will determine as indicated by 2922 that it shall to perform a rollback transaction 2924 operation on 'new' shard '63' 2981 and commit transaction 2926 operation on 'old' shard '57' 2980, because all data was found on the 'old' shard '57' 2980.

These rollback and commit operations unlock the database and the data from the select and lock operation returned 2917 which causes store module 2975 and Task A 2970 to stop waiting and the store module 2975 to then (upon completes of Task A 2970) perform a commit transaction 2928 operation on 'old' shard '57' 2980.

Figure 30:
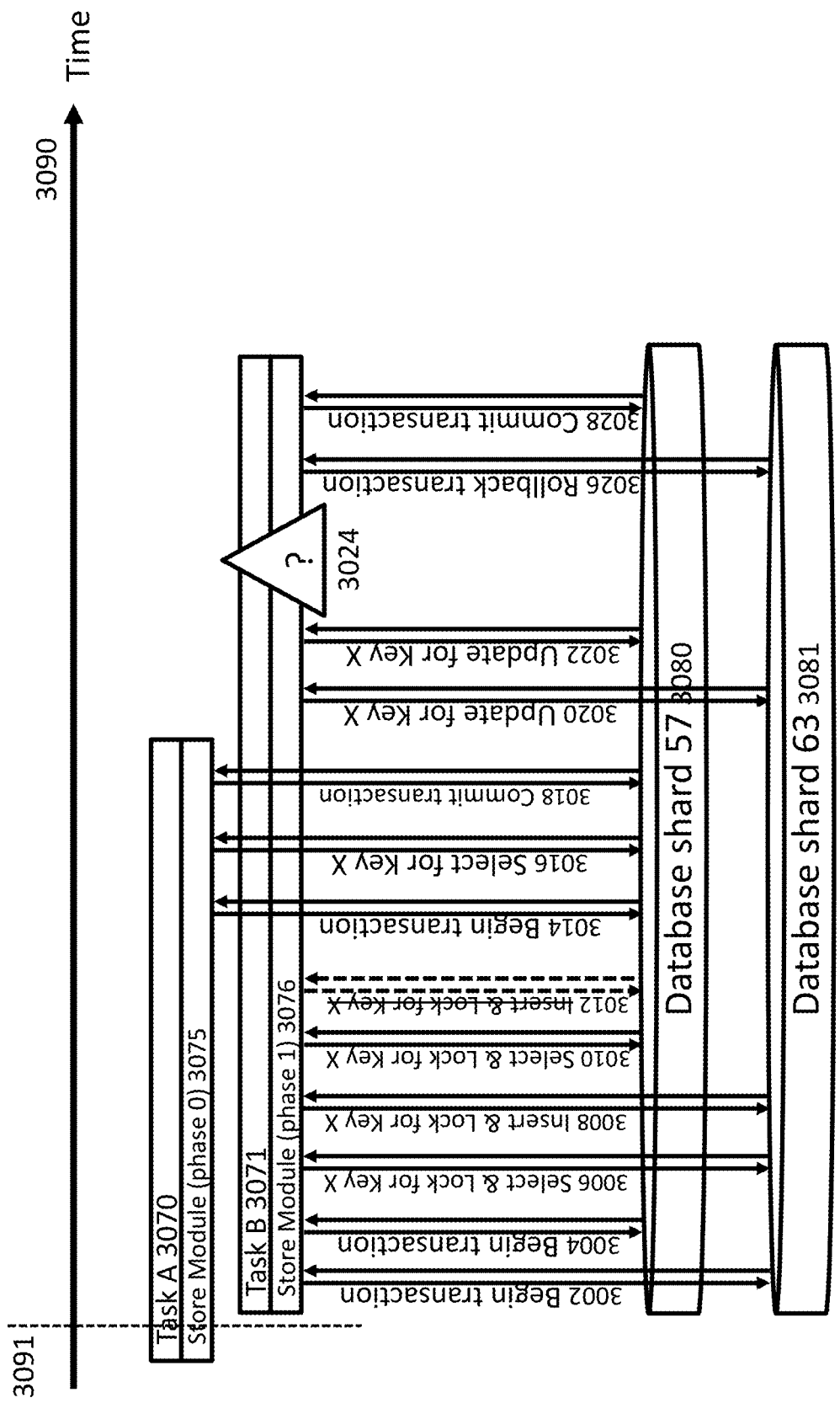

FIG. 30 shows another example wherein Task A may read the data already while Task B is still running (and the store module supports another database isolation level for the Task A read operations). In this example the two separate access tasks, Task A 3070 and Task B 3071 are served by store module 3075 and store module 3076. Store module 3075 is operating under phase 0 behaviour and accessing the old shard as the Task A 3070 is started before the dashed line 3091 on the time line 3090 which represents a change in database configuration as in the transition from phase 0 to phase 1 behaviour as determined at the store module. Store module 3076 is operating under phase 1 behaviour and accessing the new shard as the Task B 3071 is started after the dashed line 3091.

In this example store module 3076 serving Task B 3071 is configured to perform a begin transaction 3002 database operation on the 'new' shard '63' 3081, and a begin transaction 3004 database operation on the 'old' shard '57' 3080.

Upon a write request of Key X from Task B 3071, the store module 3076 is then configured to perform a select and lock for Key X 3006 database operation on the 'new' shard '63' 3081 and based on detecting there is no row then perform an insert and lock for Key X 3008 database operation on the 'new' shard '63' 3081 (in this example the insert succeeds).

Furthermore, during the same write request of Key X from Task B 3071, the store module 3076 is also then configured to perform a select and lock for Key X 3010 database operation on the 'old' shard '57' 3080 and based on detecting a hit skip an insert and lock for Key X 3012 database operation on the 'old' shard '57' 2880.

In this scenario the Task A 3070 request a read of Key X. For this read request, the Task A either implicit or explicit states that a write request for the Key X will not sent later. The request causes the store module 3075 serving Task A 3070 to perform a begin transaction 3014 database operation on the 'old' shard '57' 3080, then perform a select (with no lock) for Key X 3016 database operation on the 'old' shard '57' 3080 and then a commit transaction 3018 operation on 'old' shard '57' 3080, this while the write request from Task B still is under processing in store module 3076. Since the Task A 3070 implicit or explicit stated that a write request for the Key X will not sent later, the store module may select the data without a lock.

Furthermore, during the same write request of Key X from Task B 3071, the store module 3076 serving Task B 3071 is then configured to perform an update for Key X 3020 database operation on 'new' shard '63' 3081 followed by an update for Key X 3022 database operation on 'old' shard '57' 3080 according to phase 1 behaviour as described herein.

When the Task B 3071 completes the store module 3076 will determine as indicated by 3024 that it shall perform a rollback transaction 3026 operation on 'new' shard '63' 3081 and commit transaction 3028 operation on 'old' shard '57' 3080, because all data was found on the 'old' shard '57' 3080.

Figure 31:
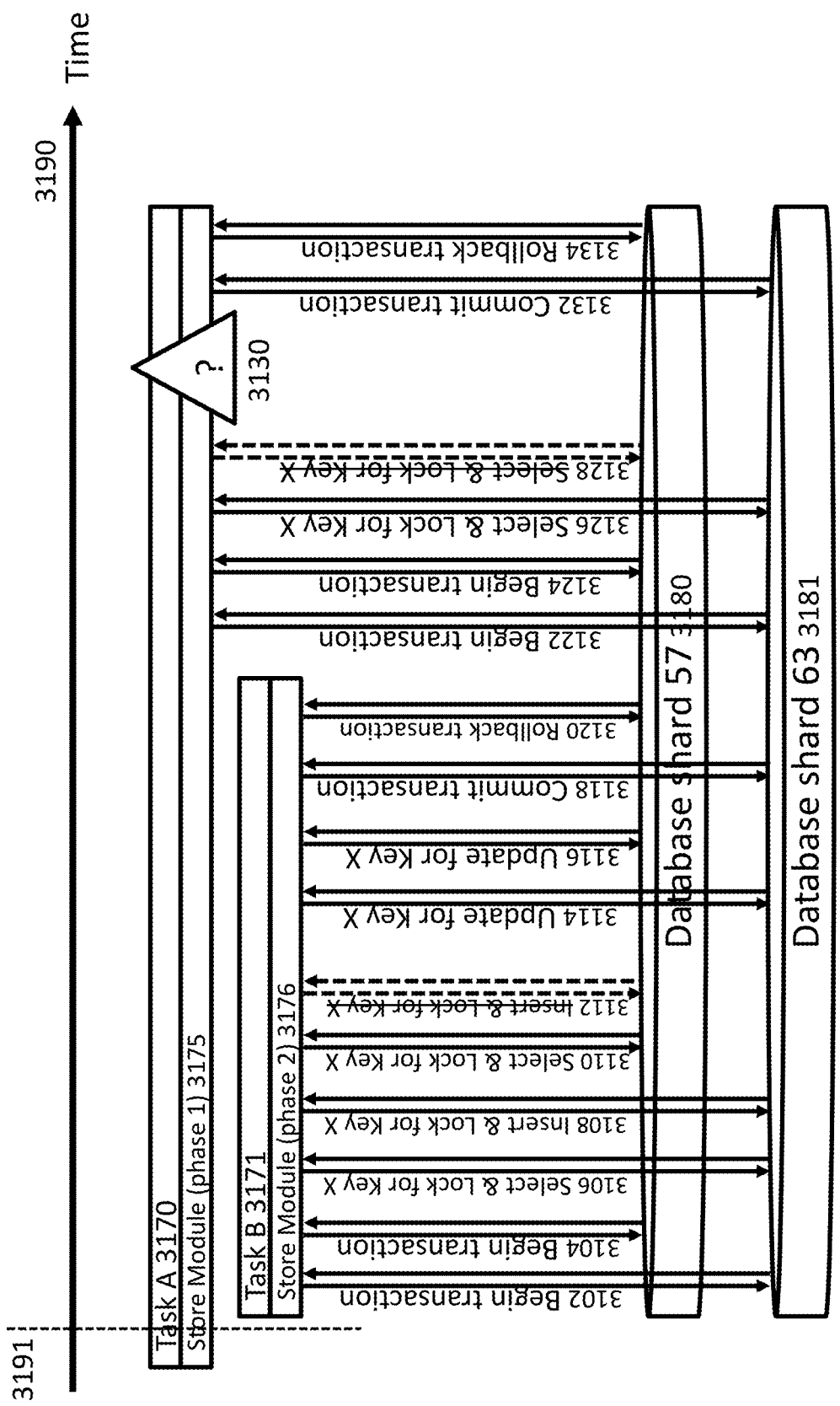

With respect to FIG. 31 is shown an example of the combination of the introduction of phase 1 behaviour and locking in the Task A and B scenario shown in FIG. 28 for the transition between phase 1 to 2 (similar examples may also be found for phase transitions from 1 to 2 for the scenarios shown in FIGS. 29 and 30).

In this example the two separate access tasks, Task A 3170 and Task B 3171 are served by store module 3175 and store module 3176. Store module 3175 is operating under phase 1 behaviour as the Task A 3170 is started before the dashed line 3191 on the time line 3190 which represents a change in database configuration as in the transition from phase 1 to phase 2 behaviour as determined at the store module. Store module 3176 is operating under phase 2 behaviour as the Task B 3171 is started after the dashed line 3191.

In this example store module 3176 serving Task B 3171 is configured to perform a begin transaction 3102 database operation on the 'new' shard '63' 3181, and a begin transaction 3104 database operation on the 'old' shard '57' 3180.

Upon a write request of Key X from Task B 3171, the store module 3176 is then configured to perform a select and lock for Key X 3106 database operation on the 'new' shard '63' 3181 and based on detecting there is no row then perform an insert and lock for Key X 3108 database operation on the 'new' shard '63' 3181 (in this example the insert succeeds).

Furthermore, during the same write request of Key X from Task B 3171, the store module 3176 is also then configured to perform a select and lock for Key X 3110 database operation on the 'old' shard '57' 3180 and based on detecting a hit then skip an insert and lock for Key X 3112 database operation on the 'old' shard '57' 3180.

Furthermore, during the same write request of Key X from Task B 3117, the store module 3176 is also then configured to perform an update for Key X 3114 database operation on 'new' shard '63' 3181 followed by an update for Key X 3116 database operation on 'old' shard '57' 3180. All these operations are performed according to phase 2 behaviour as described herein.

When the Task B 3171 completes the store module 3176 is then configured to perform a commit transaction 3118 operation on 'new' shard '63' 3181 and rollback transaction 3120 operation on 'old' shard '57' 3180.

Store module 3175 serving Task A 3170 is configured to perform a begin transaction 3122 database operation on the 'new' shard '63' 3181, then perform a begin transaction 3124 database operation on the 'old' shard '57' 3180.

Upon a read request of Key X from Task A 3170, the store module 3175 can then be configured to perform a select and lock for Key X 3126 database operation on the 'new' shard '63' 3181 which hits and therefore skips a select and lock for Key X 3128 database operation on the 'old' shard '57' 3180.

When the Task B 3171 completes the store module 3176 will determine as indicated by 3130 that it shall perform a commit transaction 3132 operation on 'new' shard '63' 3181 and rollback transaction 3134 operation on 'old' shard '57' 3180, due to that some data was found on the 'new' shard '63' 3181.

FIG. 29 and FIG. 30 illustrated alternative scenarios of FIG. 28. FIG. 29 illustrated a scenario where Task A requested Key X slightly earlier, while FIG. 30 illustrated a scenario where the store module supported a lock-less read. Both these alternative scenarios of FIG. 28 (phase 0 and 1 scenario) are also identical applicable for FIG. 31 (phase 1 and 2 scenario).

Figure 32:
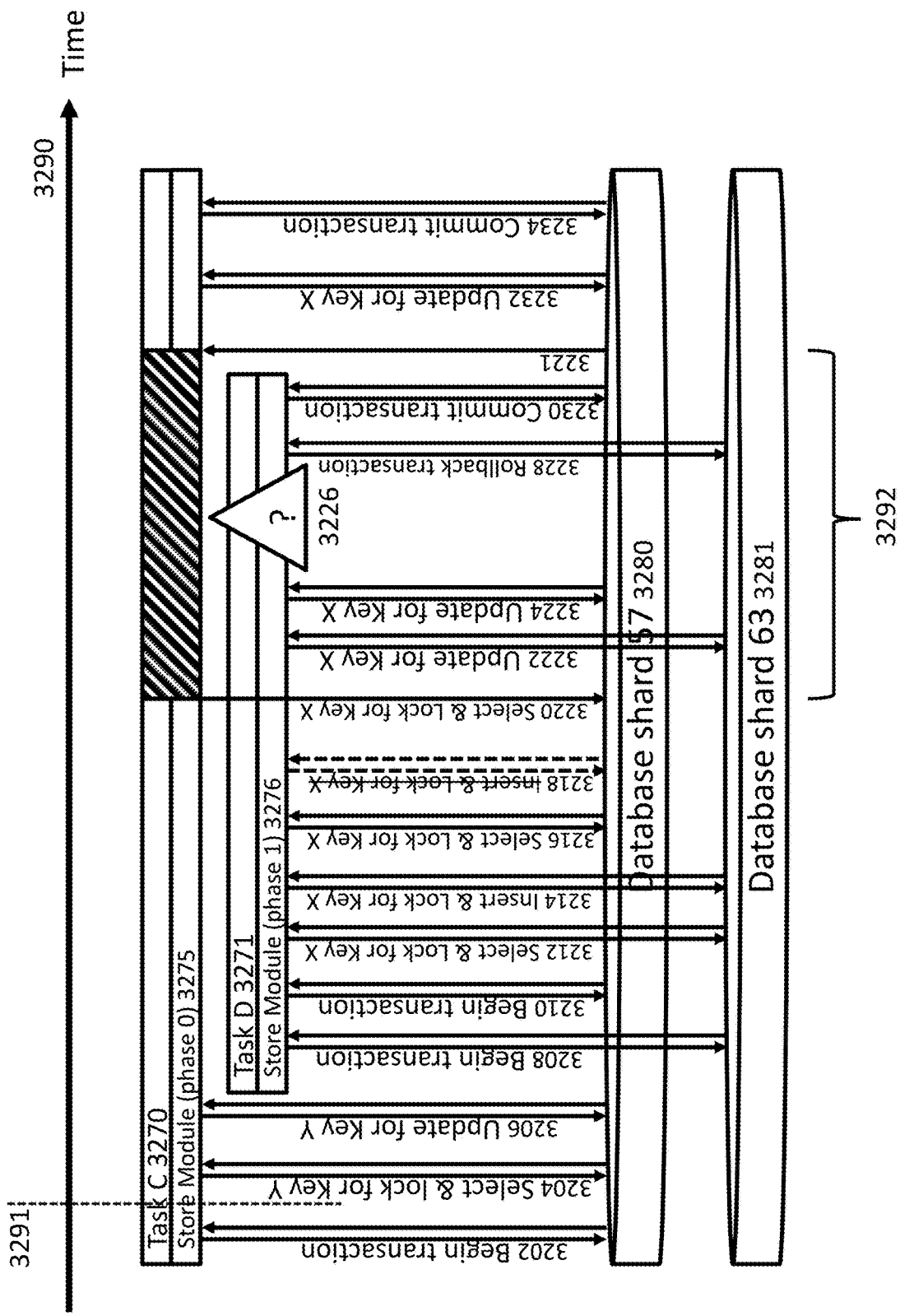
FIGS. 32 to 33 are schematic time line views of a second example implementation where one task only uses the old shard, while another task has started to use a new shard according to some embodiments.

FIG. 32 shows an example of the combination of the introduction of phase 1 behaviour and locking in the Task C and D scenario shown in FIG. 17 for the transition between phase 0 to 1. In this example the two separate access tasks, Task C 3270 and Task D 3271 are served by store module 3275 and store module 3276. Store module 3275 is operating under phase 0 behaviour and accessing the old shard as the Task C 3270 is started before the dashed line 3291 on the time line 3290 which represents a change in database configuration as in the transition from phase 0 to phase 1 behaviour as determined at the store module. Store module 3276 is operating under phase 1 behaviour and accessing the new shard as the Task D 3271 is started after the dashed line 3291.

In this example store module 3275 serving Task C 3270 is configured to perform a begin transaction 3202 database operation on the 'old' shard '57' 3280.

The store module 3275 is then (due to a read request from Task C 3279) configured to perform a select and lock for Key Y 3204 database operation on the 'old' shard '57' 3280 and following (due to a write request from Task C 3279) an update for Key Y 3206 database operation on the 'old' shard '57' 3280.

The store module 3276 serving Task D 3271 is then configured to perform a begin transaction 3208 database operation on the 'new' shard '63' 3281 and following this perform a begin transaction 3210 database operation on the 'new' shard '63' 3281.

Upon a read request of Key X from Task D 3271, the store module 3276 is then configured to perform a select and lock for Key X 3212 database operation on the 'new' shard '63' 3281, which registers a miss then causes an insert and lock for Key X 3214 database operation on the 'new' shard '63' 3281 (which is successful) to be performed.

Furthermore, during the same read request of Key X from Task D 3217, the store module 3276 is further then configured to perform a select and lock for Key X 3216 database operation on the 'old' shard '57' 3280, which registers a hit then causes an skipping of an insert and lock for Key X 3218 database operation on the 'old' shard '57' 3280. All these operations during the read request is performed according to phase 1 behaviour as described herein.

Upon a read request of Key X from Task C 3270, the store module 3275 is then configured to perform a select and lock for Key X 3220 database operation on the 'old' shard '57' 3280 which is locked and causes the store module and Task C to wait for the period 3292.

Upon a write request of Key X from Task D 3271, the store module 3276 is then configured to perform an update for Key X 3222 database operation on the 'new' shard '63' 3281 and following this an update for Key X 3224 database operation on the 'old' shard '57' 3280.

When Task D 3271 completes the store module 3276 will determine as indicated by 3226 that is shall perform a rollback transaction 3228 operation on 'new' shard '63' 3281 and commit transaction 3230 operation on 'old' shard '57' 3280, because all data was found on the 'old' shard '57' 3280.

This unlocks the database and the data associated with the operation 3220 is returned 3221 which causes store module 3276 and Task C 3270 to stop waiting.

Upon a write request of Key C from Task C 3271, the store module 3275 is then configured to perform an update for Key X 3232 database operation on the 'old' shard '57' 3280.

When the Task C 3271 completes the store module 3275 is configured to perform a commit transaction 3234 operation on 'old' shard '57' 3280.

Figure 33:
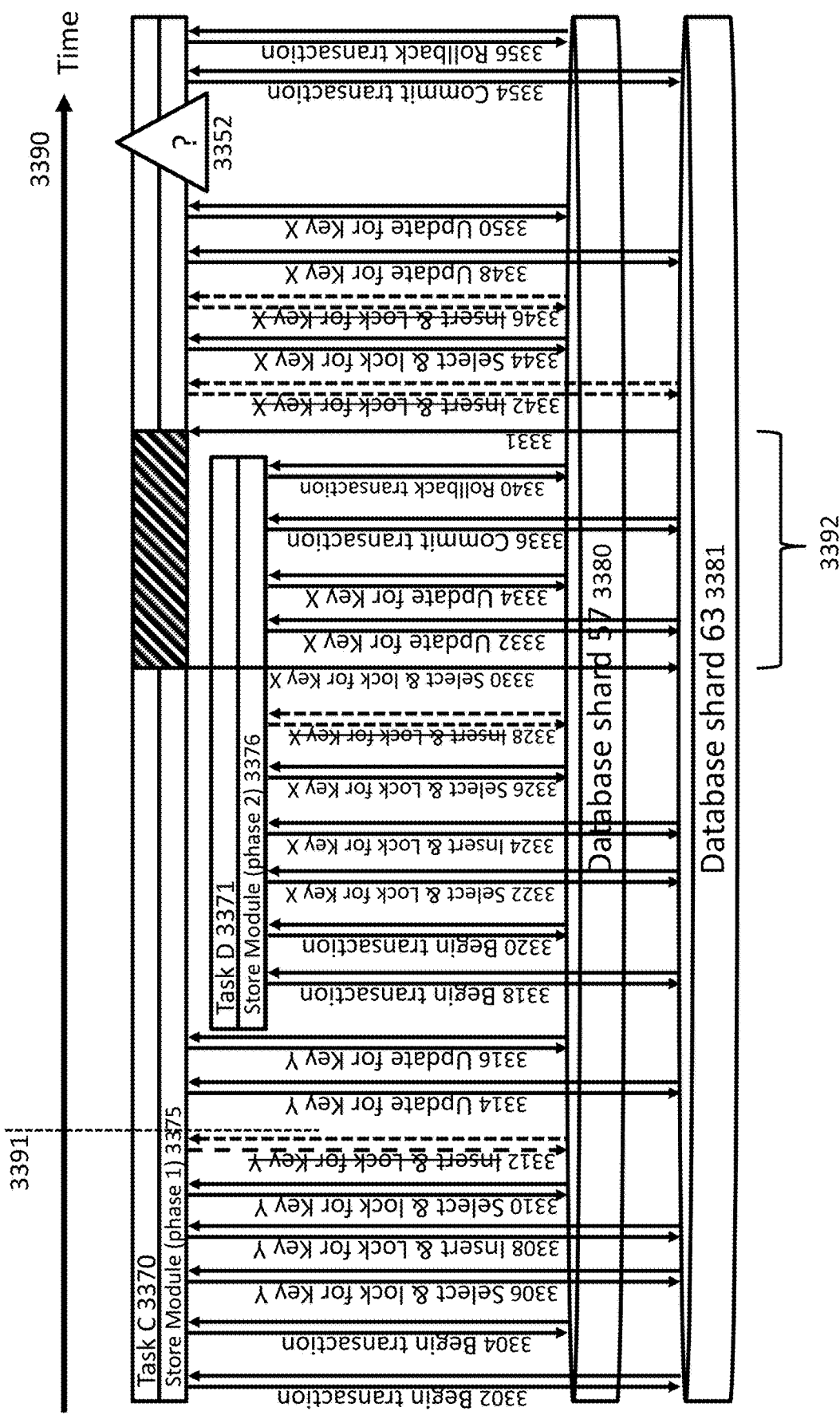

FIG. 33 shows an example of the combination of the introduction of phase 1 behaviour and locking in the Task C and D scenario shown in FIG. 17 for the transition between phase 1 to 2. In this example the two separate access tasks, Task C 3370 and Task D 3371 are served by store module 3375 and store module 3376. Store module 3375 is operating under phase 1 behaviour as the Task C 3370 is started before the dashed line 3391 on the time line 3390 which represents a change in database configuration as in the transition from phase 1 to phase 2 behaviour as determined at the store module. Store module 3376 is operating under phase 2 behaviour and accessing the new shard as the Task D 3371 is started after the dashed line 3391.

In this example store module 3375 serving Task C 3370 is configured to perform a begin transaction 3302 database operation on the 'new' shard '63' 3381 and also a begin transaction 3304 database operation on the 'old' shard '57' 3380.

Upon a read request of Key X from Task C 3370, the store module 3375 is then configured to perform a select and lock for Key Y 3306 database operation on the 'new' shard '63' 3381, which registers a miss and causes an insert and lock for Key Y 3308 database operation on the 'new' shard '63' 3381 (which is successful).

Furthermore, during the same read request of Key X from Task C 3370, the store module is configured to perform a select and lock for Key Y 3310 database operation on the 'old' shard '57' 3380, which registers a hit and skips the insert and lock for Key Y 3312 database operation on the 'old' shard '57' 3380.

Upon a write request of Key X from Task C 3370, the store module 3375 is then configured to perform an update for Key Y 3314 database operation on the 'new' shard '63' 3381 and follow this by performing an update for Key Y 3316 database operation on the 'old' shard '57' 3380.

The store module 3376 serving Task D 3371 is then configured to perform a begin transaction 3318 database operation on the 'new' shard '63' 3381 and following this perform a begin transaction 3320 database operation on the 'new' shard '63' 3381.

Upon a read request of Key X from Task D 3371, the store module 3376 implementing Task D 3371 is then configured to perform a select and lock for Key X 3222 database operation on the 'new' shard '63' 3381, which registers a miss which then causes an insert and lock for Key X 3324 database operation on the 'new' shard '63' 3381 (which is successful) to be performed.

Furthermore, during the same read request of Key X from Task D 3371, the store module 3376 is configured to perform a select and lock for Key X 3326 database operation on the 'old' shard '57' 3380, which registers a hit which causes skipping an insert and lock for Key X 3328 database operation on the 'old' shard '57' 3380.

Upon a read request of Key X from Task C 3370, the store module 3375 is then configured to perform a select and lock for Key X 3330 database operation on the 'new' shard '63' 3381 which is locked and causes store module 3375 and Task C 3370 to wait for the period 3392.

Upon a write request of Key X from task D 3371, the store module 3376 is further then configured to perform an update for Key X 3332 database operation on the 'new' shard '63' 3381 and following this an update for Key X 3334 database operation on the 'old' shard '57' 3380.

When Task D 3371 completes the store module 3376 can then be configured to perform a commit transaction 3336 operation on 'new' shard '63' 3381 and rollback transaction 3340 operation on 'old' shard '57' 3380.

This unlocks the database and the data associated with the operation 3330 is returned 3331 and store module 3375 and Task C 3370 wait is over.

The returned data returns a hit and causes the store module 3375 to skip an insert and lock for Key X 3342 database operation on the 'new' shard '63' 3381.

Furthermore, during the still ongoing read request of key X from Task C 3370, the store module 3375 is then configured to perform a select and lock for Key X 3344 database operation on the 'old' shard '57' 3380 which returns a hit and causes a skipping an insert and lock for Key X 3346 database operation on the 'old' shard '57' 3380. The successful data found in 3330 operation has priority over the successful data found in 3344 operation, so it is the 3330 data result it is returned back to the Task C 3370 as the result of the read of Key X operation.

Upon a write request of Key X from Task C 3370, the store module 3375 is then configured to perform an update for Key X 3348 database operation on the 'new' shard '63' 3381 and following this an update for Key X 3350 database operation on the 'old' shard '57' 3380.

When Task C 3370 completes the store module 3375 will determinate as indicated by 3352 that is shall perform a commit transaction 3354 operation on 'new' shard '63' 3381 and rollback transaction 3356 operation on 'old' shard '57' 3380, due to that some data was found on the 'new' shard '63' 3381.

These examples as shown in FIGS. 16 to 33 are examples where all keys are moving (or about to be moved). However as also explained previously because of the shard activation vector distribution and furthermore the implementation of a stepped implementation of shard migration using the activation vectors in some embodiments not all keys may be moving or be moved in the same period. Thus these are limited examples only and there could be further examples described whereby some keys are affected but other keys are not.

These are example scenarios and thus the Task labels, shard labels and the operation orders are examples only and not limiting.

Whilst some embodiments have been described in which information is retrieved from the database in response to a request, it will be appreciated that the described methods can also be used in order to modify information in the database. In the context of a game (by way of example only), after a player has completed a game or a game level, then information such as a points score, number of lives remaining etc. may need to be modified in the database. The previously described methods can be used in order to determine in which shard the relevant data record or collection is located so that the information can be modified thereto.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A control module configured to manage and control transferring data between a first shard and at least one destination shard within a database comprising a plurality of shards, the control module comprising at least one processor and at least one memory including a computer program code, the at least one memory and the computer program code configured to, with the at least one processor, cause the control module at least to:

generate a first distribution of data collections across a plurality of available shards, the one or more available shards including the first shard, the first distribution of data collections defining in which shard a respective data collection is located, wherein the data collections are distributed across the one or more available shards using a first hash wheel distribution which maps a value identifying a respective data collection to a respective shard, the first hash wheel constructed from an integer number of occurrences of one or more available shards of the plurality of shards including the first shard, wherein the first distribution represents a current distribution of data collections;

generate a further distribution of data collections across a plurality of available shards, the one or more available shards including the one or more destination shards, the further distribution of data collections defining in which shard a respective data collection is located, wherein the data collections are distributed across the one or more available shards using a further hash wheel distribution which maps a value identifying a respective data collection to a respective shard, the further hash wheel distribution providing updated shard allocations, the further hash wheel constructed from an integer number of occurrences of one or more available shards of the plurality of shards, including one or more of the destination shards, wherein the further distribution represents an update to the current distribution of data collections;

determine a difference between the first hash wheel distribution of shard allocations and the further hash wheel distribution of shard allocations, the difference providing at least one range of hash values associated with data to be transferred between the first shard and the at least one destination shard; and select and control the transfer of data associated with the determined at least one range of hash values, which are determined based on the difference between the first hash wheel distribution of shard allocations and the further hash wheel distribution of shard allocations between the first shard and the at least one destination shard.

2. The control module as claimed in claim 1, wherein the control module is further caused to:

generate a series of auxiliary hash wheel distributions of shard allocations by applying the defined hashing function to a series of auxiliary integer value per shard allocations, wherein a final of the series of auxiliary integer value per shard allocations is a target integer value per shard allocation and the further integer value per shard allocation and auxiliary integer value per shard allocations define a step-wise progression from the first integer value per shard allocation to the final of the series of auxiliary integer value per shard allocations.

3. The control module as claimed in claim 2, further caused to determine further ranges of hash values associated with data to be transferred between shards, wherein the further ranges of hash values, the first shard and the at least one destination shard are defined based on determining differences between succeeding auxiliary hash wheel distributions of shard allocations.

4. The control module as claimed in claim 1, caused to select and control the transfer of the determined at least one range of data between the first shard and the at least one destination shard is further caused to generate and store a hash value associated with each key.

5. The control module as claimed in claim 4, caused to generate the hash value based on one of:
the defined hashing function applied to the key value for each key;
a sum of an additional value and the defined hashing function applied to the key value for each key, wherein the additional value is a pseudorandom value; or
a concatenation of an additional value to the defined hashing function hash wheel function applied to the key value for each key, wherein the additional value is a pseudorandom value.

6. The control module as claimed in claim 1, caused to select and control the transfer of data associated with the determined at least one range of hash values between the first shard and the at least one destination shard is caused to select rows from database tables based on the determined at least one range of hash values.

7. The control module as claimed in claim 1, wherein the control module is further caused to generate the first hash wheel distribution of shard allocations by applying a defined hashing function to a first integer value per shard allocation and to generate the further hash wheel distribution of shard allocations by applying the defined hashing function to a further integer value per shard allocation.

8. A method for a control module configured to manage and control transferring data between a shard and at least one destination shard within a database comprising a plurality of shards, the method comprising:
generating a first distribution of data collections across a plurality of available shards, the one or more available shards including the first shard, the first distribution of data collections defining in which shard a respective data collection is located, wherein the data collections are distributed across the one or more available shards using a first hash wheel distribution which maps a value identifying a respective data collection to a respective shard, the first hash wheel constructed from an integer number of occurrences of one or more available shards including the first shard, wherein the first distribution represents a current distribution of data collections;
generating a further distribution of data collections across a plurality of available shards, the one or more available shards including the one or more destination shards, the further distribution of data collections defining in which shard a respective data collection is located, wherein the data collections are distributed across the one or more available shards using a further hash wheel distribution which maps a value identifying a respective data collection to a respective shard, the further hash wheel distribution providing updated shard allocations, the further hash wheel constructed from an integer number of occurrences of one or more available shards of the plurality of shards, including one or more of the destination shards, wherein the further distribution represents an update to the current distribution of data collections;
determining a difference between the first hash wheel distribution of shard allocations and the further hash wheel distribution of shard allocations, the difference providing at least one range of hash values associated with data to be transferred between the first shard and the at least one destination shard; and
selecting and controlling the transfer of data associated with the at least one range of hash values, which are determined based on the difference between the first hash wheel distribution of shard allocations and the further hash wheel distribution of shard allocations, between the first shard and the at least one destination shard.

9. The method as claimed in claim 8, further comprising:
generating a series of auxiliary hash wheel distributions of shard allocations by applying the defined hashing function to a series of auxiliary integer value per shard allocations, wherein a final of the series of auxiliary integer value per shard allocations is a target integer value per shard allocation and the further integer value per shard allocation and auxiliary integer value per shard allocations define a step-wise progression from the first integer value per shard allocation to the final of the series of auxiliary integer value per shard allocations.

10. The method as claimed in claim 9, further comprising determining further ranges of hash values associated with data to be transferred between shards, wherein the further ranges of hash values, the first shard and the at least one destination shard are defined based on determining differences between succeeding auxiliary hash wheel distributions of shard allocations.

11. The method as claimed in claim 8, wherein selecting and controlling the transfer of the determined at least one range of data between the first shard and the at least one destination shard further comprises generating and storing a hash value associated with each key.

12. The method as claimed in claim 11, wherein generating the hash value comprising generating the hash value based on one of:
the defined hashing function applied to the key value for each key;
a sum of an additional value and the defined hashing function applied to the key value for each key, wherein the additional value is a pseudorandom value; and
a concatenation of an additional value to the defined hashing function hash wheel function applied to the key value for each key, wherein the additional value is a pseudorandom value.

13. The method as claimed in claim 8, wherein selecting and controlling the transfer of data associated with the determined at least one range of hash values between the first shard and the at least one destination shard further comprises selecting rows from database tables based on the determined at least one range of hash values.

14. The method as claimed in claim 8, wherein generating the first hash wheel distribution of shard allocations comprises applying a defined hashing function to a first integer value per shard allocation and generating the further hash wheel distribution of shard allocations comprises applying the defined hashing function to a further integer value per shard allocation.

\* \* \* \* \*